US012606456B2

(12) United States Patent
Bourassa et al.

(10) Patent No.: US 12,606,456 B2
(45) Date of Patent: *Apr. 21, 2026

(54) PROCESSES FOR PREPARING HYDROXIDES AND OXIDES OF VARIOUS METALS AND DERIVATIVES THEREOF

(71) Applicant: NEMASKA LITHIUM INC., Montréal (CA)

(72) Inventors: Guy Bourassa, Québec (CA); Jean-François Magnan, Neuville (CA); Nicolas Laroche, Pont-Rouge (CA); Thomas Bibienne, Montréal (CA); Mathieu Charbonneau, Montréal (CA); Mickaël Dollé, Outremont (CA)

(73) Assignee: NEMASKA LITHIUM INC., Montréal (CA)

(*) Notice: Subject to any disclaimer, the term of this patent is extended or adjusted under 35 U.S.C. 154(b) by 154 days.

This patent is subject to a terminal disclaimer.

(21) Appl. No.: 18/655,232

(22) Filed: May 4, 2024

(65) Prior Publication Data
US 2024/0294395 A1 Sep. 5, 2024

Related U.S. Application Data

(63) Continuation of application No. 18/090,322, filed on Dec. 28, 2022, now Pat. No. 12,006,231, which is a
(Continued)

(51) Int. Cl.
*C01G 53/04* (2025.01)
*B01D 61/44* (2006.01)
(Continued)

(52) U.S. Cl.
CPC ........... *C01G 53/04* (2013.01); *B01D 61/445* (2013.01); *C01D 1/28* (2013.01); *C01D 15/02* (2013.01);
(Continued)

(58) Field of Classification Search
CPC ...... C01G 53/04; C01G 53/006; C01G 53/50; C01G 51/50; C01G 51/04; B01D 61/445;
(Continued)

(56) References Cited

U.S. PATENT DOCUMENTS 2,331,838 A 10/1943 Lindblad et al.
2,516,109 A 7/1950 Ellestad et al.
(Continued)

FOREIGN PATENT DOCUMENTS

AU 2012211033 8/2012
AU 2012248126 11/2012
(Continued)

OTHER PUBLICATIONS

Liang et al., "Co-precipitation synthesis of Ni0.6Co0.2Mn0.2(OH)2 precursors and characterization of LiNi0.6Co0.202 cathode material for secondary lithium batteries", Electrochimica Acta 130 (Mar. 3, 2014) 82-89.
(Continued)

*Primary Examiner* — Richard M Rump
(74) *Attorney, Agent, or Firm* — SMART & BIGGAR LP

(57) ABSTRACT

A process for preparing metal oxide comprising (i) at least one metal chosen from nickel and cobalt and optionally (ii) at least one metal chosen from manganese, lithium and aluminum. The process comprising:

reacting a metal sulfate comprising (i) at least one metal chosen from nickel and cobalt and optionally (ii) at least one metal chosen from manganese, lithium and aluminum with lithium hydroxide and optionally a chelating agent to obtain a solid comprising a metal hydroxide comprising (i) at least one metal chosen from nickel and cobalt and optionally (ii) at least one metal chosen from manganese, lithium and aluminum, and a liquid comprising lithium sulfate, the metal (Continued)

sulfate comprising (i) at least one metal chosen from nickel and cobalt and optionally (ii) at least one metal chosen from manganese, lithium and aluminum;

separating the liquid and the solid from one another to obtain the metal hydroxide;

submitting the liquid comprising lithium sulfate to an electromembrane process for converting the lithium sulfate into lithium hydroxide; and reusing at least a first portion of said lithium hydroxide obtained by the electromembrane process for reacting with the metal sulfate;

reacting at least a second portion of said lithium hydroxide obtained by the electromembrane process with the obtained metal hydroxide to obtain a mixture of metal hydroxides; and roasting said mixture of metal hydroxides to obtain the metal oxide.

16 Claims, 35 Drawing Sheets

Related U.S. Application Data continuation of application No. 17/477,553, filed on Sep. 17, 2021, now Pat. No. 11,542,175, which is a continuation of application No. 16/766,287, filed as application No. PCT/CA2018/051487 on Nov. 22, 2018, now Pat. No. 11,142,466.

(60) Provisional application No. 62/735,013, filed on Sep. 21, 2018, provisional application No. 62/590,260, filed on Nov. 22, 2017.

(51) Int. Cl.

| *C01D 1/28* | (2006.01) |
|---|---|
| *C01D 15/02* | (2006.01) |
| *C01G 51/04* | (2006.01) |
| *C01G 51/50* | (2025.01) |
| *C01G 53/50* | (2025.01) |
| *C01G 53/82* | (2025.01) |
| *H01M 4/505* | (2010.01) |
| *H01M 4/525* | (2010.01) |
| *H01M 10/0525* | (2010.01) |
| *H01M 10/54* | (2006.01) |

(52) U.S. Cl.

CPC ............. *C01G 51/04* (2013.01); *C01G 51/50* (2013.01); *C01G 53/50* (2013.01); *C01G 53/82* (2025.01); *H01M 4/505* (2013.01); *H01M 4/525* (2013.01); *H01M 10/0525* (2013.01); *H01M 10/54* (2013.01); *B01D 2311/2642* (2013.01); *B01D 2311/2673* (2013.01); *C01P 2002/54* (2013.01); *C01P 2002/72* (2013.01); *C01P 2006/40* (2013.01)

(58) Field of Classification Search

CPC ......... B01D 2311/2673; C01P 2002/54; C01D 15/02; C01D 1/28

See application file for complete search history.

(56) References Cited

U.S. PATENT DOCUMENTS

| 2,793,941 A | 5/1957 | Estes |
|---|---|---|
| 2,872,393 A | 2/1959 | Gardiner et al. |
| 2,882,243 A | 4/1959 | Milton |
| 3,007,771 A | 11/1961 | Mazza et al. |
| 3,214,362 A | 10/1965 | Juda |

| 3,597,340 A | 8/1971 | Honeycutt et al. |
|---|---|---|
| 3,857,920 A | 12/1974 | Grantham et al. |
| 3,899,403 A | 8/1975 | Cook, Jr. et al. |
| 4,035,713 A | 7/1977 | Kawamoto et al. |
| 4,036,713 A | 7/1977 | Brown |
| 4,207,297 A | 6/1980 | Brown et al. |
| 4,273,628 A | 6/1981 | Kidon et al. |
| 4,287,163 A | 9/1981 | Garrett et al. |
| 4,391,680 A | 7/1983 | Mani et al. |
| 4,504,373 A | 3/1985 | Mani et al. |
| 4,561,945 A | 12/1985 | Coker et al. |
| 4,613,416 A | 9/1986 | Kau et al. |
| 4,707,234 A | 11/1987 | Mori et al. |
| 4,723,962 A | 2/1988 | Mehta |
| 4,806,215 A | 2/1989 | Twardowski |
| 4,961,909 A | 10/1990 | Boateng |
| 4,999,095 A | 3/1991 | Chlanda et al. |
| 5,098,532 A | 3/1992 | Thompson et al. |
| 5,129,936 A | 7/1992 | Wilson |
| 5,198,080 A | 3/1993 | Cowley et al. |
| 5,198,081 A | 3/1993 | Kanoh et al. |
| 5,227,031 A | 7/1993 | Sundblad |
| 5,230,779 A | 7/1993 | Martin |
| 5,246,551 A | 9/1993 | Pletcher et al. |
| 5,258,106 A | 11/1993 | Habermann et al. |
| 5,423,959 A | 6/1995 | Sundblad et al. |
| 5,445,717 A | 8/1995 | Kärki et al. |
| 5,595,641 A | 1/1997 | Traini et al. |
| 5,788,943 A | 8/1998 | Aladjov |
| 6,004,445 A | 12/1999 | Genders et al. |
| 6,048,507 A | 4/2000 | Amouzegar et al. |
| 6,120,576 A | 9/2000 | Toshima et al. |
| 6,306,787 B1 | 10/2001 | Sato et al. |
| 6,331,236 B1 | 12/2001 | Mani |
| 6,375,824 B1 | 4/2002 | Phinney |
| 6,514,311 B1 | 2/2003 | Lin et al. |
| 6,514,640 B1 | 2/2003 | Armand et al. |
| 6,547,836 B1 | 4/2003 | Lukes |
| 6,592,832 B1 | 7/2003 | Friedrich et al. |
| 6,747,065 B1 | 6/2004 | Paszkowski |
| 6,770,187 B1 | 8/2004 | Pütter et al. |
| 7,192,564 B2 | 3/2007 | Cardarelli et al. |
| 7,695,649 B2 | 4/2010 | Paulsen et al. |
| 8,431,005 B1 | 4/2013 | Zbranek et al. |
| 8,715,482 B2 | 5/2014 | Amendola et al. |
| 8,936,711 B2 | 1/2015 | Chon et al. |
| 8,936,770 B2* | 1/2015 | Burba, III ................. C25B 7/00 |
| | | 423/20 |
| 8,951,399 B2 | 2/2015 | Fischer et al. |
| 9,255,011 B2 | 2/2016 | Kawata et al. |
| 9,255,012 B2 | 2/2016 | Tiihonen et al. |
| 9,315,908 B2 | 4/2016 | Idutsu et al. |
| 9,382,126 B2 | 7/2016 | Bourassa et al. |
| 9,447,480 B2 | 9/2016 | Vaughan et al. |
| 9,493,881 B2 | 11/2016 | Kosmoski et al. |
| 9,677,181 B2 | 6/2017 | Bourassa et al. |
| 9,702,024 B2* | 7/2017 | Wohlgemuth ...... C22B 23/0461 |
| 9,890,053 B2 | 2/2018 | Bourassa et al. |
| 10,036,094 B2 | 7/2018 | Magnan et al. |
| 10,066,305 B2 | 9/2018 | Bourassa et al. |
| 10,144,990 B2 | 12/2018 | Bourassa et al. |
| 10,450,630 B2 | 10/2019 | Johnson et al. |
| 10,544,512 B2 | 1/2020 | Magnan et al. |
| 10,597,305 B2 | 3/2020 | Magnan et al. |
| 10,633,748 B2 | 4/2020 | Bourassa et al. |
| 10,661,227 B2 | 5/2020 | Park et al. |
| 10,800,663 B2 | 10/2020 | Bourassa et al. |
| 11,078,582 B2 | 8/2021 | Chang et al. |
| 11,142,466 B2 | 10/2021 | Bourassa et al. |
| 11,542,175 B2 | 1/2023 | Bourassa et al. |
| 11,697,861 B2 | 7/2023 | Bourassa et al. |
| 2001/0040093 A1 | 11/2001 | Mani |
| 2005/0051488 A1 | 3/2005 | Nagghappan et al. |
| 2006/0105239 A1 | 5/2006 | Paulsen et al. |
| 2011/0044882 A1 | 2/2011 | Buckley et al. |
| 2011/0123427 A1 | 5/2011 | Boryta et al. |
| 2011/0182786 A1 | 7/2011 | Burba, III |
| 2011/0200508 A1 | 8/2011 | Harrison et al. |
| 2011/0203929 A1 | 8/2011 | Buckley et al. |

(56) References Cited

U.S. PATENT DOCUMENTS

| | | | |
|---|---|---|---|
| 2012/0085658 A1 | 4/2012 | Bhavaraju et al. | |
| 2012/0107210 A1 | 5/2012 | Harrison et al. | |
| 2013/0153433 A1 | 6/2013 | Idutsu et al. | |
| 2014/0010743 A1 | 1/2014 | Kosmoski et al. | |
| 2014/0023572 A1 | 1/2014 | Vaughan et al. | |
| 2015/0041323 A1 | 2/2015 | Faita | |
| 2015/0139886 A1 | 5/2015 | Bourassa et al. | |
| 2015/0247216 A1* | 9/2015 | Wohlgemuth | C22B 23/043 |
| | | | 423/306 |
| 2015/0364761 A1* | 12/2015 | Fukui | H01M 4/505 |
| | | | 429/223 |
| 2016/0032471 A1 | 2/2016 | Magnan et al. | |
| 2016/0258071 A1 | 9/2016 | Magnan et al. | |
| 2016/0265085 A1* | 9/2016 | Bourassa | C25B 9/70 |
| 2016/0304988 A1 | 10/2016 | Vaughan et al. | |
| 2017/0233848 A1 | 8/2017 | Johnson et al. | |
| 2018/0155208 A1* | 6/2018 | Chow | C01D 5/18 |
| 2018/0244531 A1 | 8/2018 | Magnan et al. | |
| 2018/0327287 A1 | 11/2018 | Melsert | |
| 2019/0032227 A1 | 1/2019 | Lipp et al. | |
| 2019/0345582 A1 | 11/2019 | Bourassa et al. | |
| 2020/0087804 A1 | 3/2020 | Magnan et al. | |
| 2020/0115807 A1 | 4/2020 | Magnan et al. | |
| 2020/0376409 A1 | 12/2020 | Magnan et al. | |
| 2020/0407237 A1 | 12/2020 | Bourassa et al. | |
| 2021/0024362 A1 | 1/2021 | Bourassa et al. | |
| 2023/0382753 A1 | 11/2023 | Bourassa et al. | |
| 2023/0416874 A1 | 12/2023 | Bourassa et al. | |
| 2024/0068113 A1 | 2/2024 | Magnan et al. | |

FOREIGN PATENT DOCUMENTS

| | | |
|---|---|---|
| AU | 2012261548 | 1/2013 |
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2624609 C | 4/2007 |
| CA | 2624612 C | 4/2007 |
| CA | 2786317 | 7/2011 |
| CA | 2796849 | 10/2011 |
| CA | 2820112 | 6/2012 |
| CA | 2825583 | 8/2012 |
| CN | 103086405 | 5/2013 |
| CN | 106315625 | 1/2017 |
| CN | 106365181 | 2/2017 |
| CN | 109694957 | 4/2019 |
| DE | 102004012334 A1 | 9/2005 |
| JP | 5795826 | 6/1982 |
| JP | 2000129364 A | 5/2000 |
| JP | 2008166269 | 7/2008 |
| JP | 2009298679 | 12/2009 |
| JP | 2010080394 | 4/2010 |
| JP | 2013028523 | 2/2013 |
| JP | 2013173629 | 9/2013 |
| JP | 2013227180 | 11/2013 |
| JP | 2016162601 A | 9/2016 |
| RU | 2196735 | 1/2003 |
| SU | 310538 | 8/1974 |
| WO | 9859385 | 12/1998 |
| WO | 2004040677 | 5/2004 |
| WO | 2007039665 | 4/2007 |
| WO | 2010056322 | 5/2010 |
| WO | 2010103173 | 9/2010 |
| WO | 2011114000 | 9/2011 |
| WO | 2011133165 | 10/2011 |
| WO | 2011148040 | 12/2011 |
| WO | 2011156861 | 12/2011 |
| WO | 2012145797 | 11/2012 |
| WO | 2013140039 | 9/2013 |
| WO | 2013153692 | 10/2013 |
| WO | 2013159194 | 10/2013 |
| WO | 2013182749 | 12/2013 |
| WO | 2014040138 | 3/2014 |
| WO | 2014138933 | 9/2014 |
| WO | 2015058287 | 4/2015 |
| WO | 2015081385 | 6/2015 |
| WO | 2015123762 | 8/2015 |
| WO | 2016054683 | 4/2016 |
| WO | 2017144469 | 8/2017 |
| WO | 2017157906 | 9/2017 |
| WO | 2018087697 | 5/2018 |
| WO | 2018223192 | 12/2018 |
| WO | 2018223193 | 12/2018 |
| WO | 2018227237 | 12/2018 |
| WO | 2018234614 | 12/2018 |
| WO | 2019059654 | 3/2019 |

OTHER PUBLICATIONS

Kim et al., "Synthesis of High-Density Nickel Cobalt Aluminum Hydroxide by Continuous Coprecipitation Method", ACS Appl. Mater. Interfaces (Jan. 10, 2012), 4, 586-589.

English Translation—Machine Generated of de102004012334A1, "Method for preparing metal hydroxide from sparingly soluble salt, useful particularly for making lithium hydroxide, uses an electrodialysis cell, supplied with concentrated aqueous salt solution", published on Sep. 22, 2005.

English Translation—Machine Generated of CN103086405A, "Clean Production Method of Battery Level Lithium Carbonate", published on May 8, 2013.

English Translation—Machine Generated of CN109694957A, "A Lithium Ion Battery using Ion Liquid Extraction Method of the Metal Ion of the Leachate", published on Apr. 30, 2019.

English Translation—Machine Generated of JP2008166269A, "Li—Ni Compound Oxide Particle Powder for Nonaqueous Electrolyte Secondary Battery and its Manufacturing Method, as well as Nonaqueous Electrolyte Secondary Battery", published on Jul. 17, 2008.

English Translation—Machine Generated of JP2009298679A, "Production Method of Aluminum-Containing Nickel Hydroxide Particle", published on Dec. 24, 2009.

English Translation—Machine Generated of CN106315625(A), "Method for Composite Production of High-Purity Lithium Hydroxide Monohydrate, High-Purity Lithium Carbonate and Battery Grade Lithium Carbonate", published on Jan. 11, 2017.

English Translation—Machine Generated of CN106365181(A), "Method of Preparing Battery-Grade Lithium Carbonate from Lithium-Rich Solution being High in Content of Impurities", published on Feb. 1, 2017.

English Translation of WO2013153692A1, "Method for Recovering Lithium", published on Oct. 17, 2013.

English Translation—Machine Generated of WO2019059654A1, "Cathode Active Material Precursor for Secondary Battery, Cathode Active Material, and Lithium Secondary Battery Comprising Same", published on Mar. 28, 2019.

English Translation—Machine Translation of JP2000129364A, "Method for Recovering Metal", published on May 9, 2000.

Communication pursuant to Rule 114(2) EPC—Third Party Observation for application No. EP3713877 dated Apr. 17, 2023.

English Translation—Machine Generated of Abstract JP2013028523A, "Method for Producing Manganese Oxide", published on Feb. 7, 2013.

English Translation—Machine Generated of Description SU310538A1, published on Aug. 5, 1974.

English Translation—Machine Translation of JP2016162601A, "Method of Manufacturing Positive Electrode Material for Lithium Ion Battery, Positive Electrode Active Material for Lithium Ion Battery, Positive Electrode for Lithium Battery, and Lithium Ion Battery", published on Sep. 5, 2016.

English Abstract of China Lithium Products Tech. Co., Ltd., "Lithium Hydroxide Purified Grade", Published on Jun. 6, 2011.

English Abstract of PH12013501570A1, "Improved Method of Ore Processing", published on Sep. 30, 2013.

(56) References Cited

OTHER PUBLICATIONS

English Abstract of Scribd, "Extraction, Properties and Use of Lithium", Published on Feb. 2, 2009.

English Abstract of Sun et al., "Preparation of Li2CO3 by Gas-Liquid Reactive Crystallization of LiOH and CO2", Published on Jan. 31, 2012.

Tipping et al., "Conditions Required for the Precipitation of Aluminium in Acidic Natural Waters", Wat. Res. Vol. 22, No. 5, pp. 585-592, 1988. (The year of publication is sufficiently earlier than the effective U.S. filing date so that the particular month of publication is not an issue).

Communication pursuant to Rule 114(2) EPC—Third Party Observation for application No. EP20140764466 dated Jan. 13, 2021.

English Abstract of CL2012002968(A1), "Method for preparing lithium carbonate from brines containing lithium chloride which comprises contacting the salumera with sodium hydroxide and then contacting with carbon dioxide", published on Jan. 11, 2013.

English Abstract of CN102030346 (A), "Preparation method for lithium carbonate", Published on Apr. 27, 2011.

English Abstract of CN106315625A, "Method for Composite Production of High-Purity Lithium Hydroxide Monohydrate, High-Purity Lithium Carbonate and Battery Grade Lithium Carbonate", published on Jan. 11, 2017.

English Abstract of CN106365181A, "Method of Preparing Battery-Grade Lithium Carbonate from Lithium-Rich Solution Being High in Content of Impurities", published on Feb. 1, 2017.

English Abstract of JP62161973A, "Production of High-Purity Lithium Carbonate", Published on Jul. 17, 1987.

English Abstract of JP2004196606(A), "Method for Manufacturing High Purity Lithium Carbonate", Published on Jul. 15, 2004.

English Abstract of JP2004196607(A), "Method for Manufacturing High Purity Lithium Carbonate", Published on Jul. 15, 2004.

English Abstract of JP2009046390(A), "Production Method of High Purity Lithium Carbonate", Published on Mar. 5, 2009.

English Abstract of JP2009057278(A), "Method of Manufacturing High Purity Lithium Carbonate", Published on Mar. 19, 2009.

English Abstract of JP2009270188(A), "Method of Manufacturing High-Purity Lithium Hydroxide", published on Nov. 19, 2009.

English Abstract of JP2009270189A, "Method of Manufacturing High-Purity Lithium Hydroxide", published on Nov. 19, 2009.

English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.

English Abstract of JP2011031232, "Method of Manufacturing Lithium Hydroxide", published on Feb. 17, 2011.

English Abstract of JP2013173629A, "Method of Producing High-Purity Lithium Hydroxide", Published on Sep. 5, 2013.

English Abstract of JPS5443174(A), "Preparation of Lithium Hydroxide", Published on Apr. 5, 1979.

English Abstract of KR20130092323(A), "Lithium Compound Recovering Device, Method for Recovering Lithium Compound and Lithium Compound Recovering System", published on Aug. 20, 2013.

English Abstract—Machine Translation of JP2013227180A, "Method for Producing Lithium Sulfide", published on Nov. 7, 2013.

English Abstract—Machine Translation of JPS5798826A, "Manufacture of High Purity Lithium Salt of Mineral Acid", published on Jun. 14, 1982.

English Abstract of Helmold v. Plessen, Heinz Kau, "Utilization of sodium sulphate", Chem.-Ing.-Tech. 61 (1989) 12, pp. 933-940. (The year of publication is sufficiently earlier than the effective U.S. filing date so that the particular month of publication is not an issue).

English Translation—Machine Generated of JP2010080394A, "Positive Electrode Active Material for Nonaqueous Electrolyte Secondary Battery and Manufacturing Method Therefor, and Nonaqueous Electrolyte Secondary Battery", Published on Apr. 8, 2010.

English Translation of RU2196735C1, "Method for Producing High Purity Lithium Hydroxide Monohydrate From Materials Containing Lithium Carbonate", Published on Jan. 20, 2003.

Koter et al., "Electromembrane Processes in Environment Protection", Polish Journal of Environmental Studies vol. 9, No. 1 (2000), 45-56.

John Jacco Krol, "Monopolar and Bipolar Ion Exchange Membranes", Mass Transport Limitations, published on Aug. 25, 1969.

Ogawa et al., "Effects of the Chemical Compositions of Salars de Uyuni and Atacama Brines on Lithium Concentration during Evaporation" Resource Geology, vol. 64, No. 2: 91-101, Mar. 2014.

Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7 (Feb. 2004).

Sitando et al., "Processing of a Zimbabwean Petalite To Obtain Lithium Carbonate", International Journal of Mineral Processing, 102-103 (2012) 45-50 (Available Online: Oct. 1, 2011).

Tongwen Xu, "Ion exchange membranes: State of their development and perspective", Journal of Membrane Science 263 (2005) 1-29.

Ulrich Joachim, "Crystallization", Kirk Othmer Encyclopedia of Chemical Technology, vol. 8 (Aug. 16, 2002), pp. 95-147.

Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.

* cited by examiner

PROCESSES FOR PREPARING HYDROXIDES AND OXIDES OF VARIOUS METALS AND DERIVATIVES THEREOF

CROSS-REFERENCE TO RELATES APPLICATIONS

The present disclosure is a continuation of U.S. Ser. No. 18/090,322 filed on Dec. 28, 2022, that is a continuation of U.S. Ser. No. 17/477,553 filed on Sep. 17, 2021 (issued as U.S. Pat. No. 11,542,175 on Jan. 3, 2023), that is a continuation of U.S. Ser. No. 16/766,287 filed on May 22, 2020 (issued as U.S. Pat. No. 11,142,466 on Oct. 12, 2021), that is a 35 USC 371 national stage entry of PCT/CA2018/051487 filed on Nov. 22, 2018 and which claims priority to U.S. application No. 62/590,260 filed and Nov. 22, 2017; and to U.S. application No. 62/735,013 filed and Sep. 21, 2018. These documents are hereby incorporated by reference in their entirety.

TECHNICAL FIELD

The present disclosure relates to improvements in the field of processes for preparing metal hydroxides and metal oxides that contain at least one metal chosen from nickel, cobalt, manganese, lithium and aluminum. For example, such material can be useful in the manufacture of cathode materials for ion batteries.

BACKGROUND OF THE DISCLOSURE

Processes for preparing nickel-cobalt-manganese hydroxides, nickel-cobalt-aluminum hydroxides, lithium-cobalt hydroxides, nickel-cobalt-manganese oxyhydroxides, nickel-cobalt-aluminum oxyhydroxides, lithium-cobalt oxyhydroxides, nickel-cobalt-manganese oxides, nickel-cobalt-aluminum oxides and lithium-cobalt oxides are known. However, processes known for example lead to high costs in the production of such hydroxides and oxides as well as consumption of various chemicals.

There is thus a need for at least an alternative process for preparing such hydroxides or oxides.

SUMMARY OF THE DISCLOSURE

Therefore according to an aspect of the present disclosure, there is provided a process for preparing a metal hydroxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with lithium hydroxide and optionally a chelating agent in order to obtain a solid comprising the metal hydroxide and a liquid comprising lithium sulfate;

separating the liquid and the solid from one another to obtain the metal hydroxide;

submitting the liquid comprising lithium sulfate to an electromembrane process for converting the lithium sulfate into lithium hydroxide; and reusing the lithium hydroxide obtained by the electromembrane process for reacting with the metal sulfate.

According to another aspect, there is provided a process for preparing a metal oxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with lithium hydroxide and optionally a chelating agent to obtain a solid comprising a metal hydroxide comprising (i) at least one metal chosen from nickel and cobalt and optionally (ii) at least one metal chosen from manganese, lithium and aluminum, and a liquid comprising lithium sulfate;

separating the liquid and the solid from one another to obtain the metal hydroxide;

submitting the liquid comprising lithium sulfate to an electromembrane process for converting the lithium sulfate into lithium hydroxide; and reusing at least a first portion of the lithium hydroxide obtained by the electromembrane process for reacting with the metal sulfate;

reacting at least a second portion of the lithium hydroxide obtained by the electromembrane process with the obtained metal hydroxide to obtain a mixture of metal hydroxides; and roasting the mixture of metal hydroxides to obtain the metal oxide.

According to another aspect of the present disclosure, there is provided a process for preparing a metal hydroxide comprising at least one metal chosen from nickel, cobalt, manganese, lithium and aluminum, the process comprising:

reacting a metal sulfate comprising at least one metal chosen from nickel, cobalt, manganese, lithium and aluminum with a base and optionally a chelating agent in order to obtain a solid comprising the metal hydroxide and a liquid comprising lithium sulfate;

separating the liquid and the solid from one another to obtain the metal hydroxide;

submitting the liquid comprising lithium sulfate to an electromembrane process for converting the lithium sulfate into lithium hydroxide; and reusing the lithium hydroxide obtained by the electromembrane process for reacting with the metal sulfate.

According to another aspect, there is provided a process for preparing a metal oxide comprising at least one metal chosen from nickel, cobalt, manganese, lithium and aluminum, the process comprising:

reacting a metal sulfate comprising at least one metal chosen from nickel, cobalt, manganese, lithium and aluminum with a base and optionally a chelating agent to obtain a solid comprising a metal hydroxide at least one metal chosen from nickel, cobalt, manganese, lithium and aluminum, and a liquid comprising lithium sulfate;

separating the liquid and the solid from one another to obtain the metal hydroxide;

submitting the liquid comprising lithium sulfate to an electromembrane process for converting the lithium sulfate into lithium hydroxide; and reusing at least a first portion of the lithium hydroxide obtained by the electromembrane process for reacting with the metal sulfate;

reacting at least a second portion of the lithium hydroxide obtained by the electromembrane process with the obtained metal hydroxide to obtain a mixture of metal hydroxides; and roasting the mixture of metal hydroxides to obtain the metal oxide.

According to an aspect of the present disclosure, there is provided a process for preparing a metal hydroxide comprising (i) at least one metal chosen from nickel and cobalt and optionally (ii) at least one metal chosen from manganese, lithium and aluminum, the process comprising:

reacting a metal sulfate and/or a metal nitrate comprising (i) at least one metal chosen from nickel and cobalt and optionally (ii) at least one metal chosen from manganese, lithium and aluminum with lithium hydroxide, sodium hydroxide and/or potassium hydroxide and optionally a chelating agent in order to obtain a solid comprising the metal hydroxide and a liquid comprising at least one of lithium sulfate, lithium nitrate, sodium sulfate, sodium nitrate, potassium sulfate, potassium nitrate;

separating the liquid and the solid from one another to obtain the metal hydroxide;

submitting the liquid comprising at least one of lithium sulfate, lithium nitrate, sodium sulfate, sodium nitrate, potassium sulfate and potassium nitrate to an electromembrane process for converting the least one of lithium sulfate, lithium nitrate, sodium sulfate, sodium nitrate, potassium sulfate, potassium nitrate, into at least one of least one of lithium hydroxide, sodium hydroxide, potassium hydroxide; and reusing the at least one of lithium hydroxide, sodium hydroxide and potassium hydroxide obtained by the electromembrane process for reacting with the metal sulfate and/or metal nitrate.

According to another aspect, there is provided a process for preparing a metal oxide comprising (i) at least one metal chosen from nickel and cobalt and optionally (ii) at least one metal chosen from manganese, lithium and aluminum, the process comprising:

reacting a metal sulfate and/or a metal nitrate comprising (i) at least one metal chosen from nickel and cobalt and optionally (ii) at least one metal chosen from manganese, lithium and aluminum with lithium hydroxide, sodium hydroxide and/or potassium hydroxide and optionally a chelating agent to obtain a solid comprising a metal hydroxide comprising (i) at least one metal chosen from nickel and cobalt and optionally (ii) at least one metal chosen from manganese, lithium and aluminum, and a liquid comprising at least one of lithium sulfate, lithium nitrate, sodium sulfate, sodium nitrate, potassium sulfate and potassium nitrate;

separating the liquid and the solid from one another to obtain the metal hydroxide;

submitting the liquid comprising at least one of lithium sulfate, lithium nitrate, sodium sulfate, sodium nitrate, potassium sulfate and potassium nitrate to an electromembrane process for converting the at least one of lithium sulfate, lithium nitrate, sodium sulfate, sodium nitrate, potassium sulfate and potassium nitrate into at least one of least one of lithium hydroxide, sodium hydroxide and potassium hydroxide; and reusing at least a first portion of the at least one of lithium hydroxide, sodium hydroxide and potassium hydroxide obtained by the electromembrane process for reacting with the metal sulfate and/or the metal nitrate;

reacting at least a second portion of the at least one of lithium hydroxide, sodium hydroxide and potassium hydroxide obtained by the electromembrane process with the obtained metal hydroxide to obtain a mixture of metal hydroxides; and roasting the mixture of metal hydroxides to obtain the metal oxide.

According to another aspect of the present disclosure, there is provided a process for preparing a metal hydroxide comprising at least one metal chosen from nickel, cobalt, manganese, lithium and aluminum, the process comprising:

reacting a metal sulfate and/or a metal nitrate comprising at least one metal chosen from nickel, cobalt, manganese, lithium and aluminum with a base and optionally a chelating agent in order to obtain a solid comprising the metal hydroxide and a liquid comprising at least one of lithium sulfate, lithium nitrate, sodium sulfate, sodium nitrate, potassium sulfate and potassium nitrate;

separating the liquid and the solid from one another to obtain the metal hydroxide;

submitting the liquid comprising at least one of lithium sulfate, lithium nitrate, sodium sulfate, sodium nitrate, potassium sulfate and potassium nitrate to an electromembrane process for converting the least one of lithium sulfate, lithium nitrate, sodium sulfate, sodium nitrate, potassium sulfate and potassium nitrate into at least one of lithium hydroxide, sodium hydroxide and potassium hydroxide; and reusing the at least one of lithium hydroxide, sodium hydroxide and potassium hydroxide obtained by the electromembrane process for reacting with the metal sulfate and/or the metal nitrate.

According to another aspect, there is provided a process for preparing a metal oxide comprising at least one metal chosen from nickel, cobalt, manganese, lithium and aluminum, the process comprising:

reacting a metal sulfate and/or a metal nitrate comprising at least one metal chosen from nickel, cobalt, manganese, lithium and aluminum with a base and optionally a chelating agent to obtain a solid comprising a metal hydroxide comprising at least one metal chosen from nickel, cobalt, manganese, lithium and aluminum, and a liquid comprising at least one of lithium sulfate, lithium nitrate, sodium sulfate, sodium nitrate, potassium sulfate and potassium nitrate;

separating the liquid and the solid from one another to obtain the metal hydroxide;

submitting the liquid comprising the at least one of lithium sulfate, lithium nitrate, sodium sulfate, sodium nitrate, potassium sulfate and potassium nitrate to an electromembrane process for converting the at least one of lithium sulfate, lithium nitrate, sodium sulfate, sodium nitrate, potassium sulfate and potassium nitrate into at least one of lithium hydroxide, sodium hydroxide and potassium hydroxide; and reusing at least a first portion of the at least one of lithium hydroxide, sodium hydroxide and potassium hydroxide obtained by the electromembrane process for reacting with the metal sulfate and/or metal nitrate;

reacting at least a second portion of the at least one of lithium hydroxide, sodium hydroxide and potassium hydroxide obtained by the electromembrane process with the obtained metal hydroxide to obtain a mixture of metal hydroxides; and roasting the mixture of metal hydroxides to obtain the metal oxide.

According to another aspect of the present disclosure, there is provided a process for preparing a metal hydroxide comprising at least one metal chosen from nickel, cobalt, manganese, lithium and aluminum, the process comprising:

reacting a first metal sulfate and/or a first metal nitrate comprising at least one metal chosen from nickel, cobalt, manganese, lithium and aluminum with a base comprising a second metal and optionally a chelating agent in order to obtain a solid comprising the metal hydroxide and a liquid comprising at least one of a second metal sulfate and a second metal nitrate;

separating the liquid and the solid from one another to obtain the metal hydroxide;

submitting the liquid comprising at least one of the second metal sulfate and the second metal nitrate to an electromembrane process for converting at least one of the second metal sulfate and the second metal nitrate into a second metal hydroxide; and reusing the second metal hydroxide obtained by the electromembrane process for reacting with the first metal sulfate and/or the first metal nitrate.

According to another aspect, there is provided a process for preparing a metal oxide comprising at least one metal chosen from nickel, cobalt, manganese, lithium and aluminum, the process comprising:

reacting a first metal sulfate and/or a first metal nitrate comprising at least one metal chosen from nickel, cobalt, manganese, lithium and aluminum with a base comprising a second metal and optionally a chelating agent to obtain a solid comprising a metal hydroxide comprising at least one metal chosen from nickel, cobalt, manganese, lithium and aluminum, and a liquid comprising at least one of a second metal sulfate and a second metal nitrate;

separating the liquid and the solid from one another to obtain the metal hydroxide;

submitting the liquid comprising the at least one of a second metal sulfate and a second metal nitrate to an electromembrane process for converting the at least one of a second metal sulfate and a second metal nitrate into a second metal hydroxide; and reusing at least a first portion of the second metal hydroxide obtained by the electromembrane process for reacting with the first metal sulfate and/or the first metal nitrate;

reacting at least a second portion of the second metal hydroxide obtained by the electromembrane process with the obtained metal hydroxide to obtain a mixture of metal hydroxides; and roasting the mixture of metal hydroxides to obtain the metal oxide.

According to another aspect, there is provided a process for preparing a metal hydroxide comprising (i) at least one metal chosen from nickel and cobalt and optionally (ii) at least one metal chosen from manganese, lithium and aluminum, the process comprising:

reacting a metal sulfate and/or a metal nitrate comprising (i) at least one metal chosen from nickel and cobalt and optionally (ii) at least one metal chosen from manganese, lithium and aluminum with lithium hydroxide, sodium hydroxide and/or potassium hydroxide and optionally a chelating agent in order to obtain a solid comprising the metal hydroxide and a liquid comprising at least one of lithium sulfate, lithium nitrate, sodium sulfate, sodium nitrate, potassium sulfate and potassium nitrate;

separating the liquid and the solid from one another to obtain the metal hydroxide;

submitting the liquid comprising at least one of lithium sulfate, lithium nitrate, sodium sulfate, sodium nitrate to an electromembrane process for converting the least one of lithium sulfate, lithium nitrate, sodium sulfate, sodium nitrate, potassium sulfate and potassium nitrate into at least one of least one of lithium hydroxide, sodium hydroxide and potassium hydroxide; and reusing the at least one of lithium hydroxide, sodium hydroxide and potassium hydroxide obtained by the electromembrane process for reacting with the metal sulfate and/or metal nitrate.

According to another aspect there is provided a process for preparing a metal hydroxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with lithium hydroxide, sodium hydroxide and/or potassium hydroxide and optionally a chelating agent in order to obtain a solid comprising the metal hydroxide and a liquid comprising at least one of lithium sulfate, sodium sulfate and potassium sulfate;

separating the liquid and the solid from one another to obtain the metal hydroxide;

submitting the liquid comprising at least one of lithium sulfate, sodium sulfate and potassium sulfate to an electromembrane process for converting the least one of lithium sulfate, sodium sulfate and potassium sulfate into at least one of least one of lithium hydroxide, sodium hydroxide and potassium hydroxide; and reusing the at least one of lithium hydroxide, sodium hydroxide and potassium hydroxide obtained by the electromembrane process for reacting with the metal sulfate.

According to another aspect there is provided a process a process for preparing a metal hydroxide comprising at least one metal chosen from nickel, cobalt, manganese, lithium and aluminum, the process comprising:

reacting a metal sulfate and/or a metal nitrate comprising at least one metal chosen from nickel, cobalt, manganese, lithium and aluminum with a base chosen from LiOH, NaOH, KOH, RbOH, CsOH, $Mg(OH)_2$, $Ca(OH)_2$, $Sr(OH)_2$, or $Ba(OH)_2$ and optionally a chelating agent in order to obtain a solid comprising the metal hydroxide and a liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$, separating the liquid and the solid from one another to obtain the metal hydroxide;

submitting the liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ to an electromembrane process for converting the least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca$ $(NO_3)_2$, $Sr(NO_3)_2$ and $Ba(NO_3)_2$ into at least one of LiOH, NaOH, KOH, RbOH, CsOH, $Mg(OH)_2$, $Ca(OH)_2$, $Sr(OH)_2$, and $Ba(OH)_2$; and reusing the at least one of LiOH, NaOH, KOH, RbOH, CsOH, $Mg(OH)_2$, $Ca(OH)_2$, $Sr(OH)_2$, and $Ba(OH)_2$ obtained by the electromembrane process for reacting with the metal sulfate and/or the metal nitrate.

According to another aspect, there is provided a process for preparing a metal oxide comprising (i) at least one metal chosen from nickel and cobalt and optionally (ii) at least one metal chosen from manganese, lithium and aluminum, said process comprising:

reacting a metal sulfate and/or a metal nitrate comprising at least one metal chosen from nickel, cobalt, manganese, lithium and aluminum with a base chosen from LiOH, NaOH, KOH, RbOH, CsOH, $Mg(OH)_2$, $Ca(OH)_2$, $Sr(OH)_2$, or $Ba(OH)_2$ and optionally a chelating agent in order to obtain a solid comprising the metal hydroxide and a liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$, separating said liquid and said solid from one another to obtain said metal hydroxide;

submitting said liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ to an electromembrane process for converting at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ into at least one of LiOH, NaOH, KOH, RbOH, CsOH, $Mg(OH)_2$, $Ca(OH)_2$, $Sr(OH)_2$, or $Ba(OH)_2$; and reusing at least a first portion of said at least one of LiOH, NaOH, KOH, RbOH, CsOH, $Mg(OH)_2$, $Ca(OH)_2$, $Sr(OH)_2$, or $Ba(OH)_2$ obtained by said electromembrane process for reacting with said metal sulfate;

reacting at least a second portion of said at least one of LiOH, NaOH, KOH, RbOH, CsOH, $Mg(OH)_2$, $Ca(OH)_2$, $Sr(OH)_2$, or $Ba(OH)_2$ obtained by said electromembrane process with said obtained metal hydroxide to obtain a mixture of metal hydroxides; and roasting said mixture of metal hydroxides to obtain said metal oxide.

According to an aspect of the present disclosure, there is provided a process for preparing a metal carbonate comprising (i) at least one metal chosen from nickel and cobalt and optionally (ii) at least one metal chosen from manganese, lithium and aluminum, the process comprising:

reacting a metal sulfate and/or a metal nitrate comprising (i) at least one metal chosen from nickel and cobalt and optionally (ii) at least one metal chosen from manganese, lithium and aluminum with lithium carbonate, sodium carbonate and/or potassium carbonate and optionally a chelating agent in order to obtain a solid comprising the metal carbonate and a liquid comprising at least one of lithium sulfate, lithium nitrate, sodium sulfate, sodium nitrate, potassium sulfate, potassium nitrate;

separating the liquid and the solid from one another to obtain the metal carbonate;

submitting the liquid comprising at least one of lithium sulfate, lithium nitrate, sodium sulfate, sodium nitrate, potassium sulfate and potassium nitrate to an electromembrane process for converting the least one of lithium sulfate, lithium nitrate, sodium sulfate, sodium nitrate, potassium sulfate, potassium nitrate, into at least one of least one of lithium hydroxide, sodium hydroxide and potassium hydroxide;

converting the at least one of least one of lithium hydroxide, sodium hydroxide, potassium hydroxide into at least one of at least one of least one of lithium carbonate, sodium carbonate and potassium hydroxide by a carbonatation process; and reusing the at least one of lithium carbonate, sodium carbonate and potassium hydroxide obtained by the carbonatation process for reacting with the metal sulfate and/or metal nitrate.

According to another aspect, there is provided a process for preparing a metal oxide comprising (i) at least one metal chosen from nickel and cobalt and optionally (ii) at least one metal chosen from manganese, lithium and aluminum, the process comprising:

reacting a metal sulfate and/or a metal nitrate comprising (i) at least one metal chosen from nickel and cobalt and optionally (ii) at least one metal chosen from manganese, lithium and aluminum with lithium carbonate, sodium carbonate and/or potassium carbonate and optionally a chelating agent to obtain a solid comprising a metal carbonate comprising (i) at least one metal chosen from nickel and cobalt and optionally (ii) at least one metal chosen from manganese, lithium and aluminum, and a liquid comprising at least one of lithium sulfate, lithium nitrate, sodium sulfate, sodium nitrate, potassium sulfate and potassium nitrate;

separating the liquid and the solid from one another to obtain the metal carbonate;

submitting the liquid comprising at least one of lithium sulfate, lithium nitrate, sodium sulfate, sodium nitrate, potassium sulfate and potassium nitrate to an electromembrane process for converting the at least one of lithium sulfate, lithium nitrate, sodium sulfate, sodium nitrate, potassium sulfate and potassium nitrate into at least one of least one of lithium hydroxide, sodium hydroxide and potassium hydroxide; and converting the at least one of least one of lithium hydroxide, sodium hydroxide, potassium hydroxide into at least one of at least one of least one of lithium carbonate, sodium carbonate and potassium carbonate by a carbonatation process; and reusing at least a first portion of the at least one of lithium carbonate, sodium carbonate and potassium carbonate obtained by the carbonatation process for reacting with the metal sulfate and/or the metal nitrate;

reacting at least a second portion of the at least one of lithium carbonate, sodium carbonate and potassium carbonate obtained by the carbonatation process with the obtained metal carbonate to obtain a mixture of metal carbonates; and roasting the mixture of metal carbonates to obtain the metal oxide.

According to another aspect of the present disclosure, there is provided a process for preparing a metal carbonate comprising at least one metal chosen from nickel, cobalt, manganese, lithium and aluminum, the process comprising:

reacting a first metal sulfate and/or a first metal nitrate comprising at least one metal chosen from nickel, cobalt, manganese, lithium and aluminum with a base comprising a second metal and optionally a chelating agent in order to obtain a solid comprising the metal carbonate and a liquid comprising at least one of a second metal sulfate and a second metal nitrate;

separating the liquid and the solid from one another to obtain the metal carbonate;

submitting the liquid comprising at least one of the second metal sulfate and the second metal nitrate to an electromembrane process for converting at least one of the second metal sulfate and the second metal nitrate into a second metal hydroxide;

converting the second metal hydroxide into a second metal carbonate that is at least one lithium carbonate, sodium carbonate and potassium carbonate by a carbonatation process; and reusing the second metal carbonate obtained by the carbonatation process for reacting with the first metal sulfate and/or the first metal nitrate.

According to another aspect, there is provided a process for preparing a metal oxide comprising at least one metal chosen from nickel, cobalt, manganese, lithium and aluminum, the process comprising:

reacting a first metal sulfate and/or a first metal nitrate comprising at least one metal chosen from nickel, cobalt, manganese, lithium and aluminum with a base comprising a second metal and optionally a chelating agent to obtain a solid comprising a metal carbonate comprising at least one metal chosen from nickel, cobalt, manganese, lithium and aluminum, and a liquid comprising at least one of a second metal sulfate and a second metal nitrate;

separating the liquid and the solid from one another to obtain the metal carbonate;

submitting the liquid comprising the at least one of a second metal sulfate and a second metal nitrate to an electromembrane process for converting the at least one of a second metal sulfate and a second metal nitrate into a second metal hydroxide;

converting the second metal hydroxide into a second metal carbonate that is at least one of lithium carbonate, sodium carbonate and potassium carbonate by a carbonatation process; and reusing at least a first portion of the second metal carbonate obtained by the carbonatation process for reacting with the first metal sulfate and/or the first metal nitrate;

reacting at least a second portion of the second metal carbonate obtained by the carbonatation process with the obtained metal hydroxide to obtain a mixture of metal carbonates; and roasting the mixture of metal carbonates to obtain the metal oxide.

According to another aspect, there is provided a process for preparing a metal hydroxide comprising (i) at least one metal chosen from nickel and cobalt and optionally (ii) at least one metal chosen from manganese, lithium and aluminum, said process comprising:

reacting a metal sulfate comprising (i) lithium; (ii) at least one metal chosen from nickel and cobalt and optionally (iii) at least one metal chosen from manganese and aluminum with sodium hydroxide and optionally a chelating agent in order to obtain a solid comprising said metal hydroxide and a liquid comprising sodium sulfate and lithium sulfate;

separating said liquid and said solid from one another to obtain said metal hydroxide;

submitting said liquid comprising sodium sulfate and lithium sulfate to an electromembrane process for converting said sodium sulfate and said lithium sulfate into sodium hydroxide and lithium hydroxide; and reusing said sodium hydroxide obtained by said electromembrane process for reacting with said metal sulfate.

According to another aspect, there is provided a process for preparing a metal hydroxide comprising (i) at least one metal chosen from nickel and cobalt and optionally (ii) at least one metal chosen from manganese, lithium and aluminum, said process comprising:

reacting a metal sulfate comprising (i) lithium; (ii) at least one metal chosen from nickel and cobalt and optionally (iii) at least one metal chosen from manganese and aluminum with sodium hydroxide and optionally a chelating agent in order to obtain a solid comprising said metal hydroxide and a liquid comprising sodium sulfate and lithium sulfate;

separating said liquid and said solid from one another to obtain said metal hydroxide;

separating sodium sulfate and lithium sulfate from one another;

submitting said liquid comprising sodium sulfate to an electromembrane process for converting said sodium sulfate into sodium hydroxide; and reusing said sodium hydroxide obtained by said electromembrane process for reacting with said metal sulfate.

According to another aspect, there is provided a process for preparing a metal hydroxide comprising (i) at least one metal chosen from nickel and cobalt and optionally (ii) at least one metal chosen from manganese, lithium and aluminum, said process comprising:

reacting a metal sulfate comprising (i) at least one metal chosen from nickel and cobalt and optionally (ii) at least one metal chosen from manganese, lithium and aluminum with sodium hydroxide and optionally a chelating agent in order to obtain a solid comprising said metal hydroxide and a liquid comprising sodium sulfate;

separating said liquid and said solid from one another to obtain said metal hydroxide;

submitting said liquid comprising sodium sulfate to an electromembrane process for converting said sodium sulfate into sodium hydroxide; and reusing said sodium hydroxide obtained by said electromembrane process for reacting with said metal sulfate.

According to another aspect there is provided a process a process for preparing a metal carbonate comprising at least one metal chosen from nickel, cobalt, manganese, lithium and aluminum, the process comprising: reacting a metal sulfate and/or a metal nitrate comprising at least one metal chosen from nickel, cobalt, manganese, lithium and aluminum with a base chosen from $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ and optionally a chelating agent in order to obtain a solid comprising the metal carbonate and a liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$, separating the liquid and the solid from one another to obtain the metal hydroxide;

submitting the liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ to an electromembrane process for converting the least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ into at least one of LiOH, NaOH, KOH, RbOH, CsOH, $Mg(OH)_2$, $Ca(OH)_2$, $Sr(OH)_2$, and $Ba(OH)_2$;

converting the at least one of LiOH, NaOH, KOH, RbOH, CsOH, $Mg(OH)_2$, $Ca(OH)_2$, $Sr(OH)_2$, and $Ba(OH)_2$ into $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ by a carbonatation process; and reusing the at least one of $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ obtained by the carbonatation process for reacting with the metal sulfate and/or the metal nitrate.

According to another aspect, there is provided a process for preparing a metal oxide comprising (i) at least one metal chosen from nickel and cobalt and optionally (ii) at least one metal chosen from manganese, lithium and aluminum, said process comprising:

reacting a metal sulfate and/or a metal nitrate comprising at least one metal chosen from nickel, cobalt, manganese, lithium and aluminum with a base chosen from $Li_2CO_3$, $Na_2CO_3$, $K_2CO_3$, $Rb_2CO_3$, $Cs_2CO_3$, $MgCO_3$, $CaCO_3$, $SrCO_3$ and $BaCO_3$ and optionally a chelating agent in order to obtain a solid comprising the metal carbonate and a liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$, separating said liquid and said solid from one another to obtain said metal carbonate;

submitting said liquid comprising at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca(NO_3)_2$, $Sr(NO_3)_2$ and $Ba(NO_3)_2$ to an electromembrane process for converting at least one of $Li_2SO_4$ $Na_2SO_4$, $K_2SO_4$, $Rb_2SO_4$, $Cs_2SO_4$, $MgSO_4$, $CaSO_4$, $SrSO_4$, $BaSO_4$, $LiNO_3$ $NaNO_3$, $KNO_3$, $RbNO_3$, $CsNO_3$, $Mg(NO_3)_2$, $Ca$ $(NO_3)_2$, $Sr(NO_3)_2$ and $Ba(NO_3)_2$ into at least one of LiOH, NaOH, KOH, RbOH, CsOH, $Mg(OH)_2$, $Ca(OH)_2$, $Sr(OH)_2$, or $Ba(OH)_2$;

converting the at least one of LiOH, NaOH, KOH, RbOH, CsOH, $Mg(OH)_2$, $Ca(OH)_2$, $Sr(OH)_2$, and $Ba(OH)_2$ into $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ by a carbonatation process; and reusing at least a first portion of said at least one of $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ obtained by said carbonatation process for reacting with said metal sulfate;

reacting at least a second portion of said at least one of $Li_2CO_3$, $Na_2CO_3$, $K_2CO_3$, $Rb_2CO_3$, $CS_2CO_3$, $MgCO_3$, $CaCO_3$, $SrCO_3$ and $BaCO_3$ obtained by said carbonatation process with said obtained metal carbonate to obtain a mixture of metal carbonates; and roasting said mixture of metal carbonates to obtain said metal oxide.

According to another aspect, there is provided a process for preparing a metal oxide comprising (i) at least one metal chosen from nickel and cobalt and optionally (ii) at least one metal chosen from manganese, lithium and aluminum, said process comprising:

reacting a metal sulfate comprising (i) lithium; (ii) at least one metal chosen from nickel and cobalt and optionally (iii) at least one metal chosen from manganese and aluminum with sodium hydroxide and optionally a chelating agent in order to obtain a solid comprising said metal hydroxide and a liquid comprising sodium sulfate and lithium sulfate;

separating said liquid and said solid from one another to obtain said metal hydroxide;

submitting said liquid comprising sodium sulfate and lithium sulfate to an electromembrane process for converting said sodium sulfate and said lithium sulfate into sodium hydroxide and lithium hydroxide;

separating said lithium hydroxide and said sodium hydroxide from one another;

reusing at least a first portion of said sodium hydroxide obtained by said electromembrane process for reacting with said metal sulfate;

reacting at least a first portion of said lithium hydroxide obtained by said electromembrane process with said obtained metal hydroxide to obtain a mixture of metal hydroxides; and roasting said mixture of metal hydroxides to obtain said metal oxide.

According to another aspect, there is provided a process for preparing a metal oxide comprising at least one metal chosen from nickel, cobalt, manganese, lithium and aluminum, the process comprising:

reacting a first metal sulfate and/or a first metal nitrate comprising at least one metal chosen from nickel, cobalt, manganese, lithium and aluminum with a base comprising a second metal and optionally a chelating agent to obtain a solid comprising a metal hydroxide comprising at least one metal chosen from nickel, cobalt, manganese, lithium and aluminum, and a liquid comprising at least one of a second metal sulfate and a second metal nitrate;

separating the liquid and the solid from one another to obtain the metal hydroxide;

submitting the liquid comprising the at least one of a second metal sulfate and a second metal nitrate to an electromembrane process for converting the at least one of a second metal sulfate and a second metal nitrate into a second metal hydroxide; and reusing at least a first portion of the second metal hydroxide obtained by the electromembrane process for reacting with the first metal sulfate and/or the first metal nitrate;

mixing a third metal hydroxide with the obtained metal hydroxide to obtain a mixture of metal hydroxides; and roasting the mixture of metal hydroxides to obtain the metal oxide.

According to another aspect of the present disclosure, there is provided a process for preparing a metal hydroxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with sodium hydroxide and optionally a chelating agent in order to obtain a solid comprising the metal hydroxide and a liquid comprising sodium sulfate;

separating the liquid and the solid from one another to obtain the metal hydroxide;

submitting the liquid comprising sodium sulfate to an electromembrane process for converting the sodium sulfate into sodium hydroxide; and reusing the sodium hydroxide obtained by the electromembrane process for reacting with the metal sulfate.

According to another aspect, there is provided a process for preparing a metal oxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with sodium hydroxide and optionally a chelating agent to obtain a solid comprising a metal hydroxide comprising (i) at least one metal chosen from nickel and cobalt and optionally (ii) at least one metal chosen from manganese, lithium and aluminum, and a liquid comprising lithium sulfate;

separating the liquid and the solid from one another to obtain the metal hydroxide;

submitting the liquid comprising sodium sulfate to an electromembrane process for converting the sodium sulfate into sodium hydroxide; and reusing at least a first portion of the sodium hydroxide obtained by the electromembrane process for reacting with the metal sulfate;

mixing another metal hydroxide with e obtained metal hydroxide to obtain a mixture of metal hydroxides; and roasting the mixture of metal hydroxides to obtain the metal oxide.

According to another aspect, there is provided a process for preparing a metal hydroxide comprising (i) at least one metal chosen from nickel and cobalt and optionally (ii) at least one metal chosen from manganese, lithium and aluminum, said process comprising:

reacting a metal sulfate comprising (i) at least one metal chosen from nickel and cobalt and optionally (iii) at least one metal chosen from manganese and aluminum with sodium hydroxide and optionally a chelating agent in order to obtain a solid comprising said metal hydroxide and a liquid comprising sodium sulfate and optionally lithium sulfate;

separating said liquid and said solid from one another to obtain said metal hydroxide;

submitting said liquid comprising sodium sulfate and optionally lithium sulfate to an electromembrane process for converting said sodium sulfate and optionally said lithium sulfate into sodium hydroxide and optionally lithium hydroxide; and reusing said sodium hydroxide obtained by said electromembrane process for reacting with said metal sulfate.

According to another aspect, there is provided a process for preparing a metal hydroxide comprising (i) at least one metal chosen from nickel and cobalt and optionally (ii) at least one metal chosen from manganese, lithium and aluminum, the process comprising:

reacting a metal sulfate comprising (i) at least one metal chosen from nickel and cobalt and optionally (ii) at least one metal chosen from manganese, lithium and aluminum with lithium hydroxide, sodium hydroxide and/or potassium hydroxide and optionally a chelating agent in order to obtain a solid comprising the metal hydroxide and a liquid comprising lithium sulfate, sodium sulfate and/or potassium sulfate;

separating the liquid and the solid from one another to obtain the metal hydroxide;

submitting the liquid comprising lithium sulfate, sodium sulfate and/or potassium sulfate to an electromembrane process for converting the lithium sulfate, sodium sulfate and/or potassium sulfate into lithium hydroxide, sodium hydroxide and/or potassium hydroxide respectively;

reusing the sodium hydroxide obtained by the electromembrane process for reacting with the metal sulfate; and reusing the lithium hydroxide obtained by the electromembrane process for reacting with the metal sulfate and/or with the metal hydroxide.

According to another aspect, there is provided the use of the metal hydroxide, the metal carbonate and/or the metal oxide obtained from a process described in the present disclosure in the manufacture of a cathode.

According to another aspect, there is provided a method of using the metal hydroxide, the metal carbonate and/or the metal oxide obtained from a process described in the present disclosure, the method comprising incorporating the metal hydroxide, the metal carbonate and/or the metal oxide in the manufacture of a cathode.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
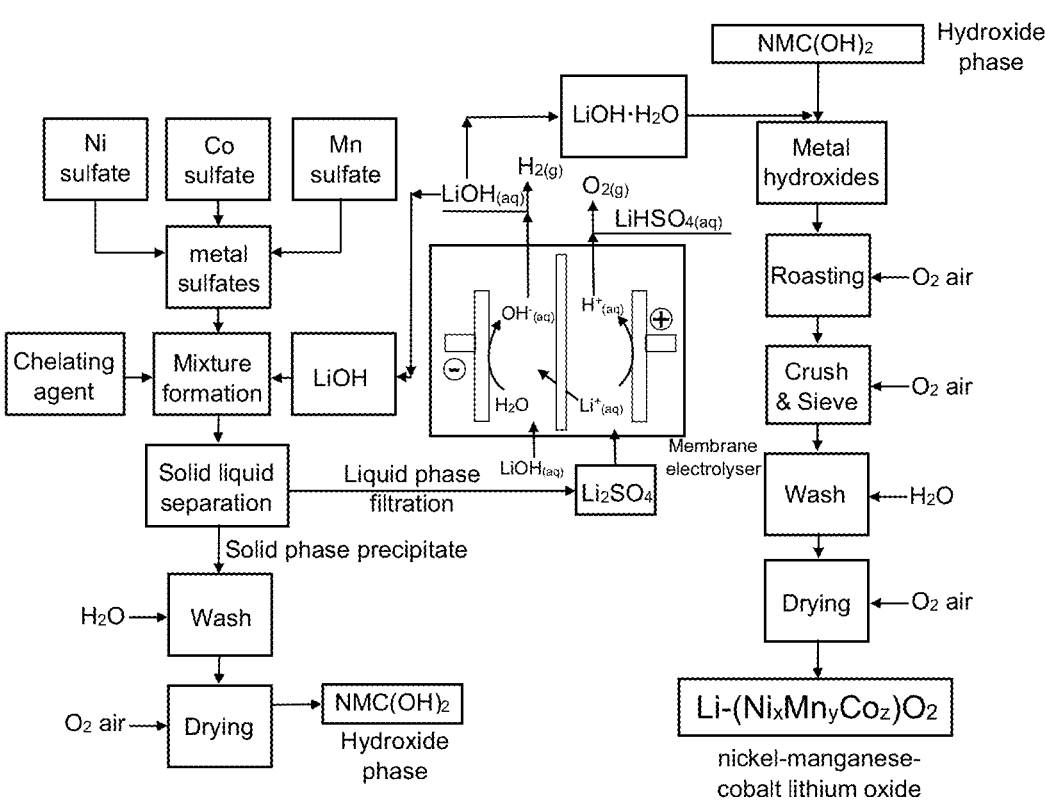
FIG. 1 is a schematic diagram of a process according to an embodiment of the present disclosure.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of $\pm 10\%$ of the modified term if this deviation would not negate the meaning of the word it modifies.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product. A person skilled in the art would understand that all reaction conditions, including, when applicable, for example, reaction time, reaction temperature, reaction pressure, reactant ratio, flow rate, reactant purity, current density, voltage, concentration, pH, oxidation reduction potential, cell area, type of membrane used, and recycle rates can be varied to optimize the yield of the desired product and it is within their skill to do so.

The expression "is at least substantially maintained" as used herein when referring to a value of a pH or a pH range that is maintained during a process of the disclosure or a portion thereof (for example, electrolysis, etc.) refers to maintaining the value of the pH or the pH range at least 75, 80, 85, 90, 95, 96, 97, 98 or 99% of the time during the process or the portion thereof.

The expression "is at least substantially maintained" as used herein when referring to a value of a concentration or a concentration range that is maintained during a process of the disclosure or a portion thereof (for example, electrolysis, etc.) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a process of the disclosure or a portion thereof (for example, electrolysis, etc.) refers to maintaining the value of the temperature or the temperature range at least 75, 80, 85, 90, 95, 96, 97, 98 or 99% of the time during the process or the portion thereof.

The expression "is at least substantially maintained" as used herein when referring to a value of an electrical current density or an electrical current density range that is maintained during a process of the disclosure or a portion thereof (for example, electrolysis, etc.) refers to maintaining the value of the electrical current density or the electrical current density range at least 75, 80, 85, 90, 95, 96, 97, 98 or 99% of the time during the process or the portion thereof.

The expression "is at least substantially maintained" as used herein when referring to a value of an electrical current efficiency or an electrical current efficiency range that is maintained during a process of the disclosure or a portion thereof (for example, electrolysis, etc.) refers to maintaining the value of the electrical current efficiency or the electrical current efficiency range at least 75, 80, 85, 90, 95, 96, 97, 98 or 99% of the time during the process or the portion thereof.

The expression "is at least substantially maintained" as used herein when referring to a value of a voltage or a voltage range that is maintained during a process of the disclosure or a portion thereof (for example, electrolysis, etc.) refers to maintaining the value of the voltage or the voltage range at least 75, 80, 85, 90, 95, 96, 97, 98 or 99% of the time during the process or the portion thereof.

The term "electromembrane process" as used herein refers, for example to a process that uses ion-exchange membrane(s) and an electric potential difference as the driving force for ionic species. The electromembrane process can be, for example (a membrane) electrodialysis or (a membrane) electrolysis. For example, the electromembrane process can be a membrane electrolysis.

The term "carbonatation process" as used herein refers, for example to a process in which a metal hydroxide will be converted into a metal carbonate. For example, such a process can involve the use of gaseous $CO_2$. For example, such a process can involve bubbling of $CO_2$.

The below presented examples are non-limitative and are used to better exemplify the processes of the present disclosure.

For example, the hydroxide can be chosen from nickel-cobalt-manganese hydroxides, nickel-cobalt-aluminum hydroxides, lithium-cobalt hydroxides, nickel hydroxides, nickel-cobalt-manganese oxyhydroxides, nickel-cobalt-aluminum oxyhydroxides, nickel oxyhydroxides and lithium-cobalt oxyhydroxides.

For example, the oxide can be chosen from nickel-cobalt-manganese oxides, nickel-cobalt-aluminum oxides, nickel oxide, lithium nickel-cobalt-manganese oxides, lithium nickel-cobalt-aluminum oxides, lithium nickel oxide and lithium-cobalt oxides.

For example, the solid is a precipitate comprising the metal hydroxide, the precipitate being obtained at a pH of about 8 to about 14.

For example, the solid is a precipitate comprising the metal hydroxide, the precipitate being obtained at a pH of about 9 to about 13.

For example, the solid is a precipitate comprising the metal hydroxide, the precipitate being obtained at a pH of about 10 to about 12.

For example, the process further comprises washing the metal hydroxide.

For example, the process further comprises drying the metal hydroxide at a temperature of about 80° C. to about 130° C. or 90° C. to about 120° C.

For example, the metal sulfate is reacted with lithium hydroxide and a chelating agent that is ammonia.

For example, the metal sulfate is reacted with lithium carbonate and a chelating agent that is ammonia.

For example, the metal sulfate is reacted with lithium carbonate and a chelating agent that is ammonia hydrogen carbonate.

For example, the first metal can be chosen from nickel, cobalt, manganese, lithium and aluminum.

For example, the base can comprise at least one of LiOH, NaOH, KOH, RbOH, CsOH, $Mg(OH)_2$, $Ca(OH)_2$, $Sr(OH)_2$ and $Ba(OH)_2$.

For example, the base can comprise at least one of be $Li_2CO_3$, $Na_2CO_3$, $K_2CO_3$, $Rb_2CO_3$, $Cs_2CO_3$, $MgCO_3$, $CaCO_3$, $SrCO_3$ and $BaCO_3$.

For example, the base can comprise at least one of $LiHCO_3$, $NaHCO_3$, $KHCO_3$, $RbHCO_3$, $CsHCO_3$, $Mg(HCO_3)_2$, $Ca(HCO_3)_2$, $Sr(HCO_3)_2$ and $Ba(HCO_3)_2$.

For example, the metal hydroxide can comprise at least one of LiOH, NaOH, KOH, RbOH, CsOH, $Mg(OH)_2$, $Ca(OH)_2$, $Sr(OH)_2$ and $Ba(OH)_2$.

For example, the second metal can be Li, Na, K, Rb, Cs, Mg, Ca, Sr, or Ba.

For example, the third metal can be Li, Na, Ni, Co, Mn, Al, K, Rb, Cs, Mg, Ca, Sr, or Ba.

For example, the third metal hydroxide can be LiOH.

For example, the another metal can be Li, Na, Ni, Co, Mn, Al, K, Rb, Cs, Mg, Ca, Sr, or Ba.

For example, the another metal hydroxide can be LiOH.

For example, the base can be purified before being reacted with the metal sulfate. For example, the base can be crystallized.

For example, the metal hydroxide produced by the electromembrane process can be purified before being reacted with the metal sulfate. For example, the metal hydroxide can be crystallized.

For example, before submitting the liquid comprising sulfate to an electromembrane in order to obtain an hydroxide, the sulfate can be purified and/or concentrated.

For example, the chelating agent can be chosen from $NH_3$, $NH_4OH$, acetylacetone, 5-sulfosalicylic acid, oxalic acid.

For example, the chelating agent can be chosen from EDTA (ethylenediaminetetraacetic acid) NTA (nitrilotriacetic acid), DCTA (trans-1,2-diaminocyclohexanetetraacetic acid), DTPA (diethylene-triamine pentaacetic acid), and EGTA (ethylene glycol bis(2-aminoethyl ether)-N,N,N', N'-tetraacetic acid)

For example, the chelating agent can be present.

For example, if the electromembrane process is a Na-based process, a purification step for the separation of lithium (in solution as lithium sulfate) from the sodium sulfate solution can be carried out.

For example, sodium sulfate and lithium sulfate can be separated from one another.

For example, sodium sulfate and lithium sulfate can be separated from one another by means of a crystallization.

For example, the metal hydroxide can be $NiCoAl(OH)_2$ or $NiMnCo(OH)_2$

For example, the metal hydroxide can be chosen from $Ni_{0.8}Co_{0.15}Al_{0.05}(OH)_2$, $Ni_{0.8}Mn_{0.1}Co_{0.1}(OH)_2$ and $Ni_{0.6}Mn_{0.2}Co_{0.2}(OH)_2$.

For example, the metal oxide can be of formula $LiMO_2$, wherein M is at least one metal chosen from nickel, cobalt, manganese, lithium and aluminum.

For example, the metal oxide can be of formula $LiM_2O_4$, wherein M is at least one metal chosen from nickel, cobalt, manganese, lithium and aluminum.

For example, the metal hydroxide or metal oxide can be of core-shell type.

For example, the metal oxide can be chosen from $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$ and $LiNi_{0.8}Co_{0.15}Al_{0.05}O_2$, or $[LiNi_xM1_yM2_zO_2]_{core}/[LiNi_aM1_b M2_cO_2]_{shell}$, with M1=Mn, Co or Al and M2=Mn, Co or Al with x+y+z=1, a+b+c=1.

For example, the metal oxide can be of formula $LiMO_2$, or $Li(1+x)M(1-_x)O_2$ for lithium-rich and $Li_{(1-z)}M_{(1+z)}O_2$ for Li-deficient, wherein M can be at least one metal chosen from nickel, cobalt, manganese, lithium and aluminum.

For example, the lithium hydroxide obtained by the electromembrane process can be used as is in aqueous composition and reacted with the obtained metal hydroxide to obtain a mixture of metal hydroxides.

For example, the lithium hydroxide obtained by the electromembrane process can be crystallized before being reacted with the obtained metal hydroxide to obtain a mixture of metal hydroxides.

For example, the lithium hydroxide obtained by the electromembrane process can be crystallized and then dissolved before being reacted with the obtained metal hydroxide to obtain a mixture of metal hydroxides.

For example, the roasting of the mixture of metal hydroxides comprises roasting at a first temperature of at least 350° C. for a period of time of at least about 4 hours.

For example, roasting the mixture of metal hydroxides comprises roasting at a first temperature of at least about 400° C. for a period of time of at least about 6 hours.

For example, the process can further comprise roasting the mixture of metal hydroxides comprises roasting at a second temperature of at least about 600° C. for a period of time of at least about 6 hours.

For example, the process can further comprise roasting the mixture of metal hydroxides comprises roasting at a second temperature of at least about 700° C. for a period of time of at least about 8 hours.

For example, the process can further comprise roasting the mixture of metal hydroxides comprises roasting at a second temperature of at least about 500° C. for a period of time of at least about 8 hours.

For example, $NH_3$ can be recovered in situ during mixture formation.

For example, the electromembrane process for converting $Li_2SO_4$ into LiOH can be chosen from electromembrane processes as described in any one of WO2013159194, WO2013177680, WO2014138933, WO 2015058287, WO2015058288, WO2015123762 and WO2017/031595. These documents are hereby incorporated by reference in their entirety.

For example, carbonatation can be carried out as described in WO2013177680 or in WO2015058287, that are hereby incorporated by reference in their entirety.

The processes of the present disclosure can be operated, for example as a batch process. Alternatively, the processes of the present disclosure can be operated as a semi-continuous process or a continuous process.

It will be appreciated by a person skilled in the art that one or more parameters of the processes of the present disclosure such as but not limited to pH, temperature, current density, voltage, current efficiency and concentration can be monitored, for example by means known in the art. The selection of a suitable means for monitoring a particular parameter in a process of the present disclosure can be made by a person skilled in the art. Such parameters can also be maintained and/or changed by a person skilled in the art, for example in light of their common general knowledge and with reference to the present disclosure.

The person skilled in the art would understand that various different sources can be used for the metal sulfates. Metal sulfate(s) can be purchased. Metal sulfates can also be obtained by leaching a metal or a mixture of metals with $H_2SO_4$. Metal sulfate(s) can be obtained by leaching of spent lithium ion batteries. Metal sulfate(s) can be obtained by leaching a residue obtained after crushing spent lithium ion batteries. Metal sulfate(s) can be obtained by leaching a residue after treatment of spent lithium ion batteries Metal sulfate(s) can for example be derived from a mixture of transition metals that have been leached. Metal sulfate(s) can be provided from a concentrate derived from a mining company. Metal sulfate(s) can be obtained by leaching of a nickel ore containing cobalt.

For example, during the electromembrane process consumption of the lithium sulfate to prepare lithium hydroxide can proceed to a pre-determined extent.

For example, the composition comprising lithium sulfate can also comprise $H_2SO_4$.

For example, in the processes of the present disclosure, the aqueous composition comprising the lithium sulfate is submitted to an electromembrane process under suitable conditions for conversion of the lithium sulfate to lithium hydroxide to proceed to a pre-determined extent. The selection of a suitable pre-determined extent for a particular process of the present disclosure can be made by a person skilled in the art. For example, the aqueous composition comprising lithium sulfate is submitted to a electromembrane process under suitable conditions for consumption of the lithium sulfate to prepare lithium hydroxide until one or more competing side reactions proceed to a pre-determined extent, for example to an extent such that the preparation of lithium hydroxide is no longer efficient.

For example, the electromembrane process is a two-compartment monopolar or bipolar membrane electrolysis process carried out in an electrochemical cell comprising an anolyte compartment separated from a catholyte compartment by a cation exchange membrane, conversion of the lithium sulfate to lithium hydroxide can proceed until hydroxide current efficiency is no longer efficient, for example hydroxide current efficiency is no longer at least substantially maintained so that it decreases. For example, the electromembrane process is a two-compartment monopolar or bipolar membrane electrolysis process carried out in a electrochemical cell comprising an anolyte compartment separated from a catholyte compartment by a cation exchange membrane, conversion of the lithium sulfate to lithium hydroxide can proceed until pH in the anolyte compartment is a value of about 0.3 to about 1.4, about 0.4 to about 1.2, about 0.4 to about 1.2, about 0.5 to about 0.8, about 0.5 to about 0.7 or about 0.6.

For example, the electromembrane process is a two-compartment monopolar or bipolar membrane electrolysis process carried out in a electrochemical cell comprising an anolyte compartment separated from a catholyte compartment by a cation exchange membrane, conversion of the lithium sulfate to lithium hydroxide can proceed until consumption of a particular amount of the lithium sulfate comprised within the aqueous composition.

For example, the pre-determined extent can comprise consumption of about 30 to about 60 weight % or of about 30 to about 50 weight % of the lithium sulfate comprised within the aqueous composition, based on the total amount of lithium sulfate contained in the aqueous composition. For example, the pre-determined extent can comprise consumption of about 35 to about 45 weight % of the lithium sulfate comprised within the aqueous composition.

For example, the electromembrane process can comprise, consist essentially of or consist of a three-compartment membrane electrolysis process, for example a three-compartment monopolar or bipolar membrane electrolysis process.

For example, the electromembrane process can comprise, consist essentially of or consist of a two-compartment membrane electrolysis process, for example a two-compartment monopolar or bipolar membrane electrolysis process.

For example, the electromembrane process can comprise, consist essentially of or consist of a three-compartment membrane electrolysis process, for example a three-compartment bipolar membrane electrolysis process.

For example, the electromembrane process can comprise, consist essentially of or consist of a two-compartment membrane electrolysis process, for example a two-compartment bipolar membrane electrolysis process.

For example, the two-compartment membrane electrolysis process such as the two-compartment monopolar or bipolar membrane electrolysis process can be carried out in a electrochemical cell comprising an anolyte compartment separated from a catholyte compartment by a cation exchange membrane.

For example, the cation exchange membrane can comprise, consist essentially of or consist of a perfluorosulfonic acid such as a Nafion™ 324 (or perfluorinate sulfonic acid), a cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the two-compartment membrane electrolysis process such as the two-compartment monopolar or bipolar membrane electrolysis process, an aqueous stream comprising the lithium sulfate can be introduced into the anolyte compartment, the first lithium-reduced aqueous stream can be removed from the anolyte compartment and the first lithium hydroxide-enriched aqueous stream can be removed from the catholyte compartment.

For example, in the catholyte compartment of the two-compartment monopolar or bipolar membrane electrolysis process, lithium hydroxide can be at least substantially maintained at a concentration of about 1 M to about 4 M, about 2 M to about 4 M, about 2 M to about 3 M, about 2.5 to about 3.5 M, about 2.8 to about 3.2 M or about 3 M.

For example, during the two-compartment monopolar or bipolar membrane electrolysis process, the aqueous stream comprising the lithium sulfate can be introduced into the anolyte compartment at a temperature of about 10° C. to about 100° C., about 10° C. to about 100° C., about 10° C. to about 90° C., about 20° C. to about 85° C., about 40° C. to about 80° C., about 40° C. to about 70° C., about 45° C. to about 60° C., about 45° C. to about 55° C. or about 50° C.

For example, during the two-compartment monopolar or bipolar membrane electrolysis process, the first lithium-reduced aqueous stream can be removed from the anolyte compartment at a temperature of about 20° C. to about 100°

C., about 20° C. to about 85° C., about 50° C. to about 85° C., about 55° C. to about 65° C., about 45° C. to about 60° C. about 60° C. to about 85° C., about 70° C. to about 85° C. or about 80° C.

For example, during the two-compartment monopolar or bipolar membrane electrolysis process, temperature in an electrochemical cell can be at least substantially maintained at a value of about 60° C. to about 110° C., about 60° C. to about 100° C., about 60° C. to about 90° C., about 60° C. to about 85° C., about 50° C. to about 85° C., about 50° C. to about 70° C., about 55° C. to about 65° C., about 75° C. to about 85° C. or about 80° C.

For example, in the two-compartment monopolar or bipolar membrane electrolysis process, current density can be at least substantially maintained at a value of from about 0.1 $kA/m^2$ to about 8000 $kA/m^2$, 0.5 $kA/m^2$ to about 6 $kA/m^2$, about 1 $kA/m^2$ to about 6 $kA/m^2$, about 2 $kA/m^2$ to about 6 $kA/m^2$ or about 3 $kA/m^2$ to about 5 $kA/m^2$. For example, current density can be at least substantially maintained at a value chosen from about 3 $kA/m^2$, about 4 $kA/m^2$ and about 5 $kA/m^2$. For example, current density can be at least substantially maintained at a value of about 4 $kA/m^2$.

For example, in the two-compartment monopolar or bipolar membrane electrolysis process, voltage can be at least substantially maintained at a value of about 3 V to about 8 V, about 5 V to about 10 V, about 4 V to about 6 V, about 4 to about 5 or about 4.5.

For example, the electrochemical cell can have a surface area of about 0.2 $m^2$ to about 4 $m^2$, about 0.5 $m^2$ to about 3.5 $m^2$, about 1 $m^2$ to about 3 $m^2$ or about 1 $m^2$ to about 2 $m^2$.

For example, the electromembrane process can comprise, consist essentially of or consist of a two-compartment membrane electrolysis process, for example a two-compartment monopolar or bipolar membrane electrolysis process.

For example, the electromembrane process can comprise, consist essentially of or consist of a three-compartment membrane electrolysis process, for example a three-compartment monopolar or bipolar membrane electrolysis process.

For example, the three-compartment membrane electrolysis process such as the three-compartment monopolar or bipolar membrane electrolysis process can be carried out in a electrochemical cell comprising an anolyte compartment separated from a central compartment by an anion exchange membrane and a catholyte compartment separated from the central compartment by a cation exchange membrane.

For example, the cation exchange membrane can comprise, consist essentially of or consist of a perfluorsulfonic acid such as a Nafion™ 324 cation exchange membrane or other membranes used for caustic concentration such as FuMA-Tech FKB or Astom CMB cation exchange membranes. The selection of a suitable cation exchange membrane for a particular process of the present disclosure can be made by a person skilled in the art.

For example, during the three-compartment membrane electrolysis process such as the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the three-compartment membrane electrolysis process such as the three-compartment monopolar or bipolar membrane electrolysis process can further comprise producing an acid such as sulfuric acid in the anolyte compartment and removing an acid-containing aqueous stream such as a sulfuric acid-containing aqueous stream from the anolyte compartment.

The selection of a suitable anion exchange membrane for a particular process of the present disclosure can be made by a person skilled in the art. For example, it will be appreciated by a person skilled in the art that a proton-blocking membrane may, for example be useful in processes coproducing acids such as sulfuric acid. For example, in the three-compartment monopolar or bipolar membrane electrolysis process, the anion exchange membrane can be a proton-blocking membrane. For example, the proton-blocking membrane can such as a Fumatech FAB, Astom ACM or Asahi AAV anion exchange membrane.

For example, in the anolyte compartment of the three-compartment monopolar or bipolar membrane electrolysis process, the acid such as sulfuric acid can be at least substantially maintained at a concentration of acid such as sulfuric acid of about 0.1 M to about 2 M. For example, in the anolyte compartment of the three-compartment monopolar or bipolar membrane electrolysis process, the sulfuric acid can be at least substantially maintained at a concentration of sulfuric acid can be about 0.5 M to about 1.5 M, about 0.7 M to about 1.2 M, or about 0.8 M.

For example, in the catholyte compartment of the three-compartment membrane electrolysis process, the lithium hydroxide can be at least substantially maintained at a concentration of about 1 M to about 5.0 M, about 1 M to about 4.0 M, about 1 M to about 3.0 M, about 2 M to about 3.0 M, about 1.5 M to about 2.5 M, about 1.8 M to about 2.2 M, or about 2 M.

For example, during the three-compartment monopolar or bipolar membrane electrolysis process, the first lithium-reduced aqueous stream can be introduced into the central compartment at a temperature of about 20° C. to about 85° C., about 40° C. to about 85° C., about 40° C. to about 75° C., about 50° C. to about 70° C., about 50° C. to about 65° C. or about 60° C.

For example, during the three-compartment monopolar or bipolar membrane electrolysis process, the second lithium-reduced aqueous stream can be removed from the anolyte compartment at a temperature of about 20° C. to about 80° C., about 30° C. to about 70° C., about 40° C. to about 80° C. or about 60° C.

For example, during the three-compartment monopolar or bipolar membrane electrolysis process, temperature in the second electrochemical cell can be at least substantially maintained at a value of about 30° C. to about 90° C., about 40° C. to about 85° C., about 50° C. to about 80° C., about 50° C. to about 70° C., about 50° C. to about 65° C., about 50° C. to about 70° C., about 55° C. to about 65° C., or about 60° C.

For example, in the three-compartment monopolar or bipolar membrane electrolysis process, current density can be at least substantially maintained at a value of about 0.5 kA/m$^2$ to about 5 kA/m$^2$, about 1 kA/m$^2$ to about 2 kA/m$^2$, about 3 kA/m$^2$ to about 5 kA/m$^2$, about 4 kA/m$^2$ or about 1.5 kA/m$^2$.

For example, in the three-compartment monopolar or bipolar membrane electrolysis process, voltage can be at least substantially maintained at a value of about 5 V to about 9 V, about 6 V to about 8 V, about 6.5 V to about 7.5 V or about 7 V.

For example, the electrochemical cell can have a cell area of about 0.2 m$^2$ to about 4 m$^2$, about 0.5 m$^2$ to about 3.5 m$^2$, about 1 m$^2$ to about 3 m$^2$ or about 1 m$^2$ to about 2 m$^2$.

Alternatively, for example, in the processes of the present disclosure, the three compartment monopolar or bipolar membrane electrolysis process can further comprise introducing ammonia into the anolyte compartment, producing an ammonium compound such as ammonium sulfate in the anolyte compartment and removing an ammonium compound-containing aqueous stream such as an ammonium sulfate-containing aqueous stream from the anolyte compartment.

The selection of a suitable anion exchange membrane for a particular process of the present disclosure can be made by a person skilled in the art. For example, it will be appreciated by a person skilled in the art that in processes that do not coproduce acids such as sulfuric acid, an anion exchange membrane that is not a proton-blocking membrane may be useful as it may, for example be able to withstand higher temperatures and/or have lower resistance than a proton-blocking membrane. For example, in the three-compartment monopolar or bipolar membrane electrolysis process, the anion exchange membrane may not be a proton-blocking membrane. For example, the anion exchange membrane can be a such as an Astom AHA anion exchange membrane or FuMA-Tech FAP.

For example, in the anolyte compartment of the three-compartment monopolar or bipolar membrane electrolysis process, the ammonium compound such as ammonium sulfate can be at least substantially maintained at a concentration of ammonium compound such as ammonium sulfate of about 0.5 M to about 5 M, about 1 M to about 4 M or about 3 M.

For example, in the catholyte compartment of the three-compartment monopolar or bipolar membrane electrolysis process, the lithium hydroxide can be at least substantially maintained at a concentration of about 1 M to about 4.0 M, about 1.5 M to about 2.5 M or about 2 M.

For example, pH in the anolyte compartment of the two-compartment monopolar or bipolar membrane electrolysis process and/or the central compartment of the three-compartment monopolar or bipolar membrane electrolysis process can be at least substantially maintained. For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

For example, during the two-compartment monopolar or bipolar membrane electrolysis process conversion of the lithium sulfate to lithium hydroxide can proceed to a predetermined extent.

For example, during the two-compartment monopolar or bipolar membrane electrolysis process, an aqueous stream comprising the lithium sulfate can be introduced into the anolyte compartment, the first lithium-reduced aqueous stream can be removed from the anolyte compartment and the first lithium hydroxide-enriched aqueous stream can be removed from the catholyte compartment, and during the three-compartment monopolar or bipolar membrane electrolysis process, the first lithium-reduced aqueous stream can be introduced into the central compartment, the second lithium-reduced aqueous stream can be removed from the central compartment and the second lithium hydroxide-enriched aqueous stream can be removed from the catholyte compartment.

For example, the process can further comprise recycling at least a portion of the second lithium-reduced aqueous stream to the two-compartment monopolar or bipolar membrane electrolysis process.

It will be appreciated by a person skilled in the art that the process can also be varied, as appropriate, using the examples discussed herein.

For example, at least a portion of the processes of the present disclosure can be operated as a batch process. Alternatively, for example, the processes can be operated as a continuous process or a semi-continuous process. For example, it would be appreciated by a person skilled in the art that pH in the anolyte compartment of the two-compartment monopolar or bipolar membrane electrolysis process and/or the central compartment of the three-compartment monopolar or bipolar membrane electrolysis cell can be at least substantially maintained by adjusting the current density of the two-compartment monopolar or bipolar membrane electrolysis process and/or the three-compartment monopolar or bipolar membrane electrolysis process and/or the flow rate of the streams flowing between the processes, for example as described herein.

For example, pH in the anolyte compartment of the two-compartment monopolar or bipolar membrane electrolysis process and/or the central compartment of the three-compartment monopolar or bipolar membrane electrolysis process can be at least substantially maintained.

For example, pH can be at least substantially maintained by adjusting at least one of current density of the two-compartment monopolar or bipolar membrane electrolysis process, current density of the three-compartment monopolar or bipolar membrane electrolysis process, flow rate of the first lithium-reduced aqueous stream and flow rate of the second lithium-reduced aqueous stream.

The selection of a suitable means for measuring and/or monitoring pH can be made by a person skilled in the art. The selection of a suitable current density and/or a suitable flow rate can be made by a person skilled in the art.

For example, the process can further comprise removing a first hydrogen-containing stream from the catholyte compartment of the electrochemical cell. For example, the process can further comprise removing an oxygen-containing stream from the anolyte compartment of the electrochemical cell.

For example, the electrochemical cell can further comprise means to measure pH in the anolyte compartment, and the system is configured to convey the first lithium-reduced aqueous stream when pH in the anolyte compartment is below a pre-determined value.

For example, the electrochemical cell can further comprises means to measure pH in the central compartment, and the system is configured to convey unconverted lithium sulfate from the central compartment of the electrochemical cell when pH in the central compartment is above a pre-determined value.

For example, the electrochemical cell can further comprises means to measure concentration of lithium hydroxide in the catholyte compartment of the second electrochemical cell.

For example, lithium hydroxide can be crystallized as lithium hydroxide monohydrate, optionally dried and reacted in solid state with the obtained metal hydroxide to obtain a mixture of metal hydroxides.

For example, the metal sulfates can be obtained by leaching a battery.

For example, the battery can comprise LFP (LiFePO$_4$).

For example, lithium hydroxide can be concentrated before reacting it with the metal hydroxide and to form the mixture of metal hydroxides.

For example, concentration can be carried out by using reverse osmosis or by heating.

For example, lithium hydroxide can be crystallized before reacting it with the metal hydroxide and to form the mixture of metal hydroxides.

For example, the metal oxide can have the lamellar structure Li(M$^{2+}$)O$_2$.

For example, the metal oxide can have the spinel structure Li(M$^{x+}$)$_2$O$_4$, avec 3<X<4.

For example, the lithium hydroxide composition can be concentrated before being reacted with the metal sulfate.

For example, concentration can be carried out by using reverse osmosis or by heating.

For example, the chelating agent can be NH$_3$.

For example, LiOH can be concentrated and then directly reacted with the metal hydroxide without crystallisation. For example, LiOH can be concentrated, crystallized, optionally dried and then directly reacted with the metal hydroxide.

For example, LiOH can be treated with a flash dryer.

For example LiOH and the metal hydroxide can be reacted together to obtain a mixture and then heated together.

For example LiOH and the metal hydroxide can be reacted together to obtain a mixture and then heated together in a spray dryer.

For example, crystals of lithium sulfate monohydrate can be inserted into the cell so as to increase concentration Li$_2$SO$_4$.

For example, the sulfate or hydroxide can be purified by a solvent extraction method. For example, the solvents used for solvent extraction can be based on phosphorous acid e.g. Cyanex 272, Cyanex 301, Cyanex 302, Di-(2-ethylhexyl) phosphoric acid (D2EHPA), DEHTPA, Baysolvex DEDP, lonquest 801, Hoe F 3787, MEHPA, P204, PC88A, P507, or hydroxy-oxime extractants (e.g. Acorga P50, Acorga K2000, LIX 84-I, SME 529, LIX 65N, LIX 64, LIX 70, LIX 860, LIX 622), or β-diketone metal cation extractants (e.g. LIX 54, XI-N54, XI-55, XI-57) [Source: Solvent extraction: the coordination chemistry behind extractive metallurgy. Chem. Soc. Rev., 2014, 43, 123].

For example, the filtered sulfate solution after the co-precipitation of the hydroxide could optionally be purified and/or concentrated before entering the membrane electrolysis.

For example, the leached solution can be purified before the co-precipitation of the hydroxide. Examples of purification can be related to metals selective separation, e.g. precipitation of hydroxides, precipitation of insoluble salts, oxidative precipitation, ion exchange, solvent extraction, electrochemical plating, crystallization.

For example, selective precipitation can be performed by addition of e.g. O$_2$, SO$_2$ or H$_2$SO$_5$, persulfates ((NH$_4$)$_2$S$_2$O$_8$), ammonium oxalate (NH$_4$)$_2$C$_2$O$_4$ chlorine, chlorine compounds (HCl, ClO$_2$, HClO$_3$), O$_3$, NaOCl, CoS, Na$_2$S, NaHS, CaCO$_3$, Na$_3$PO$_4$.

For example, precipitation of hydroxides can be obtained by addition of e.g. LiOH, NaOH, NH$_4$OH.

For example, precipitation of insoluble salts can be obtained by addition of dimethylglyoxime.

For example, the LiPF$_6$ electrolyte can be recovered.

For example, the solid/liquid (gram of material/volume of liquid) ratio in g/L for the leaching step can be comprise between 1/5 to 1:100.

For example, the leaching solution can be a mixture of at least one of H$_2$SO$_4$, H$_2$O$_2$, HNO$_3$, HCl, nitric acid, citric acid, oxalic acid, aspartic acid, ascorbic acid, glucose.

For example, the sulfate metals M(SO$_4$) (with M=Ni, Co, Mn) and/or Al$_2$(SO$_4$)$_3$ can be optionally crystallized before being used as precursor in the synthesis of the hydroxide.

For example, even though the final material was obtained here using co-precipitation method, any other kind of synthesis method leading to the synthesis of a layered oxide material with recycling of lithium-containing sulfate solution is encompassed within the scope of the present disclosure According to one example, a process according to the present disclosure is presented in FIG. 1. As it can be seen from FIG. 1, nickel sulfate, cobalt sulfate and manganese sulfate can be mixed together to obtain a composition comprising various metal sulfates. Such a composition can be an aqueous composition, for example, an acidic aqueous composition. For example, a material comprising at least one metal can be leached with $H_2SO_4$, thereby obtaining the desired metal sulfates composition. Alternatively, various metal sulfates can be reacted with an aqueous acidic composition to obtain the desired metal sulfates composition. LiOH and a chelating agent (for example $NH_3$) are then added to this mixture to get the mixture formation and eventually to precipitate the desired metal hydroxide. LiOH is a pH enhancer as the sulfate metal reaction starts at high pH, and $NH_3$ can act as a chelating agent. Once the reaction starts, a solid phase will precipitate (i.e. being the hydroxide compound) and can be separated from the liquid phase at high pH, e.g. $10 \leq pH \leq 13$. This solid phase precipitate will be further washed with water and dried out at 120° C. for 8h under air. Then, the hydroxide phase $NMC(OH)_2$ is obtained. The liquid phase gathered earlier contains dissolved $Li_2SO_4$, which can be collected after liquid phase filtration. This $Li_2SO_4$ lithium sulfate can be electrolyzed in a membrane electrolyser into lithium hydroxide LiOH, that could be used as pH enhancer for another mixture formation.

The person skilled in the art would understand that the electromembrane process can be carried in many different manners and in accordance to various different parameters. For example, such an electromembrane process can be carried as defined in any one of the following references WO2013159194, WO2013177680, WO2014138933, WO 2015/058287, WO 2015/058287, WO 2015/123762, WO2017031595 and WO2018035618. These documents are hereby incorporated by reference in their entirety.

The hydroxide phase $NMC(OH)_2$ can be further used to be mixed with LiOH obtained from electrolysis of the $Li_2SO_4$ to obtain a mixture of metal hydroxides. For example, this mixture of metal hydroxides can be roasted at different temperatures. For example, it can be roasted at a first temperature of 450° C. for about 8h under air, then it can be roasted at 800° C. for 12h under air. Then, it is crushed and sieved, washed with water, and finally dried at 600° C. for about 8h under air. The nickel-manganese-cobalt lithium oxide $Li—(Ni_xMn_yCo_z)O_2$ is then obtained, wherein 0<x, y, z<1 and x+y+z=1. Core-shell materials can also be obtained, with a gradient concentration from the core to the surface for the different metals, as $[LiNi_xM1_yM2_zO_2]_{core}/[LiNi_aM1_bM2_cO_2]_{shell}$, with x+y+z=1, a+b+c=1, M1=Mn, Co or Al and M2=Mn, Co or Al, and e.g. a ≠x for Ni being different, leading to the concentration gradient in the final material.

For example, the metal source can be an at least substantially pure metal leached by the electrochemically generated sulfuric acid.

For example, the metal source can be a nickel concentrate (containing also cobalt and possibly other elements) leached by the electrochemically generated sulfuric acid.

For example, the metal source can be a nickel cobalt containing material (e.g. nickel oxide ore, nickel matte, nickel sulfide, mixed sulfide of nickel and cobalt, crude nickel sulfate produced from a copper smelting process, and nickel oxide) leached by the electrochemically generated sulfuric acid.

Figure 31:
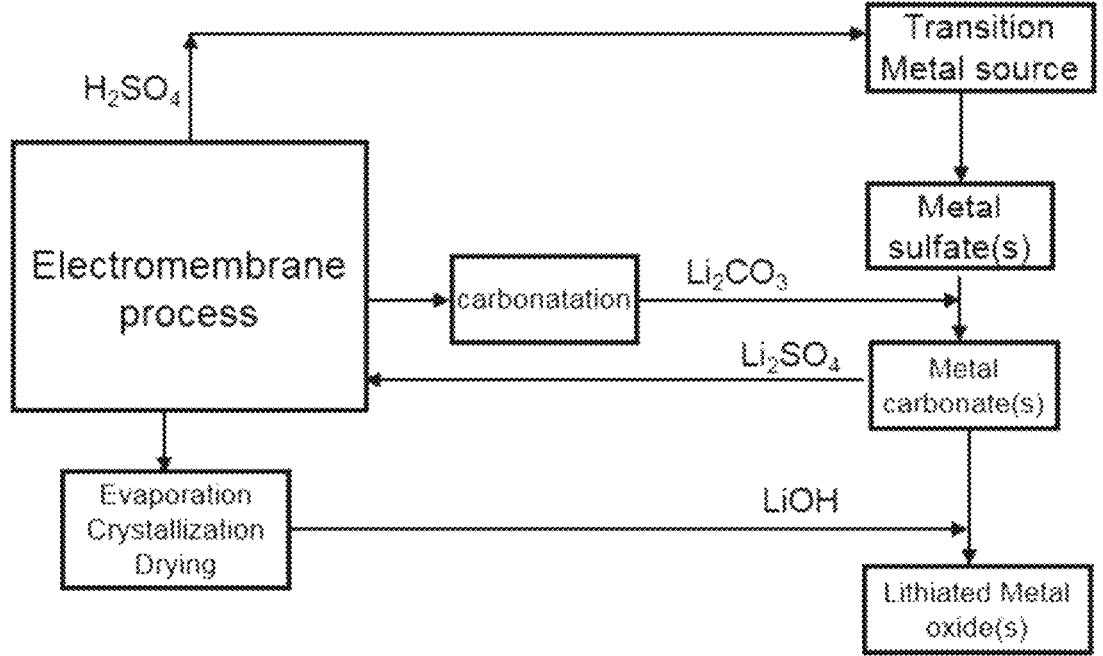
FIG. 31 is a schematic diagram of a process according to an embodiment of the present disclosure for the synthesis of a lithiated metal oxide using $Li_2CO_3$ as pH enhancer for the precipitation of metal carbonate.
Figure 32:
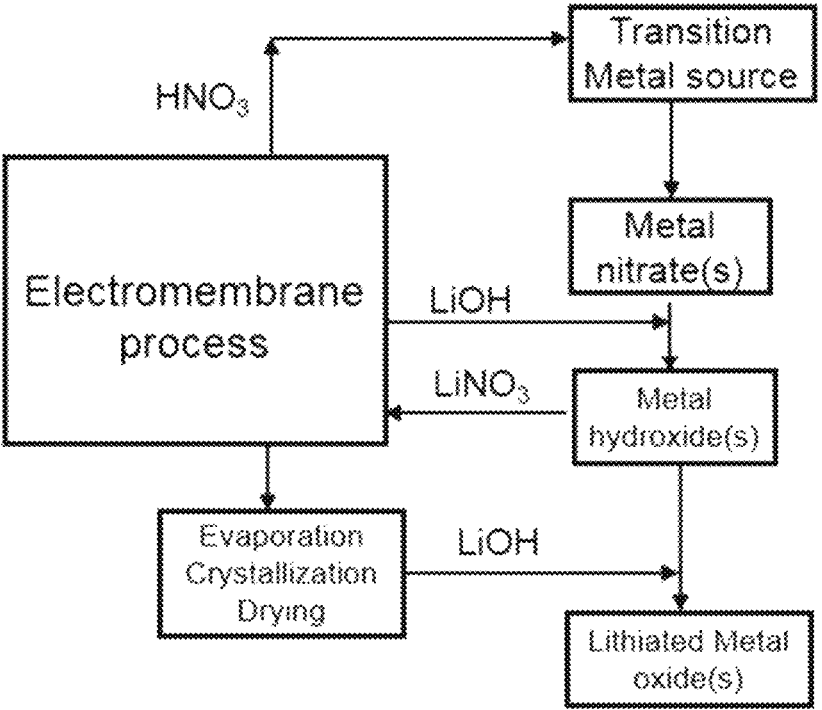
FIG. 32 is a schematic diagram of a process according to an embodiment of the present disclosure using nitric acid for the leaching of the transition metal source.
Figure 33:
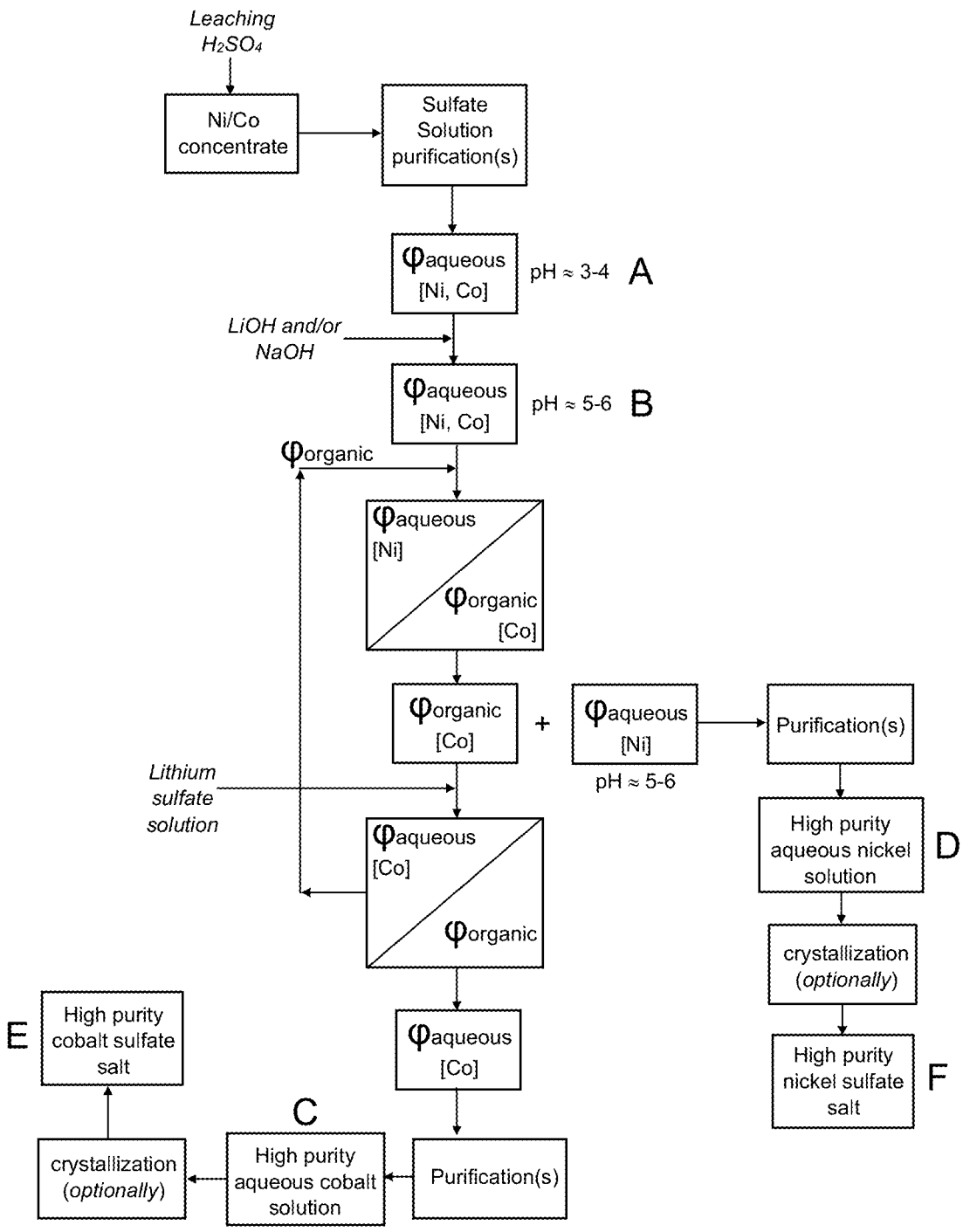
FIG. 33 is a schematic diagram of a process for the production of high purity sulfate salts using $H_2SO_4$ to leach the nickel cobalt concentrate.

For example, the metal source can be an aqueous nickel-cobalt solution such as the solutions referred as C or D in FIG. 31, FIG. 32 and FIG. 33, leached by the electrochemically generated sulfuric acid.

For example, the metal source can be an organic solution containing nickel (and cobalt and possibly other elements) that can be stripped by the electrochemically generated sulfuric acid.

For example, the metal source can be a spent battery leached or constituent thereof (e.g. cathode, anode, black mass, slag, or mixtures thereof) (e.g. the cathode only, or both the anode and the cathode or a black mass, etc) leached by the electrochemically generated sulfuric acid.

The person skilled in the art would understand that the process shown in FIG. 1 can vary in accordance with the nature of the at least one metal sulfate used as starting material. Various metals can thus be used and various mixtures thereof as starting material.

EXAMPLES

Synthesis of Oxides at High Potential for Cathode Material of Lithium Ion Batteries A cathode material was synthetized to produce a lithium transition metal oxide with specific formula, $Li_pNi_xMn_yCo_zAl_qO_2$. The formula has specific percentage to reach certain kind of materials in the industries. The obtained cathodes materials are $LiCoO_2$, $LiNi_{0.8}Co_{0.15}Al_{0.05}O_2$, $LiNi_{0.8}Mn_{0.1}Co_{0.1}O_2$ and $LiNi_{0.6}Mn_{0.2}Co_{0.2}O_2$.

Example 1 Synthesis of $Co(OH)_2$ 28.11 g of $CoSO_4 \cdot 7H_2O$ (Stream Chemicals, inc) was dissolved in 100 mL of distilled water to produce a solution of 1M (pH around 4-5). 10.49 g of $LiOH \cdot H_2O$ (Sigma-Aldrich) was dissolved in 250 mL of distilled water to obtain a solution of 1M (pH over 12). 5.841 mL was taken of a solution of 28-30% vol of ammonia (Sigma-Aldrich) to have a solution of 2 M (pH>12).

The montage was built with a flask round bottom 4-neck (Dima glass inc). One of the neck was used for a nitrogen flow to have an inert atmosphere in the flask. Two other opening were used to pour LiOH and $NH_3$ and the fourth one was dedicated to the recovery of $NH_3$ through a condenser.

The montage was set with the solution of $CoSO_4$ at the bottom of the flask. 10 mL of the solution of $CoSO_4$ 1 M was first of all deaerated by a flow of nitrogen and the system was maintained under a nitrogen flow for 15 minutes. The temperature was regulated at 60° C. 20 mL of $NH_3$ and 25 mL of LiOH were introduced drop by drop and the solution was maintained in the flask with a constant stirring. The reaction began when the pH of the solution reached 10. Once the products reacted (i.e. after 10 minutes), the solution was stirred for another 20 minutes. The substrate was filtered and washed three times with distilled water.

After filtration, the sample was heated at 120° C. for 8 hours. Then, 1 g of the $Co(OH)_2$ was collected (pink color). The overall reaction is given Equation 1.

$$CoSO_4 + 2LiOH + NH_3 \rightarrow Co(OH)_2 + Li_2SO_4 + NH_3 \qquad \text{Equation 1}$$

In this equation, all the reagents are in aqueous solution. The cobalt hydroxide, product of the reaction in Equation 1, will be used as precursor for the synthesis of the cobalt oxide (cf. example 2). In the mother liquor, an aqueous solution of $Li_2SO_4$ was mixed with a leftover of LiOH, in excess during the reaction. To convert all the LiOH into lithium sulfate, the solution was neutralized using $H_2SO_4$ as showed in Equation 2.

$$2LiOH + H_2SO_4 \rightarrow Li_2SO_4 \cdot H_2O + H_2O \qquad \text{Equation 2}$$

The filtrated $Li_2SO_4$ can be electrolysed and converted into $LiOH \cdot H_2O$. X-ray diffraction was performed on the compound to highlight its high purity.

Figure 2:
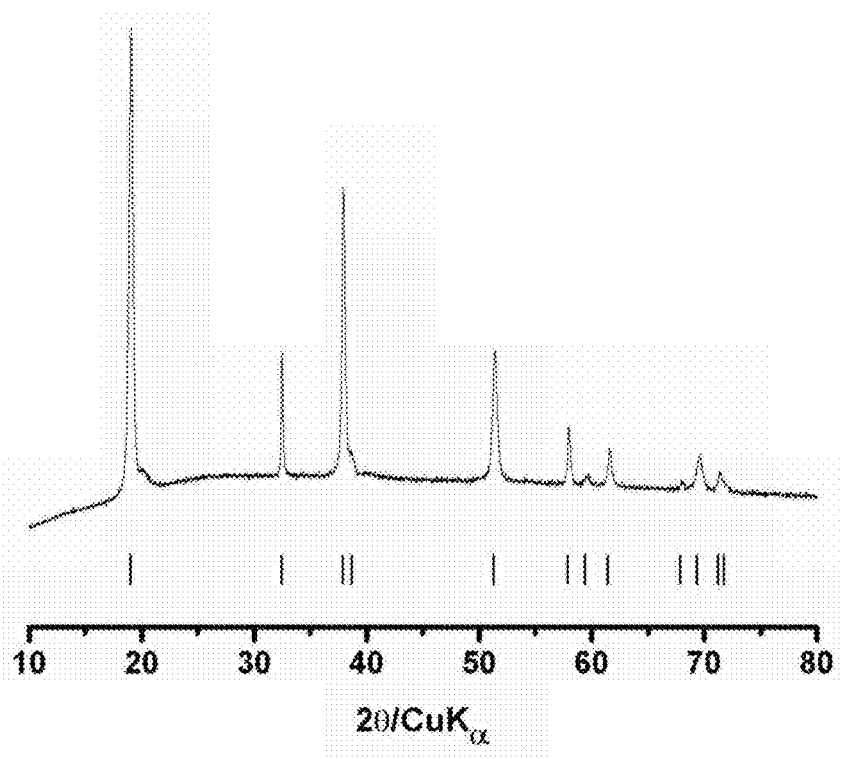
FIG. 2 is a X-Ray diffraction pattern of cobalt hydroxide $Co(OH)_2$ (in black) obtained using LiOH as base source and the theoretical diffraction peaks of this compound (vertical bars)

FIG. 2 represents the X-Ray diffraction pattern of the $Co(OH)_2$. It may be indexed with the theoretical diffraction peaks of the cobalt hydroxide. Besides, an impurity can be notice, as a small intensity peak is observed at 20°. In the synthesis of the hydroxide, LiOH is used as a source of pH enhancer, as the formation reaction of the hydroxide starts at high pH. For example, LiOH can be replaced by NaOH and X-ray diffraction was performed on the compound to highlight its high purity. In such a case, the electromembrane process can be used for converting $Na_2SO_4$ into NaOH.

Figure 3:
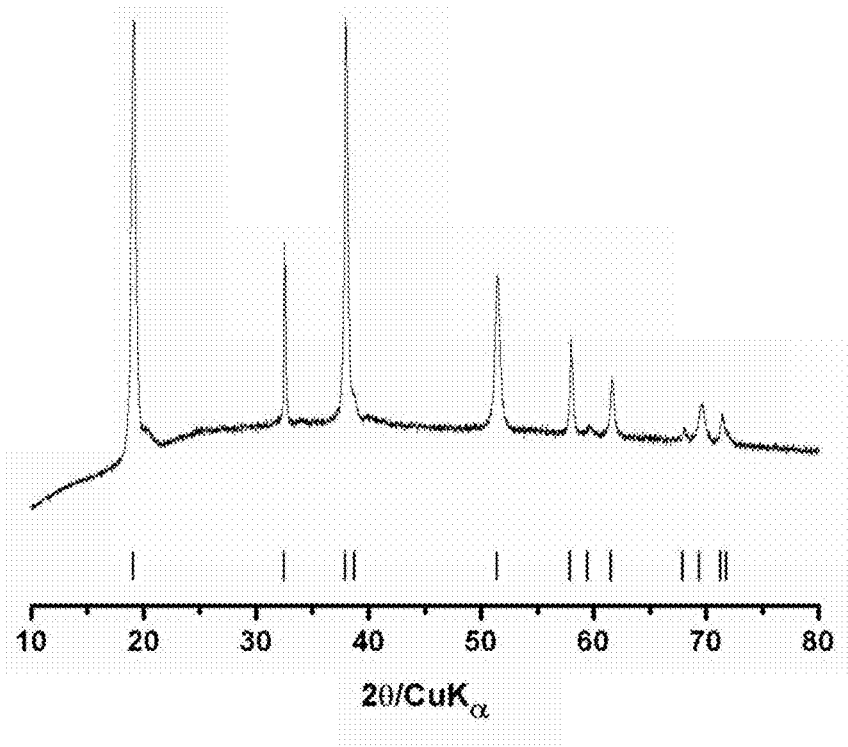
FIG. 3 is X-Ray diffraction pattern of cobalt hydroxide $Co(OH)_2$ (in black) obtained using NaOH as base source and the theoretical diffraction peaks of this compound (vertical bars)

FIG. 3 represents the X-Ray diffraction pattern of the $Co(OH)_2$ synthesis with NaOH as pH enhancer source. The X-Ray diffraction pattern of the compound may be indexed with the theoretical diffraction peaks of the cobalt hydroxide. Besides, an impurity can be notice, as a small intensity peak is observed at 20° as was observed for the LiOH diffractogram.

This $Co(OH)_2$ material based on NaOH or LiOH as pH enhancer source was the precursor of various potential products (see below).

Example 2 Synthesis of $LiCoO_2$

The cobalt hydroxide previously obtained was used as precursors for the synthesis of the lithium cobalt oxide, $LiCoO_2$. Here, the first step was to mix the $LiOH \cdot H_2O$ with the $Co(OH)_2$. This was a stoichiometric reaction as show in Equation 3

$$Co(OH)_2 + LiOH \cdot H_2O + 0.25O_2 \rightarrow LiCoO_2 + 2.5H_2O \qquad \text{Equation 3}$$

The precursors were mixed, crushed, and pellets were done before thermal treatment. These pellets were put in the furnace for 8 hours at 450° C. under air. After this step, the pellets were crushed and redone in pellets. The furnace was now set at 800° C. for 12 hours under air. The pellets were crushed again and then washed with water. The suspension was filtered, the powder collected and pressed in pellets again. The final step consisted in another thermal treatment for 8 hours at 600° C. under air.

The X-ray diffraction pattern in confirmed the high purity of the lithium cobalt oxide.

Figure 4:
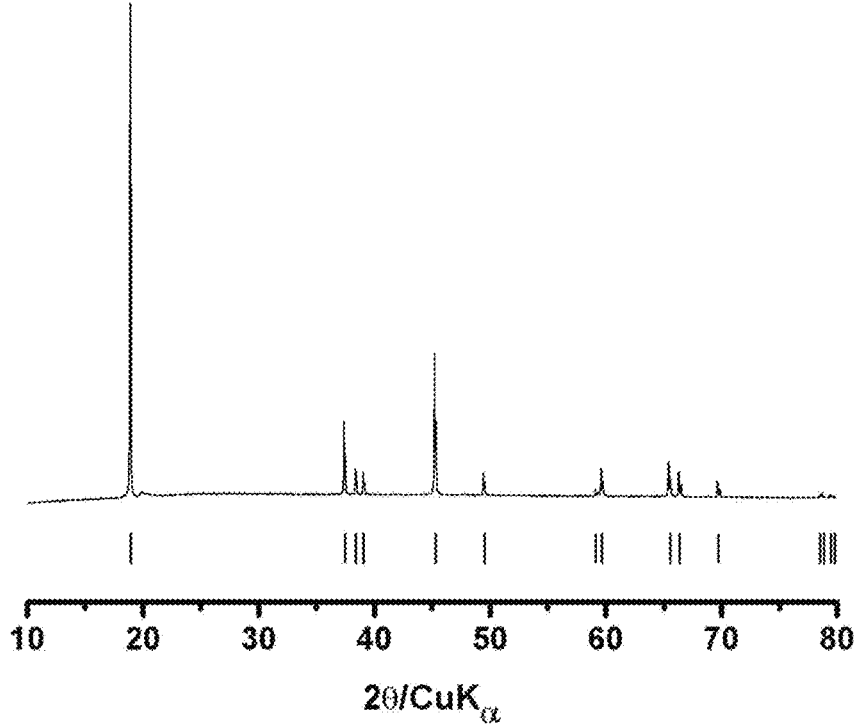
FIG. 4 is a X-Ray diffraction pattern of $LiCoO_2$ (in black) obtained by using the $Co(OH)_2$ of FIG. 2 (in black) and the theoretical diffraction peaks of this compound (vertical bars)

FIG. 4 presents the X-Ray diffraction pattern of the lithium cobalt oxide. One can see an impurity at 20°, that may be a residue of cobalt hydroxide (the same impurity was observed). This impurity has already been reported several times in the literature.

Figure 5:
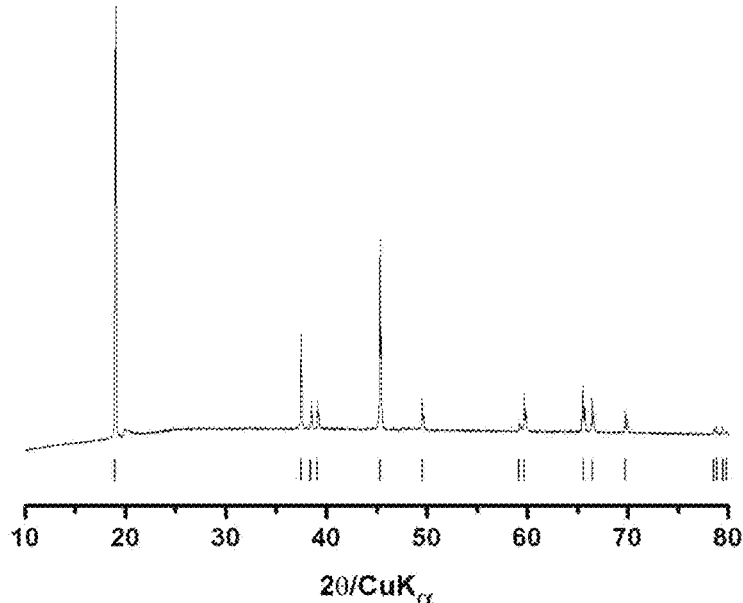
FIG. 5 is a X-Ray diffraction pattern of $LiCoO_2$ (in black) obtained by using the $Co(OH)_2$ of FIG. 3 and the theoretical diffraction peaks of this compound (vertical bars)

The lithitated cobalt oxide can also be produced from the cobalt hydroxide obtained with NaOH. The X-Ray diffraction of such compound can be found in FIG. 5 and pointed out that no difference is observed depending on the nature of the base source during the hydroxide synthesis.

The next step was to characterize the $LiCoO_2$ with the electrochemistry. The cathode electrode was prepared by mixing 83 wt. % of $LiCoO_2$, 9 wt. % of carbon black Timcal C65, and 8 wt. % of polyvinylidene difluoride (PVDF) in n-methyl pyrrolidone (NMP) solvent to form a slurry. The slurry was mixed for few hours to homogeneity and spread on a carbon-coated aluminum foil using the doctor blade method. After drying at 70° C. in a vacuum oven overnight, electrode disks of 0.5±0.1 mg/cm2 of active material loading were cut and calendered. Standard coin-cells (2032) were assembled in an Ar-filled glove box. Once the electrode was prepared, a lithium foil was used as the anode, 1 M $LiPF_6$ dissolve in ethylene carbonate and diethyl carbonate (1:2 volume ratio) solvents was used as liquid electrolyte. Poly-propylene membranes (Celgard inc.) were used as separators. The electrochemical tests were performed on the cells at 30° C. on a VMP electrochemical station (Bio-Logic, France) with cut-off voltages of 3 and 4.3 V vs Li/Li+ at 0.1 C rate for galvanostatic cycling. Three coin cells were prepared per sample to ensure reproducibility of the results. The standard deviation was determined to be ±1 mAh/g.

Figure 6:
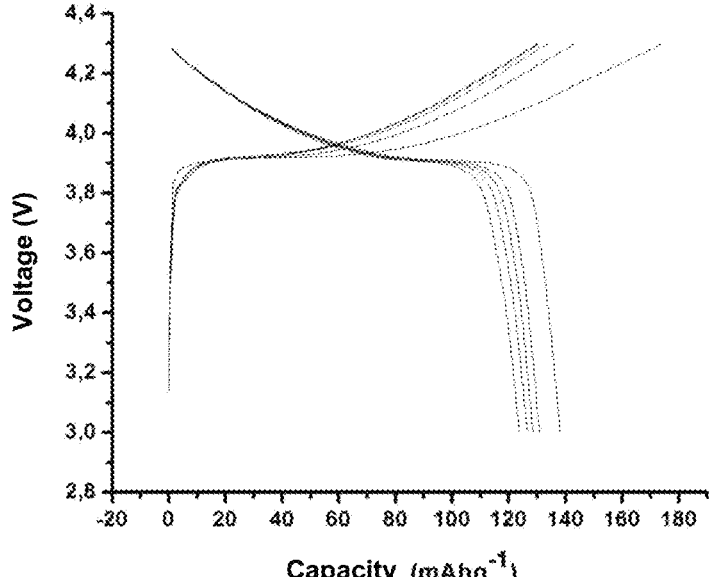
FIG. 6 represent charge/discharge curves of $LiCoO_2$.

FIG. 6 showed the five first charges and discharges of the $LiCoO_2$. The capacity reached 175 $mAhg^{-1}$ but decrease with the cycling. The capacity of the $LiCoO_2$ change Depending of the potential range but at higher potential, irreversible reaction could happen. However, at 4.3 V, the compound should be stable. Some optimization should be done to optimize the capacity and the stability of the $LiCoO_2$.

Example 3 Synthesis of $Ni_{0.8}Co_{0.15}Al_{0.05}(OH)_2$ 2.3121 g of $NiSO_4 \cdot 6H_2O$ (Strem Chemicals, inc), 0.4628 g of $CoSO_4 \cdot 6H_2O$ (Strem Chemicals, inc) and 0.0944 g of $Al_2(SO_4)_3 \cdot H_2O$ (Sigma-Aldrich) were dissolved in 10 mL of water.

Figure 7:
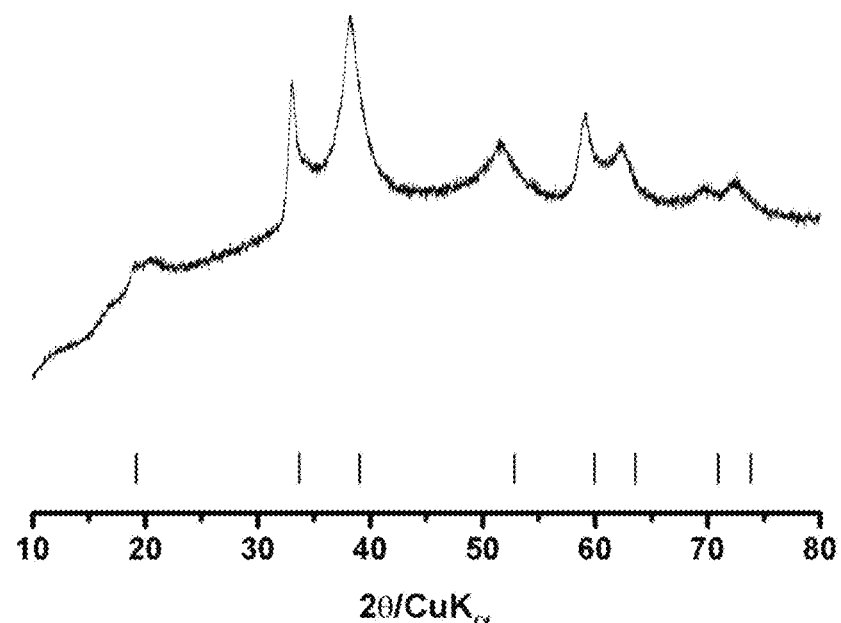
FIG. 7 is a X-Ray diffraction pattern of Nickel-Cobalt-Aluminum hydroxide $Ni_{0.8}Co_{0.15}Al_{0.05}O_2(OH)_2$ (in black) and the theoretical diffraction peaks of this compound (vertical bars)

The montage and the reaction condition were as described in Example 1. The final product gave $Ni_{0.8}Co_{0.15}Al_{0.05}(OH)_2$ with a green coloration. X-ray diffraction pattern confirmed the formation of the hydroxide, as the diffraction pattern presented in FIG. 7 may fit with the theoretical diffraction pattern of $Ni_{0.8}Co_{0.15}Al_{0.05}(OH)_2$ (vertical bars).

Example 4 Synthesis of $LiNi_{0.8}Co_{0.15}Al_{0.05}O_2$

The next experimental was the formation of the $LiNi_{0.8}Co_{0.15}Al_{0.05}O_2$. The experimental procedure was the same as in example 1. X-ray diffraction was used to characterize the formation of the oxide.

Figure 8:
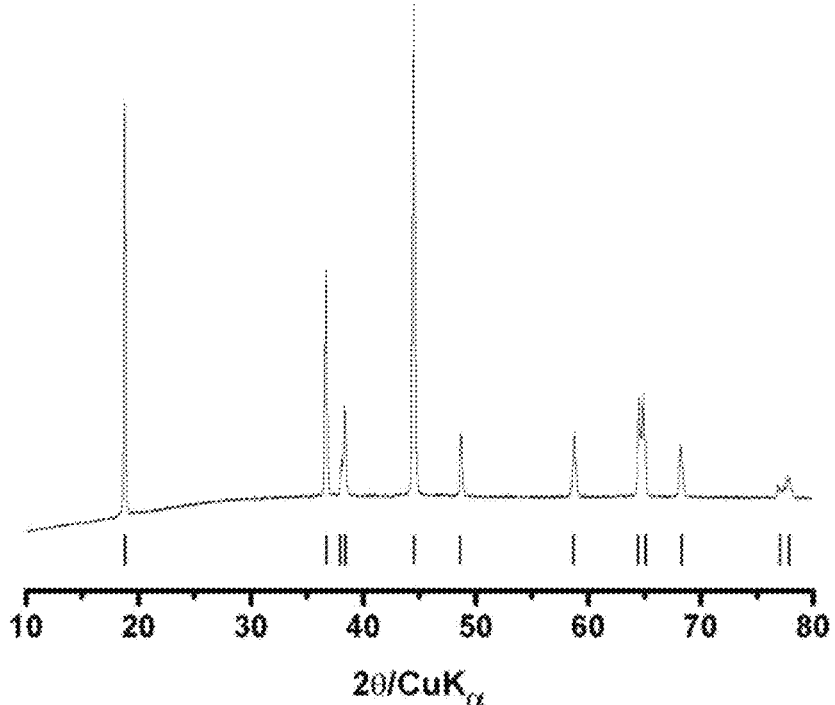
FIG. 8 is a X-Ray diffraction pattern of the lithiated Nickel-Cobalt-Aluminum oxide $LiNi_{0.8}Co_{0.15}Al_{0.05}O_2$ (in black) and the theoretical diffraction peaks of this compound (vertical bars)

FIG. 8 highlights that the diffraction pattern of the compound may fit with the theoretical diffraction peaks of $LiNi_{0.8}Co_{0.15}Al_{0.05}O_2$. The last characterization was the electrochemistry of the compound.

Figure 9:
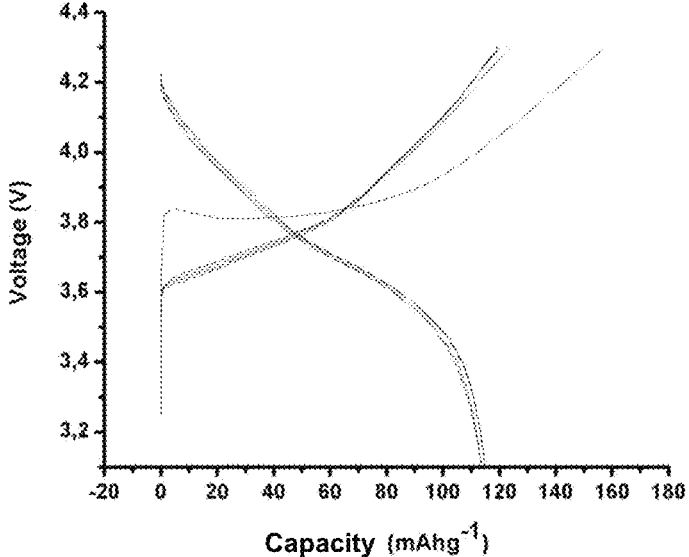
FIG. 9 is a charge/discharge curves of $LiNi_{0.8}Co_{0.15}Al_{0.05}O_2$.

FIG. 9 showed the charge and discharge of the $LiNi_{0.8}Co_{0.15}Al_{0.05}O_2$ at 0.1C rate. The electrochemistry procedure was detailed in example 2. The theoretical capacity of this compound is 279 mAh/g and the specific capacity obtained experimentally was 180 mAh/g. On FIG. 9, one can see two slopes in the discharge curve. This behaviour can be explained by the size particles of the active material, being wide and not optimized for electrochemistry purpose.

Example 5 Synthesis of $Ni_{0.8}Mn_{0.1}Co_{0.1}(OH)_2$ 2.3131 g of $NiSO_4 \cdot 6H_2O$ (Strem Chemicals, inc), 0.3092 g of $CoSO_4 \cdot 6H_2O$ (Strem Chemicals, inc) and 0.1859 g of $MnSO_4 \cdot H_2O$ (Sigma-Aldrich) were dissolved in 10 mL of water.

The montage and the reaction condition were as described in example 1.

Figure 10:
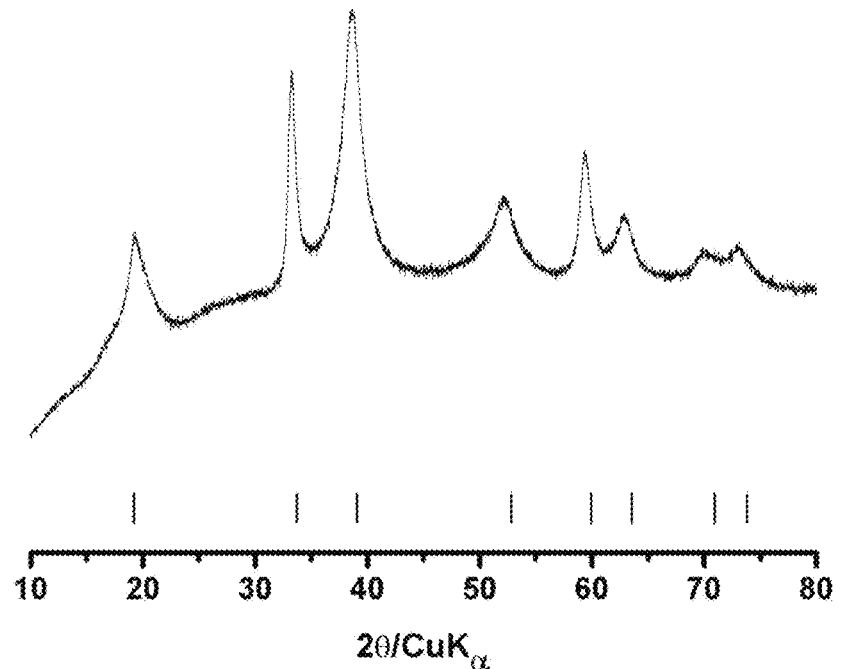
FIG. 10 is a X-Ray diffraction pattern of Nickel-Manganese-Cobalt hydroxide $Ni_{0.8}Mn_{0.1}Co_{0.1}(OH)_2$ (in black) and the theoretical diffraction peaks of this compound (vertical bars)

FIG. 10 highlights that the diffraction pattern of the compound may fit with the theoretical diffraction peaks of $Ni_{0.8}Mn_{0.1}Co_{0.1}(OH)_2$.

Example 6 Synthesis of $LiNi_{0.8}Mn_{0.1}Co_{0.1}O_2$

The next step was the formation of the oxide, $LiNi_{0.8}Mn_{0.1}Co_{0.1}O_2$. The experimental set-up was the same as in example 2. X-ray diffraction was used to characterize the formation of the oxide.

Figure 11:
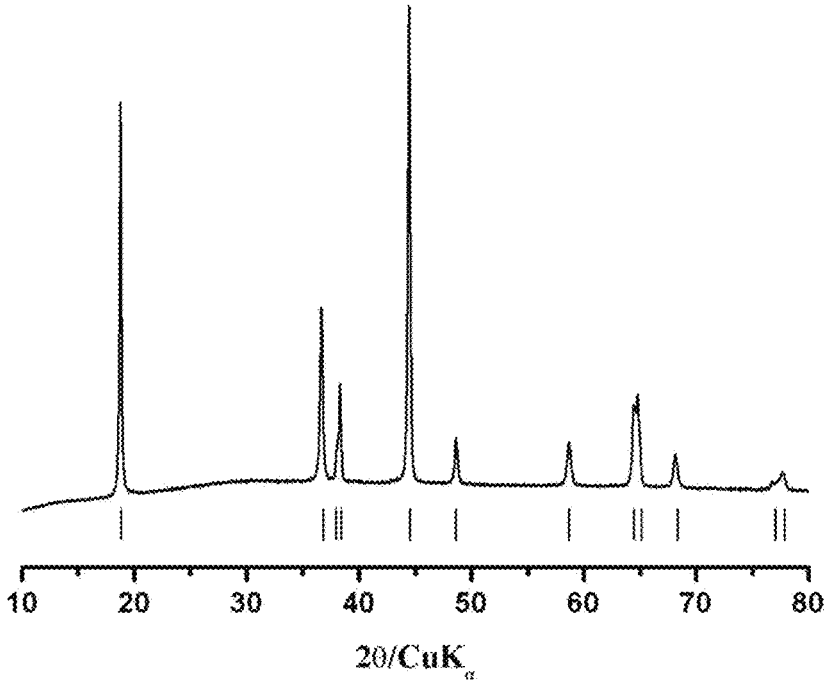
FIG. 11 is X-Ray diffraction pattern of lithiated Nickel-Manganese-Cobalt oxide $LiNi_{0.8}Mn_{0.1}Co_{0.1}O_2$ (in black) and the theoretical diffraction peaks of this compound (vertical bars)

FIG. 11 highlights that the diffraction pattern of the compound may fit with the theoretical diffraction peaks of $LiNi_{0.8}Mn_{0.1}Co_{0.1}O_2$.

The capacity reached 175 mAhg$^{-1}$ but decrease with the cycling. The capacity of the $LiCoO_2$ change depending of the potential range but at higher potential, irreversible reaction could happen.

Example 7 Synthesis of $Ni_{0.6}Mn_{0.2}Co_{0.2}(OH)_2$ 1.7348 g of $NiSO_4 \cdot 6H_2O$ (Strem Chemicals, inc), 0.6184 g of $CoSO_4 \cdot 6H_2O$ (Strem Chemicals, inc) and 0.3674 g of $MnSO_4 \cdot H_2O$ (Sigma-Aldrich) was dissolved in 10 mL of water.

The montage and the reaction condition were as described in example 1.

Figure 12:
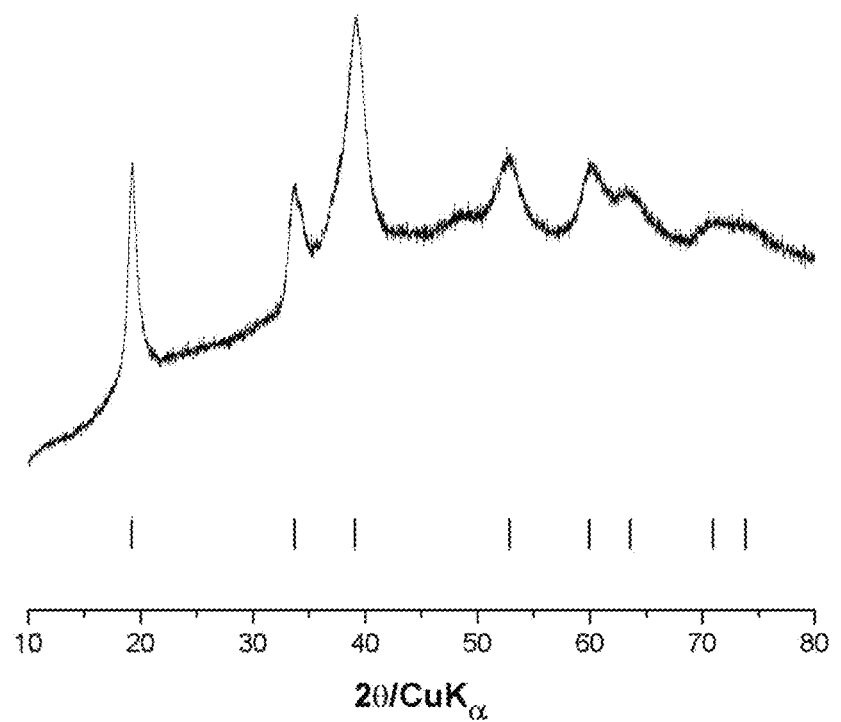
FIG. 12 is a X-Ray diffraction pattern of Nickel-Manganese-Cobalt hydroxide $Ni_{0.6}Mn_{0.2}Co_{0.2}(OH)_2$ (in black) and the theoretical diffraction peaks of this compound (vertical bars)

FIG. 12 shows highlights that the diffraction pattern of the compound may fit with the theoretical diffraction peaks of $Ni_{0.6}Mn_{0.2}Co_{0.2}(OH)_2$.

Example 8 Synthesis of $LiNi_{0.6}Mn_{0.2}Co_{0.2}O_2$

The next step was the formation of the oxide, $LiNi_{0.6}Mn_{0.2}Co_{0.2}O_2$. The experimental step was the same as the example 2. X-ray diffraction was used to characterize the formation of the oxide.

Figure 13:
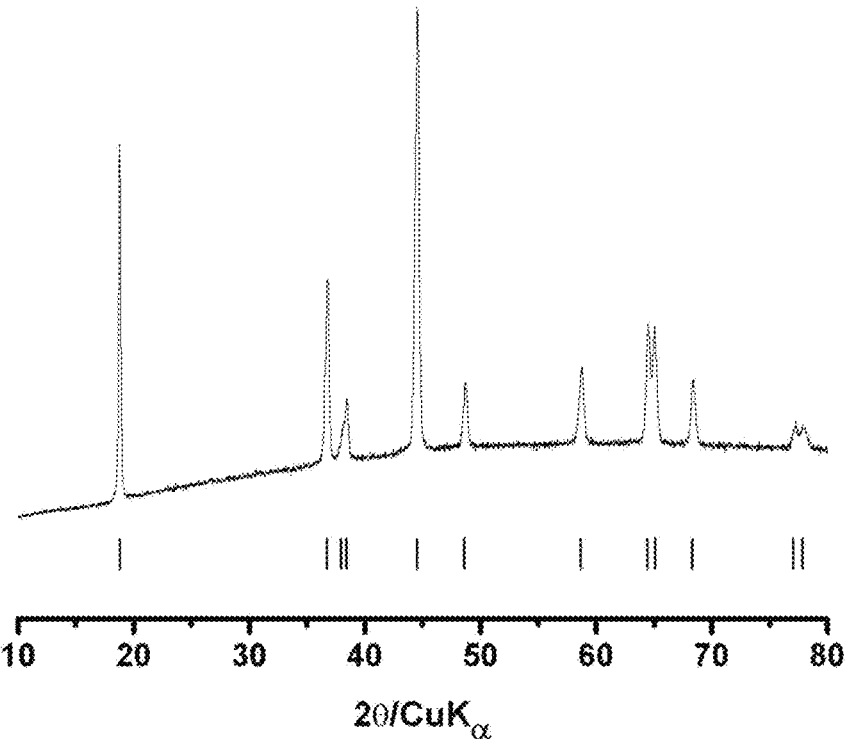
FIG. 13: X-Ray diffraction pattern of lithiated Nickel-Manganese-Cobalt oxide $LiNi_{0.6}Mn_{0.2}Co_{0.2}O_2$ (in black) and the theoretical diffraction peaks of this compound (vertical bars)

FIG. 13 highlights that the diffraction pattern of the compound may fit with the theoretical diffraction peaks of $LiNi_{0.6}Mn_{0.2}Co_{0.2}O_2$.

Figure 14:
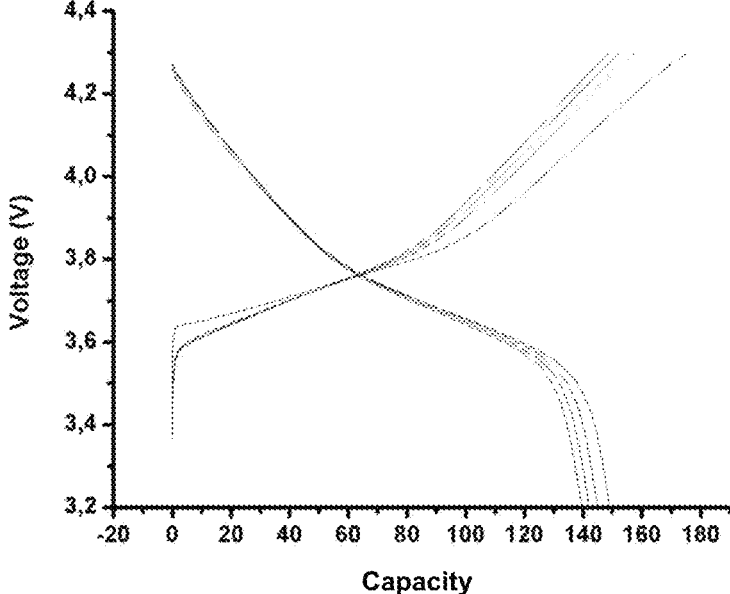
FIG. 14 represent charge/discharge curves of $LiNi_{0.6}Mn_{0.2}Co_{0.2}O_2$.

FIG. 14 represents the charge/discharge curves of $LiNi_{0.6}Mn_{0.2}Co_{0.2}O_2$ at 0.1C rate. The electrochemistry instrument and method were as described in example 2. The theoretical capacity of this compound is 275 mAh/g and the specific capacity obtained experimentally was 170 mAh/g. On FIG. 14, one can see two slopes in the discharge curve. This behaviour can be explained by the size particles of the active material, being wide and not optimized for electrochemistry purpose.

Example 9 Electrolysis of Lithium Sulfate and Conversion into Lithium Hydroxide Electrolysis of lithium sulfate was carried out in a two-compartment cell ICI FM-21 (similar to the cell of FIG. 2 of WO2015058287) by following the general procedure described in Example 1 of WO2015058287. The experimental conditions were as follows:

Cell: FM-21 2400 cm$^2$

Current density: 4.0 kA/m$^2$

Temperature: 60° C.

$Li_2SO_4$: 300 g/L (batch)

$LiOH \cdot H_2O$: 2 M

The results obtained were as follows:

Conversion rate: 40%

$H_2SO_4$: 10.2%

Current efficiency: 76.9%

Flow rate LiOH: 14.4 L/h

Productivity: 4.75 kg of $LiOH \cdot H_2O$/h/m$^2$

Voltage (at the cell): 4.39 V

Energy: 3678 kWh/TM $LiOH \cdot H_2O$

FIGS. 15 to 22 show the results obtained during electrolysis of $Li_2SO_4$.

Figure 15:
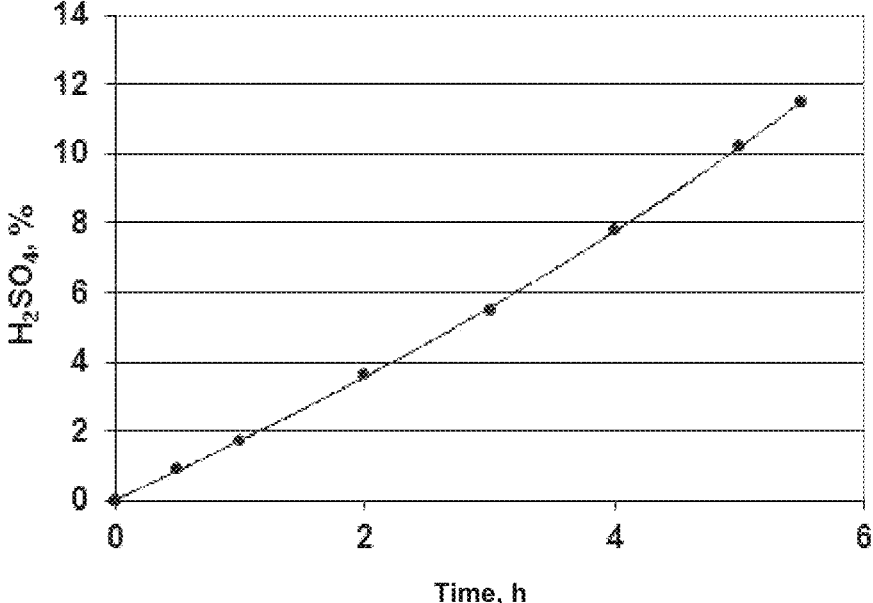
FIG. 15 is a plot showing concentration of $H_2SO_4$ in the anolyte of a two-compartment cell as a function of time in an example of electrolysis of $Li_2SO_4$.
Figure 16:
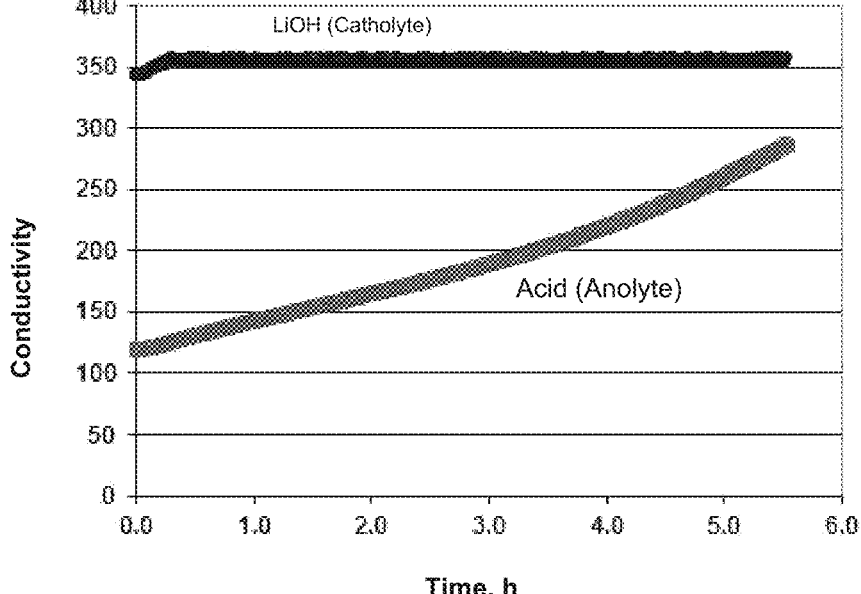
FIG. 16 is a plot showing conductivity of anolyte and catholyte in a two-compartment cell as a function of time in an example of electrolysis of $Li_2SO_4$.
Figure 17:
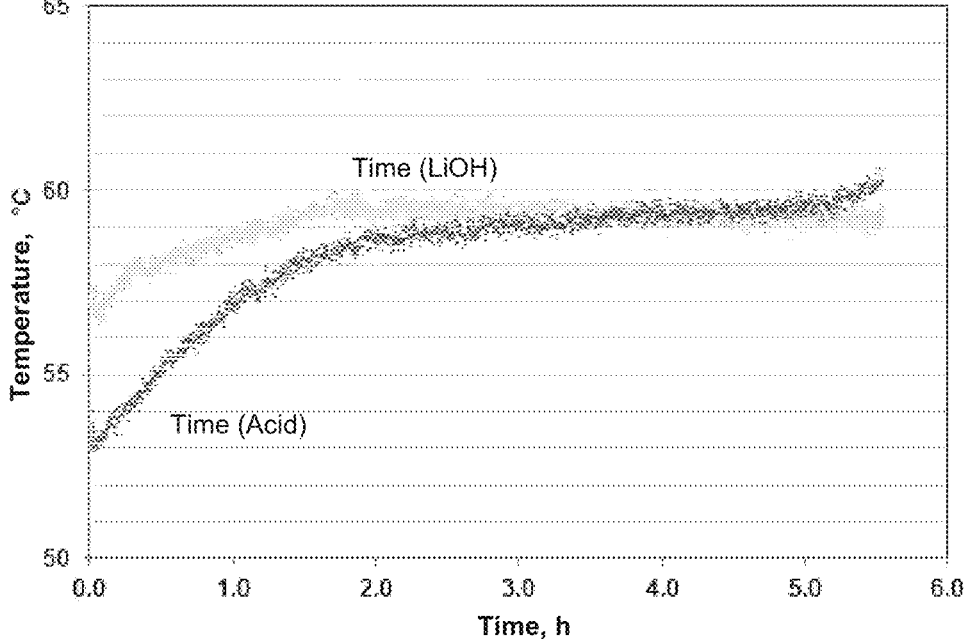
FIG. 17 is a plot showing temperature of anolyte and catholyte in a two-compartment cell as a function of time in an example of electrolysis of $Li_2SO_4$.
Figure 18:
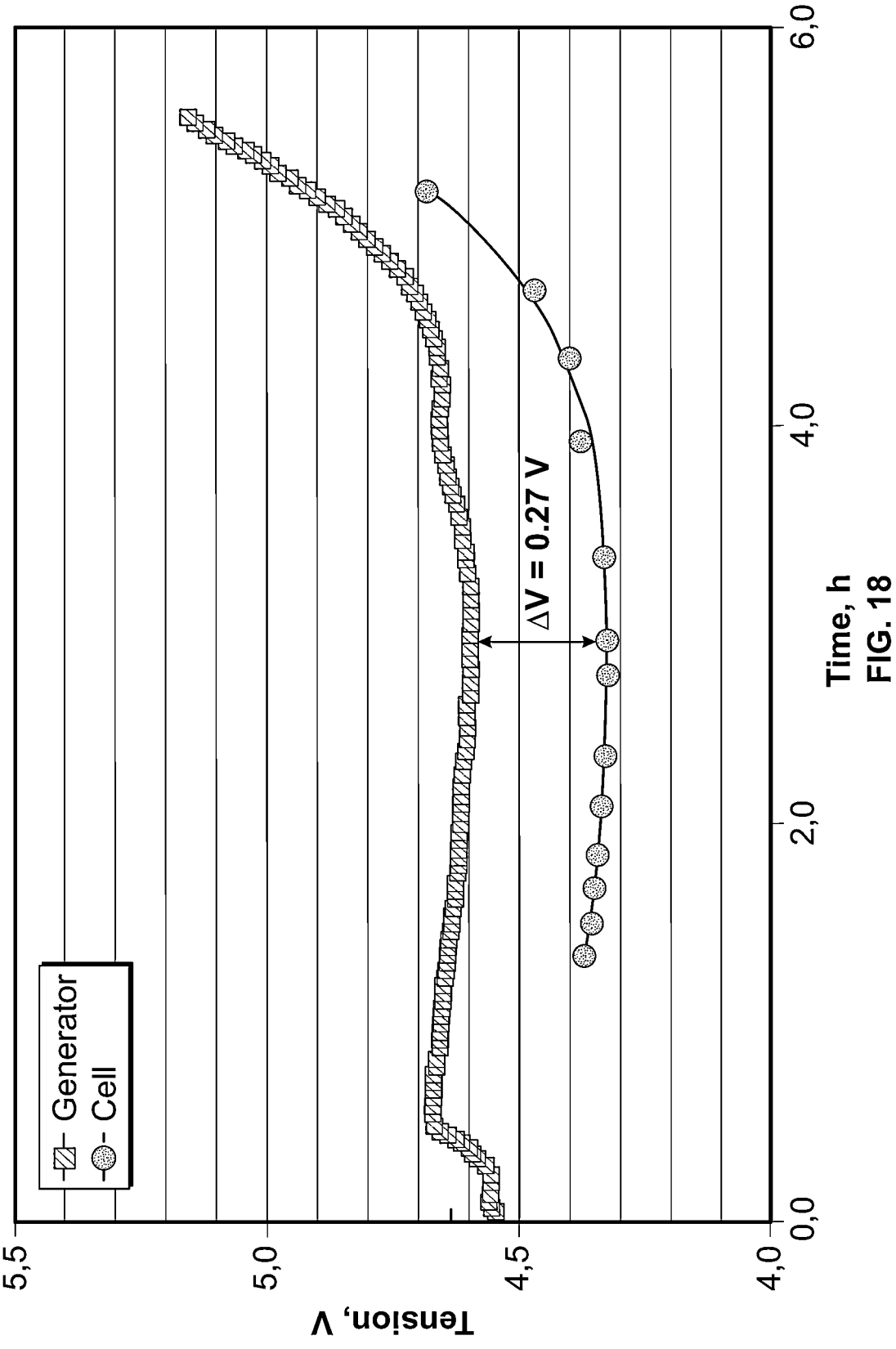
FIG. 18 is a plot showing voltage in a two-compartment cell as a function of time in an example of electrolysis of $Li_2SO_4$.
Figure 19:
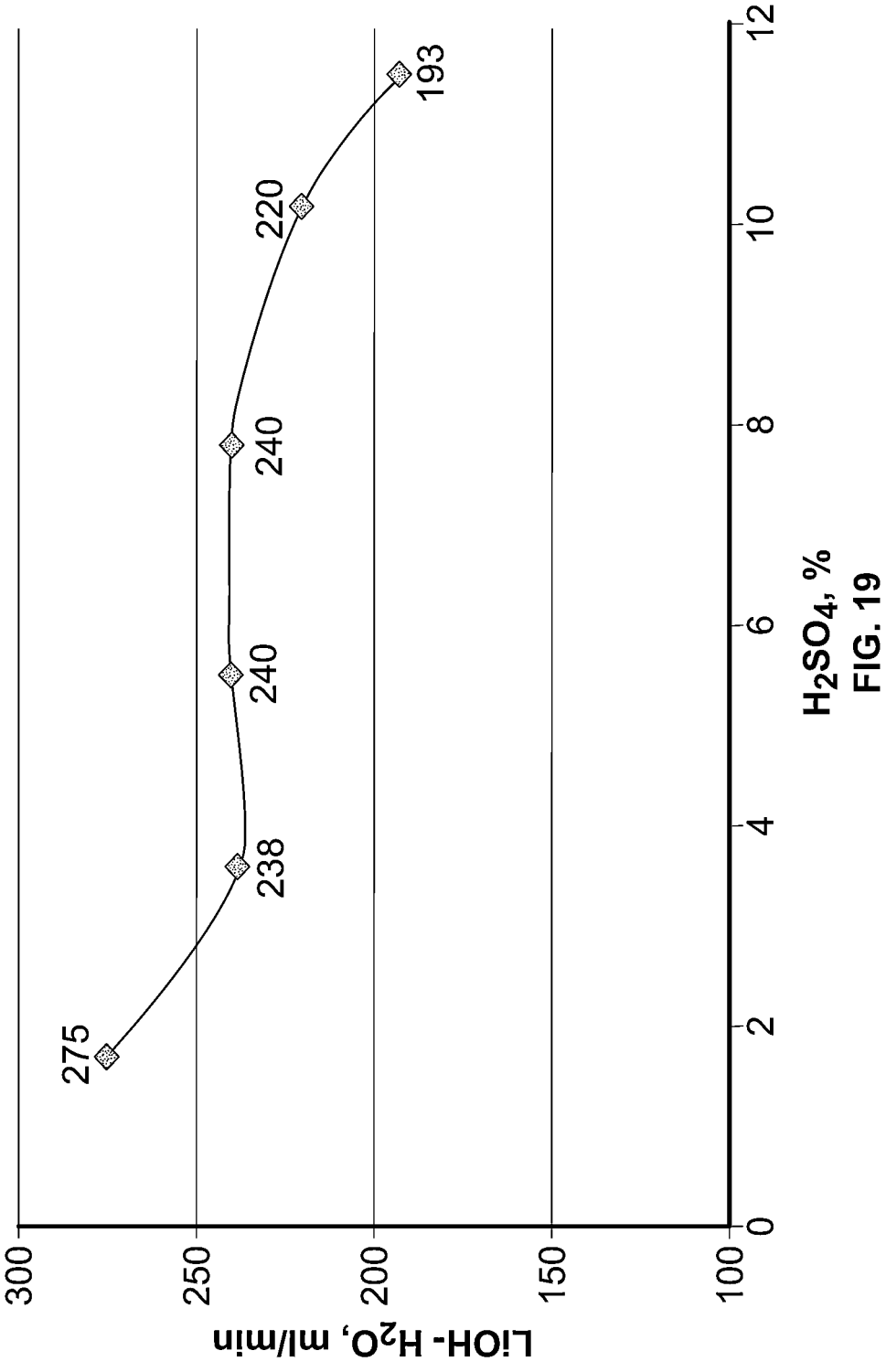
FIG. 19 is a plot showing flow rate of $LiOH \cdot H_2O$ as a function of concentration of $H_2SO_4$ in a two-compartment cell in an example of electrolysis of $Li_2SO_4$.
Figure 20:
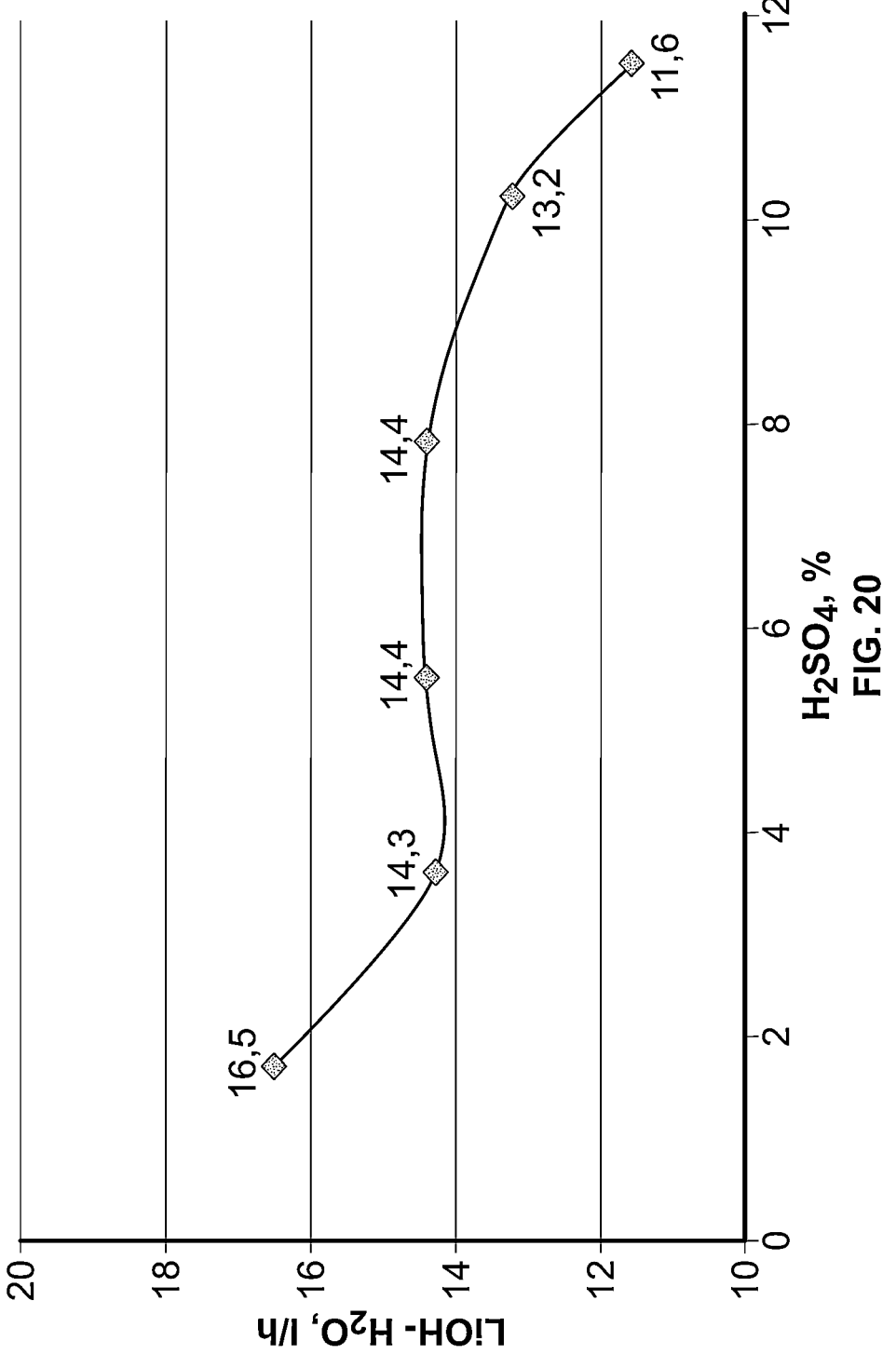
FIG. 20 is another plot showing flow rate of $LiOH \cdot H_2O$ as a function of concentration of $H_2SO_4$ in a two-compartment cell in an example of electrolysis of $Li_2SO_4$.
Figure 21:
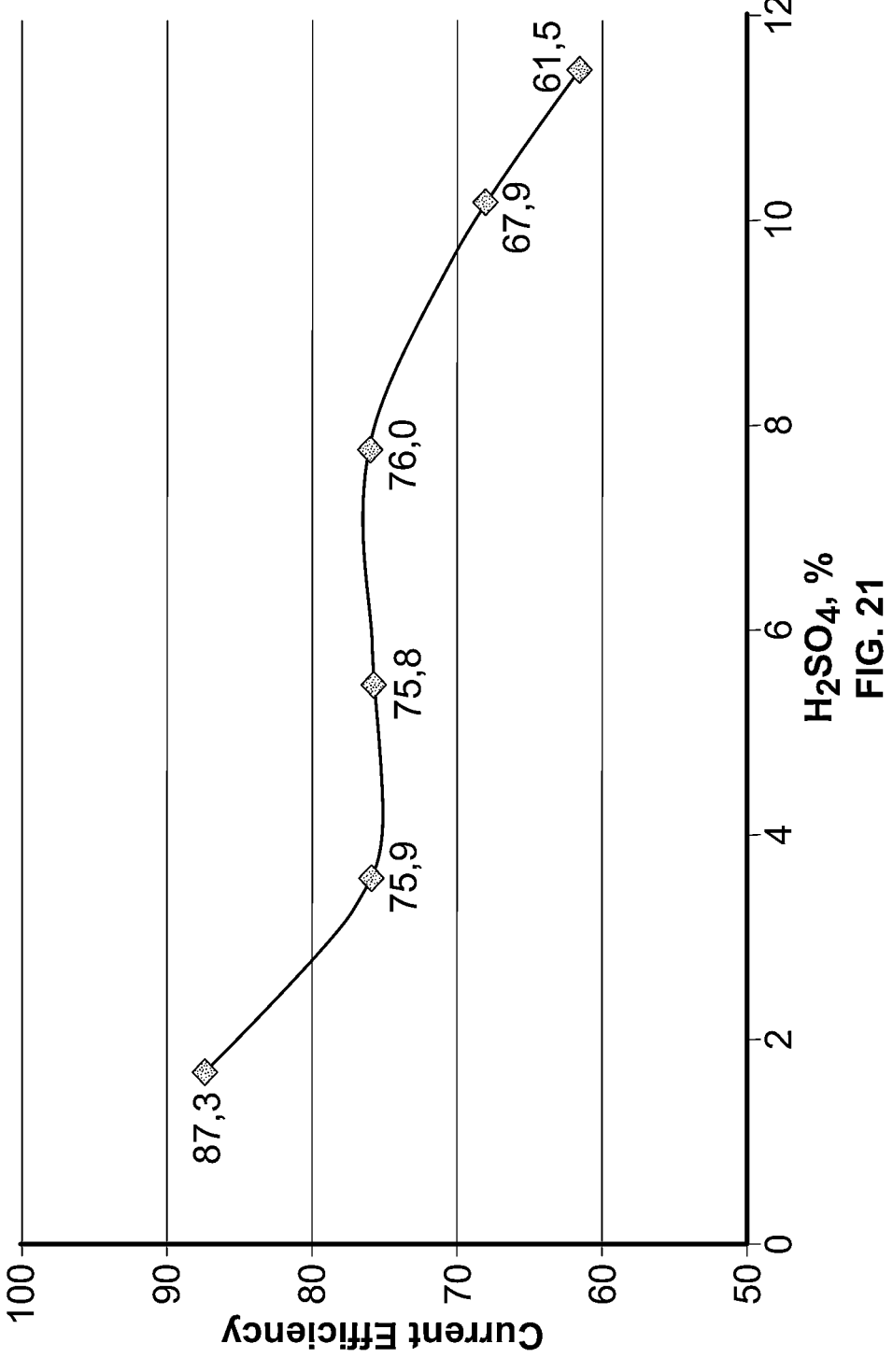
FIG. 21 is a plot showing current efficiency as a function of concentration of $H_2SO_4$ in a two-compartment cell in an example of electrolysis of $Li_2SO_4$.
Figure 22:
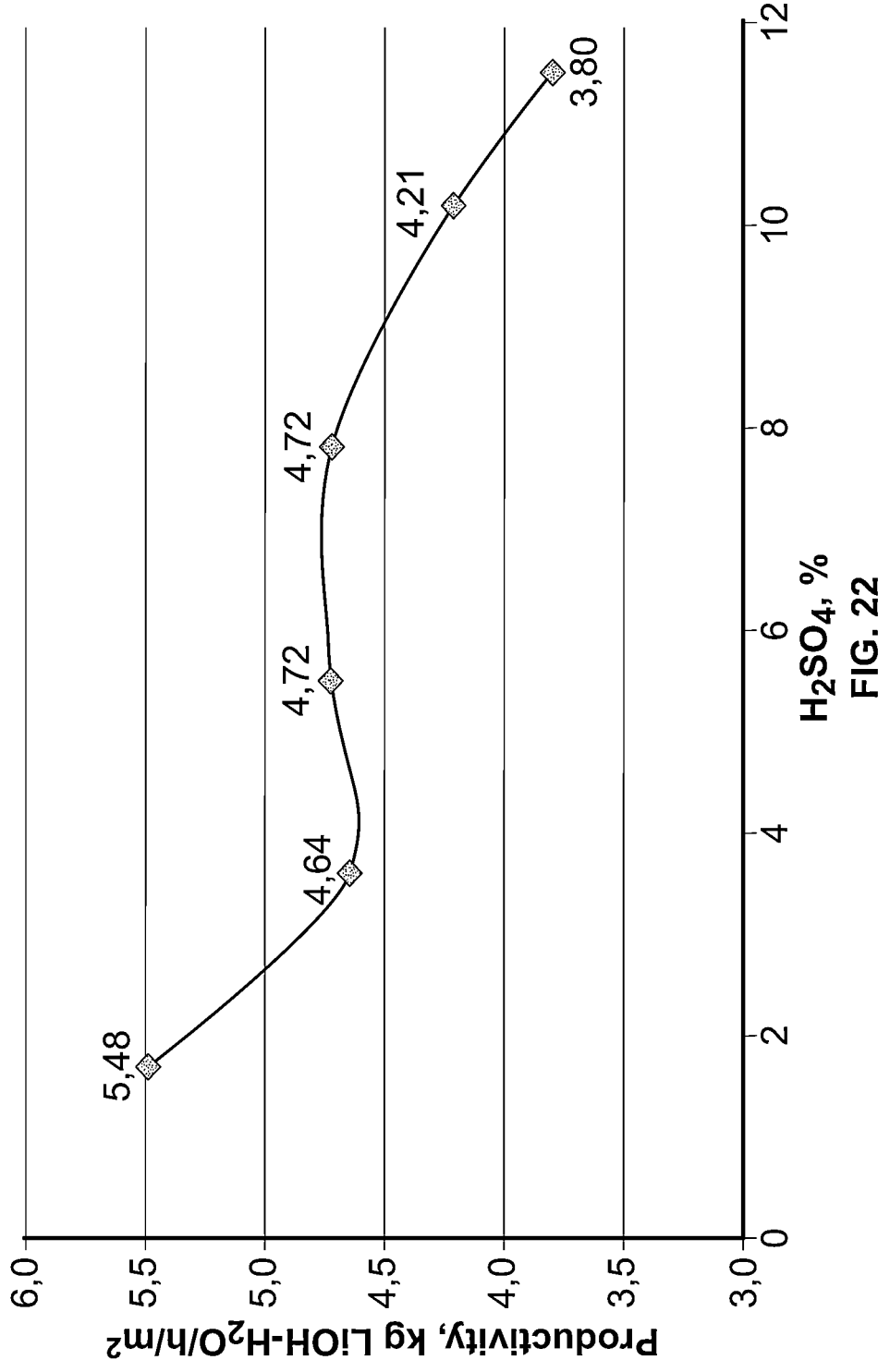
FIG. 22 is a plot showing productivity of $LiOH \cdot H_2O$ as a function of concentration of $H_2SO_4$ in a two-compartment cell in an example of electrolysis of $Li_2SO_4$.
Figure 23:
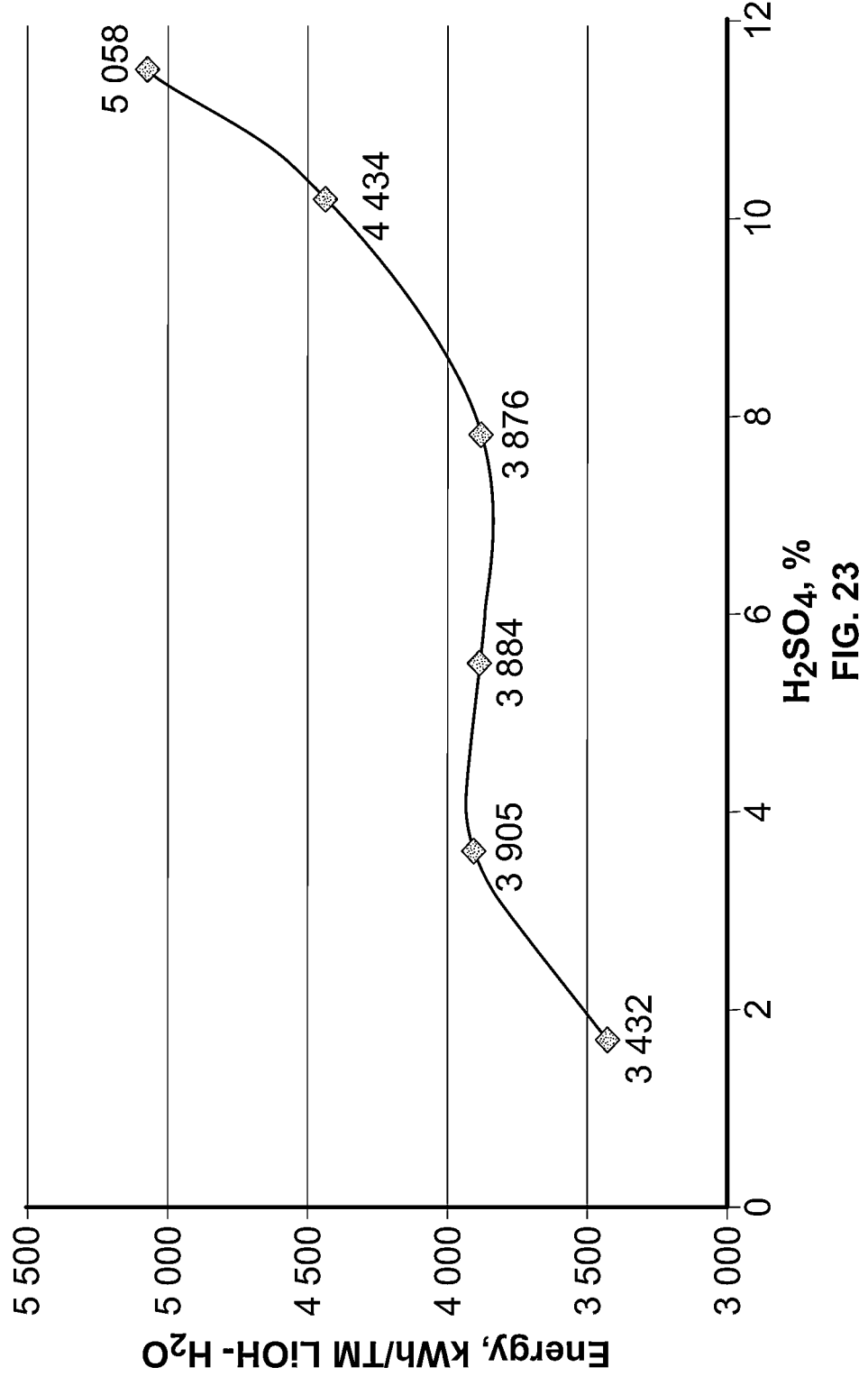
FIG. 23 is a plot showing energy consumption as a function of concentration of $H_2SO_4$ in a two-compartment cell in an example of electrolysis of $Li_2SO_4$.

FIG. 15 is a plot showing sulphuric acid concentration in the anolyte stream as a function of batch time; FIG. 16 is a plot showing anolyte and catholyte conductivities as a function of batch time; FIG. 17 is a plot showing anolyte and catholyte temperature as a function of batch time; FIG. 18 is a plot showing voltage at cell and at current generator as a function of batch time; FIG. 19 is a plot showing productivity in milliliters of lithium hydroxide monohydrate equivalent per minute as a function of sulfuric acid concentration in the anolyte; FIG. 20 is a plot showing productivity in liters of lithium hydroxide monohydrate equivalent per hour as a function of sulfuric acid concentration in the anolyte; FIG. 21 is a plot showing current efficiency as a function of sulfuric acid concentration in the anolyte; FIG. 22 is a plot showing productivity in kilograms of lithium hydroxide monohydrate equivalent per hour per meter square of electroactive area as a function of sulfuric acid concentration in the anolyte; FIG. 23 is a plot showing electric energy consumption related to the electrochemical conversion in kilowatt-hour per metric ton of lithium hydroxide monohydrate equivalent as a function of sulfuric acid concentration in the anolyte.

Figure 24:
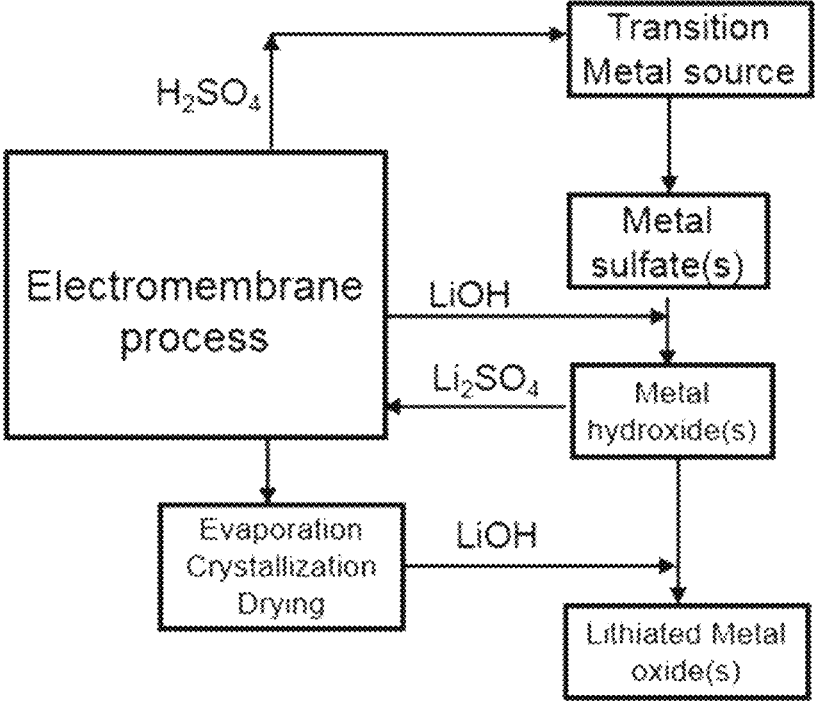
FIG. 24 is a schematic diagram of a process according to an embodiment of the present disclosure using LiOH as pH enhancer.

As shown in FIG. 24 LiOH can be added as a source of pH enhancer to a mixture of metal sulfate(s) for the precipitation of the metal hydroxide(s). After precipitation of the metal hydroxide(s), $Li_2SO_4$ can be recovered as a dissolved species in aqueous solution to be inserted in the membrane electrolyser, and can be converted into LiOH and optionally going through evaporation, crystallization and drying before reacting with a metal hydroxide(s) to form a metal oxide(s). Sulfuric acid is used for the leaching of the transition metal source, generating metals as dissolved species in sulfate forms.

Figure 25:
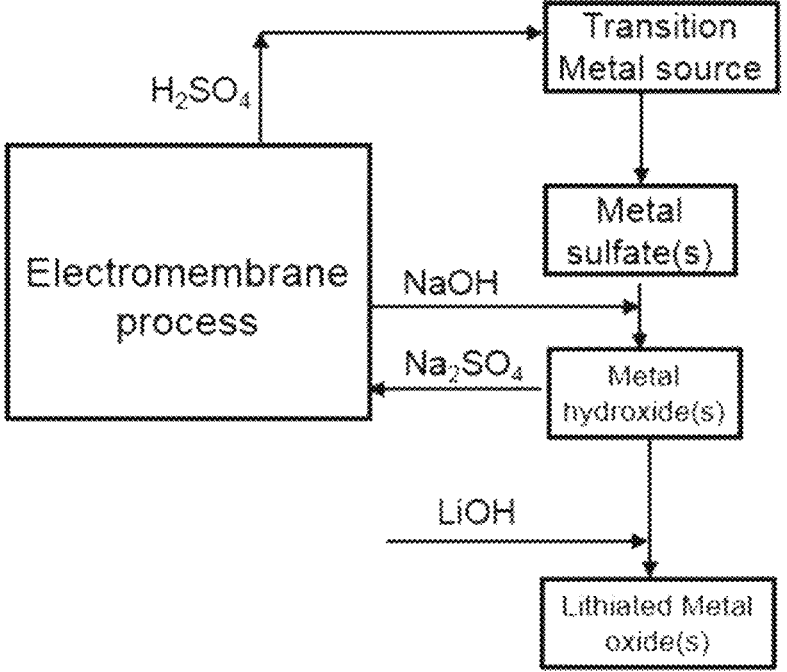
FIG. 25 is a schematic diagram of a process according to an embodiment of the present disclosure using NaOH as pH enhancer.

As shown in FIG. 25 NaOH can be added as a source of pH enhancer to a mixture of metal sulfate(s) for the precipitation of the metal hydroxide(s). After precipitation of the metal hydroxide(s), $Na_2SO_4$ can be recovered as a dissolved species in aqueous solution to be inserted in the membrane electrolyser. LiOH can be reacted with a metal hydroxide(s) to form a metal oxide(s). If Lithium is present in the Transition Metal Source, it will be carried out in the metal sulfate solution, the obtained $Li_2SO_4$ can be separated from $Na_2SO_4$ to purify the $Na_2SO_4$ solution before being inserted in the membrane electrolyser. The LiOH used to react with the Lithiated Metal oxide can come from another electromembrane process, or be a commercial LiOH.

Figure 26:
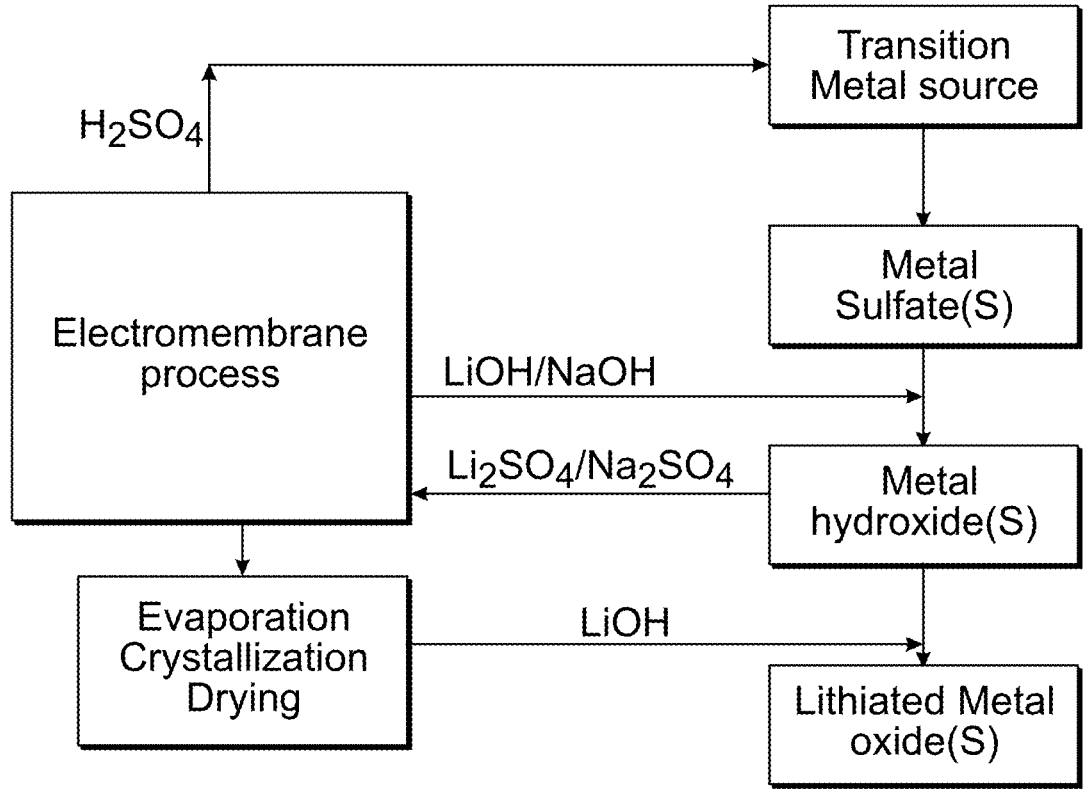
FIG. 26 is a schematic diagram of a process according to an embodiment of the present disclosure using LiOH and/or NaOH as pH enhancer.

As shown in FIG. 26, a mixture of NaOH and LiOH is used as a source of pH enhancer to a mixture of metal sulfate(s) for the precipitation of the metal hydroxide(s). After precipitation of the metal hydroxide(s), a mixture of $Li_2SO_4$ and $Na_2SO_4$ can be recovered as dissolved species in aqueous solution to be inserted in the membrane electrolyser, and $Li_2SO_4$ can be converted into LiOH to react with a metal hydroxide(s) to form a metal oxide(s). LiOH can be separated from NaOH. For example, LiOH can be substantially selectively precipitated (for example via evaporation, crystallization and drying step) over NaOH and thus separated therefrom. Also, $Li_2SO_4$ can be optionally separated from $Na_2SO_4$ before reacting in the electromembrane process. The obtained LiOH can be reacted with so as to eventually be used to generate metal oxide(s) by reacting with the metal hydroxide(s) to form a metal oxide(s).

Figure 27:
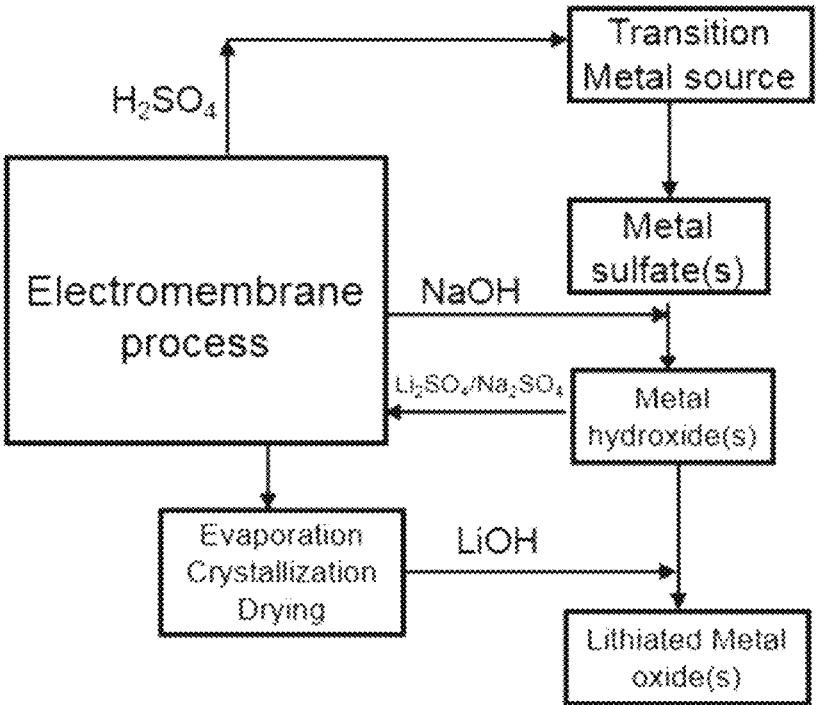
FIG. 27 is a schematic diagram of a process according to an embodiment of the present disclosure using NaOH as pH enhancer for a metalu sulfate solution containing Lithium ions.

As shown in FIG. 27 NaOH can be added as a source of pH enhancer to a mixture of metal sulfate(s) for the precipitation of the metal hydroxide(s). For example, NaOH can be used instead of LiOH as a pH enhancer because of economical reasons. After precipitation of the metal hydroxide(s), a mixture of $Li_2SO_4$ and $Na_2SO_4$ can be recovered as a dissolved species in aqueous solution to be inserted in the membrane electrolyser, and $Li_2SO_4$ can be converted into LiOH to react with a metal hydroxide(s) to form a metal oxide(s). LiOH can be substantially selectively precipitated (for example via evaporation, crystallization and drying step) over NaOH. The obtained LiOH can be reacted with so as to eventually be used to generate metal oxide(s) by reacting with the metal hydroxide(s) to form a metal oxide(s). The person skilled in the art would understand that if for example the transition metal source is a spent battery, it can be possible that 100% of the lithium contained therein will not necessarily be electrolyzed and thus, an external source of $Li_2SO_4$ can be provided to the electromembrane process to be converted into LiOH.

Figure 28:
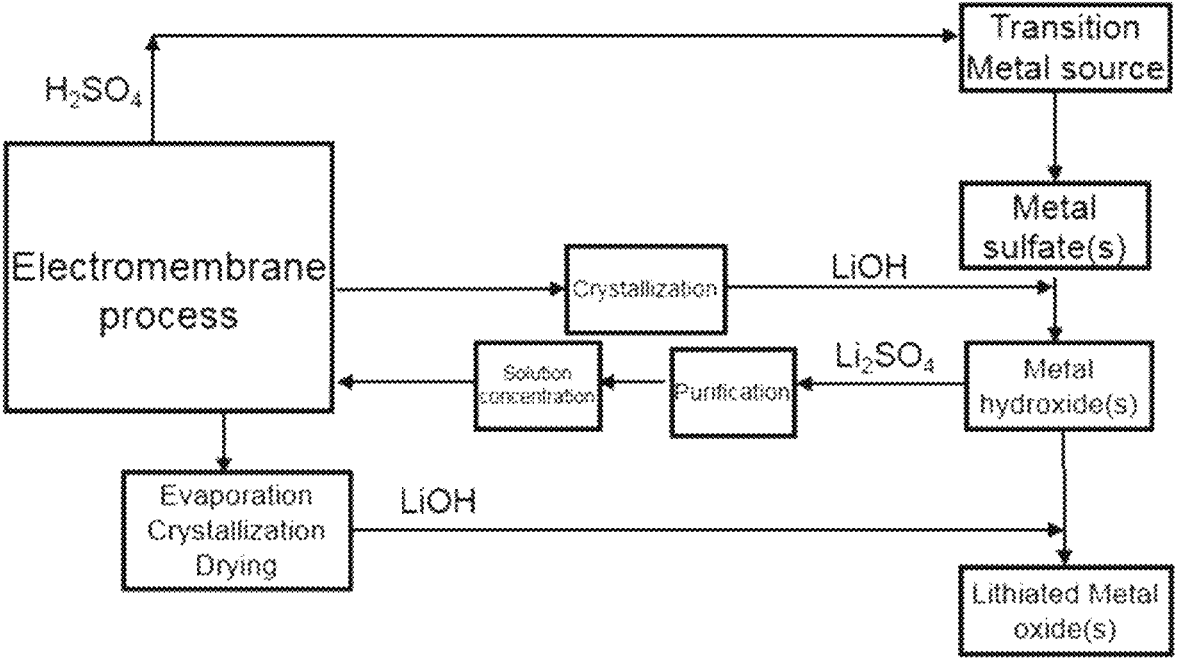
FIG. 28 is a schematic diagram of a process according to an embodiment of the present disclosure, with purification and/or concentration of the sulfate solution recovered before electromembrane process.

As shown in FIG. 28, the LiOH used for the precipitation of the hydroxide can be optionally crystallized. Moreover, the lithium sulfate solution can be purified and concentrated before being inserted in electromembrane process. For example, an external source of $Li_2SO_4$ can be provided in the present case. In fact, since LiOH generated is used for (i) reacting with the metal sulfate and (ii) to be mixed with the obtained metal hydroxide(s), an external source of $Li_2SO_4$ can be provided.

Figure 29:
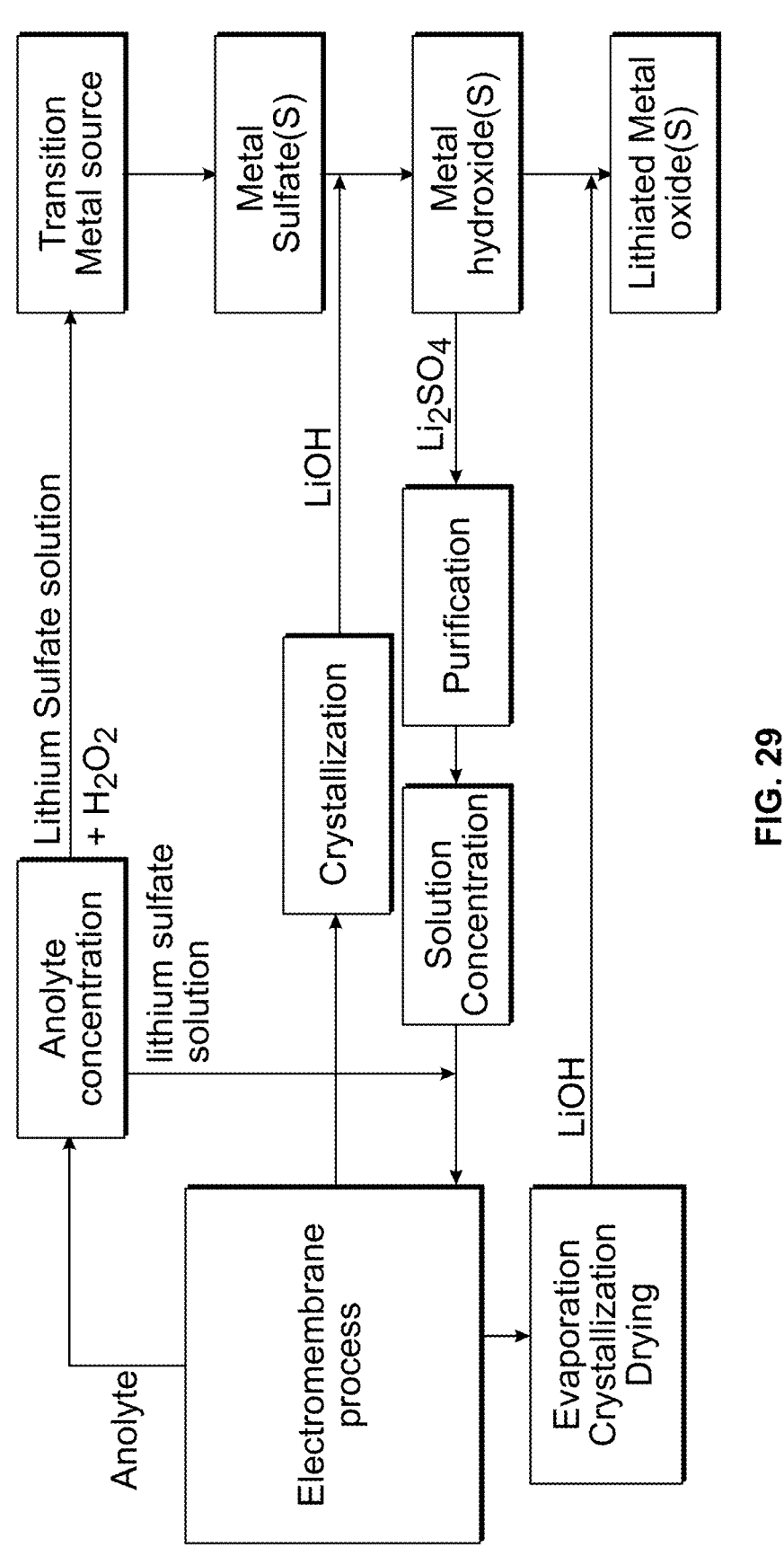
FIG. 29 is a schematic diagram of a process according to an embodiment of the present disclosure, with purification and/or concentration of the sulfate solution recovered before electromembrane process and concentration of the anolyte solution, and addition of $H_2O_2$.

As shown in FIG. 29, the electrochemically generated sulfuric acid solution, called the anolyte solution, can be concentrated to leach the transition metal source, e.g. a battery active material.

The anolyte concentration process described in FIG. 29 can be carried out by a method or process as described in one of WO2015123762, WO2017031595 and WO2018035618. These documents are hereby incorporated by reference in their entirety. The person skilled of the art can will understand that the anolyte concentration from FIG. 29 can therefore be applied in any of FIG. 24 to FIG. 28. The Anolyte solution after concentration will be lithium-depleted, and the $Li_2SO_4$ rich solution will be inserted back in the electromembrane system to be processed. The lithium sulfate solution obtained after anolyte concentration can be mixed with the $Li_2SO_4$ solution recovered after hydroxide precipitation as described in FIG. 29. Such mixture of $Li_2SO_4$ solutions can be returned to the electromembrane process.

Figure 30:
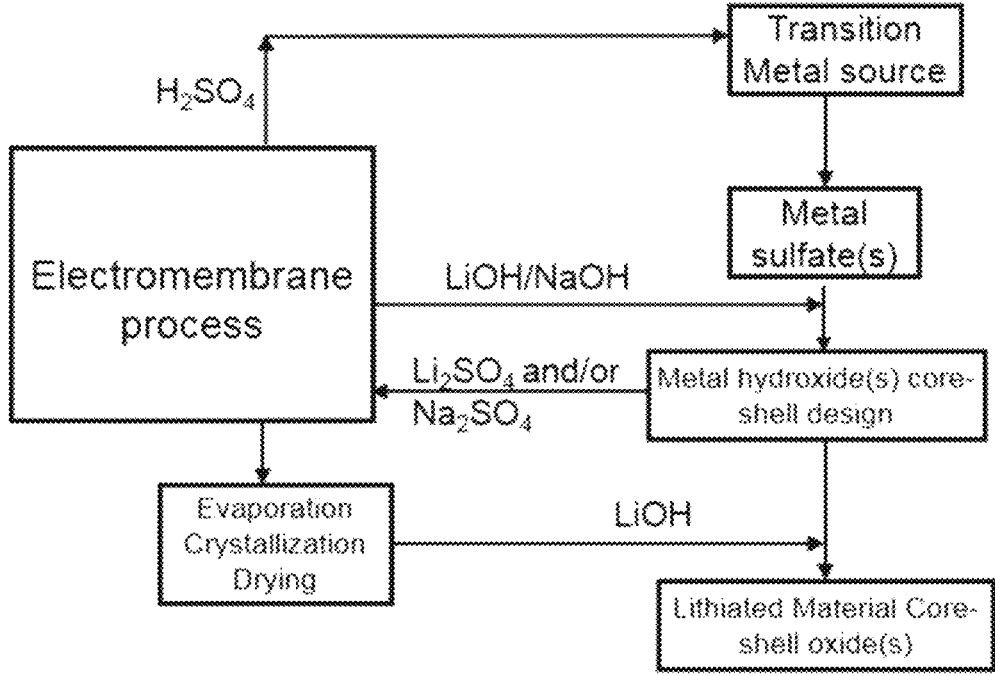
FIG. 30 is a schematic diagram of a process according to an embodiment of the present disclosure for the core-shell synthesis using LiOH and/or NaOH as pH enhancer.

FIG. 30 describes the synthesis of a core-shell design material. The metal hydroxide with a core-shell design can be precipitated as described from FIG. 24 to FIG. 29, and the lithiated material core-shell oxide can be obtained after addition of LiOH.

From FIG. 28 to FIG. 29, the person skilled of the art can understand that LiOH optionally crystallized can be replaced by NaOH or a mixture of both to enhance the pH. Same apply for $Li_2SO_4$ that could be replaced by $Na_2SO_4$ or a mixture of both. The person skilled of the art can also understand that the concentration and purification of the sulfate solution as describe in FIG. 29 can be applied for any processes from FIG. 24 to FIG. 30.

FIG. 31 describes the precipitation of metal carbonates instead of metal hydroxides. To do so, the LiOH as generated from the membrane electrolysis can be carbonated to form $Li_2CO_3$. For example, carbonatation can be carried out as described in WO2013177680, WO2006104367, WO2018134536 or in WO2015058287, that are hereby incorporated by reference in their entirety. This lithium carbonate can react with the metal sulfate to form the metal carbonate. A lithium sulfate solution will be recovered as described in FIG. 24 to 30.

The person skilled of the art will understand that all the possible embodiment described from FIG. 24 to FIG. 31 can also be applied in FIG. 32 replacing sulfate by nitrate (e.g. concentration of $Li_2SO_4$ solution and/or $Li_2SO^4$ and mixture with $Na_2SO_4$).

Besides, the person skilled of the art can understand that LiOH can be replaced by NaOH or a mixture of both in any of FIG. 24 to FIG. to FIG. 31. Same apply for $Li_2SO_4$ that could be replaced by $Na_2SO_4$ or a mixture of both.

From FIG. 24 to FIG. 31, various sources of acid solution can be used for the reaction with the Transition Metal source, for example it can be sulfuric acid solution (FIG. 24), lithium sulfate solution (FIG. 29), and anolyte solution. For example, these various sources of acid solution for the leaching solution can be: (A) Electrochemically generated sulfuric acid solution, called anolyte solution; (B) Partially concentrated sulfuric acid solution generated by membrane electrolysis, called (diluted) Lithium Sulfate solution or (C) Sulfuric acid. The (a) anolyte solution relates to an electrochemically generated sulfuric acid solution from a membrane electrolysis, having the chemical composition as presented in Table 1. The concentration of this solution was $\approx 1.5$ M $H_2SO_4$.

TABLE 1

| Composition of the electrochemically generated sulfuric acid solution as it exists in the membrane electrolysis. | |
| --- | --- |
| | Percentages (wt %) |
| $Li_2SO_4$ | 10-20 |
| $H_2SO_4$ | 10-15 |
| $H_2O$ | 65-75 |

The (b) partially concentrated sulfuric acid solution generated by membrane electrolysis, called (diluted) Lithium Sulfate solution, consists of the previous anolyte solution depleted in lithium, concentrated and then diluted in water to reach a concentration of $\approx 1$ M $H_2SO_4$.

From FIG. 32, nitric acid can be generated from the salt splitting of $LiNO_3$ used instead of $Li_2SO_4$. The leaching of the transition metal source with nitric acid will lead to the production of metal nitrates dissolved in solutions. Then, LiOH is added for the precipitation of the hydroxide, and a nitric lithiated solution can be filtrate. This $LiNO_3$ solution can enter the electromembrane process to be converted into LiOH and $HNO_3$. All the embodiments of FIG. 24 to FIG. 31 apply here when replacing sulfate by FIG. 32.

Figure 34:
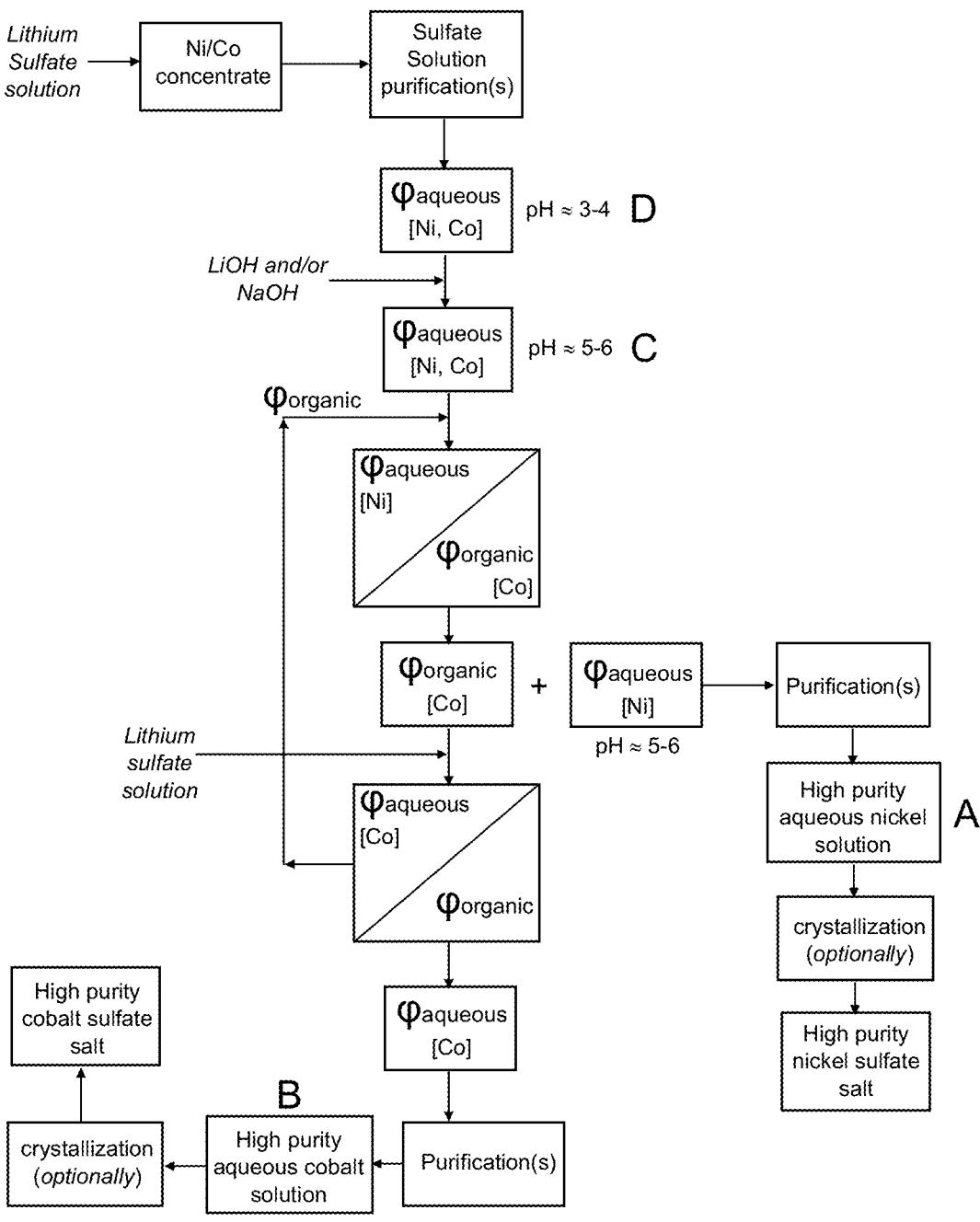
FIG. 34 is a schematic diagram of a process for the production of high purity sulfate salts.
Figure 35:
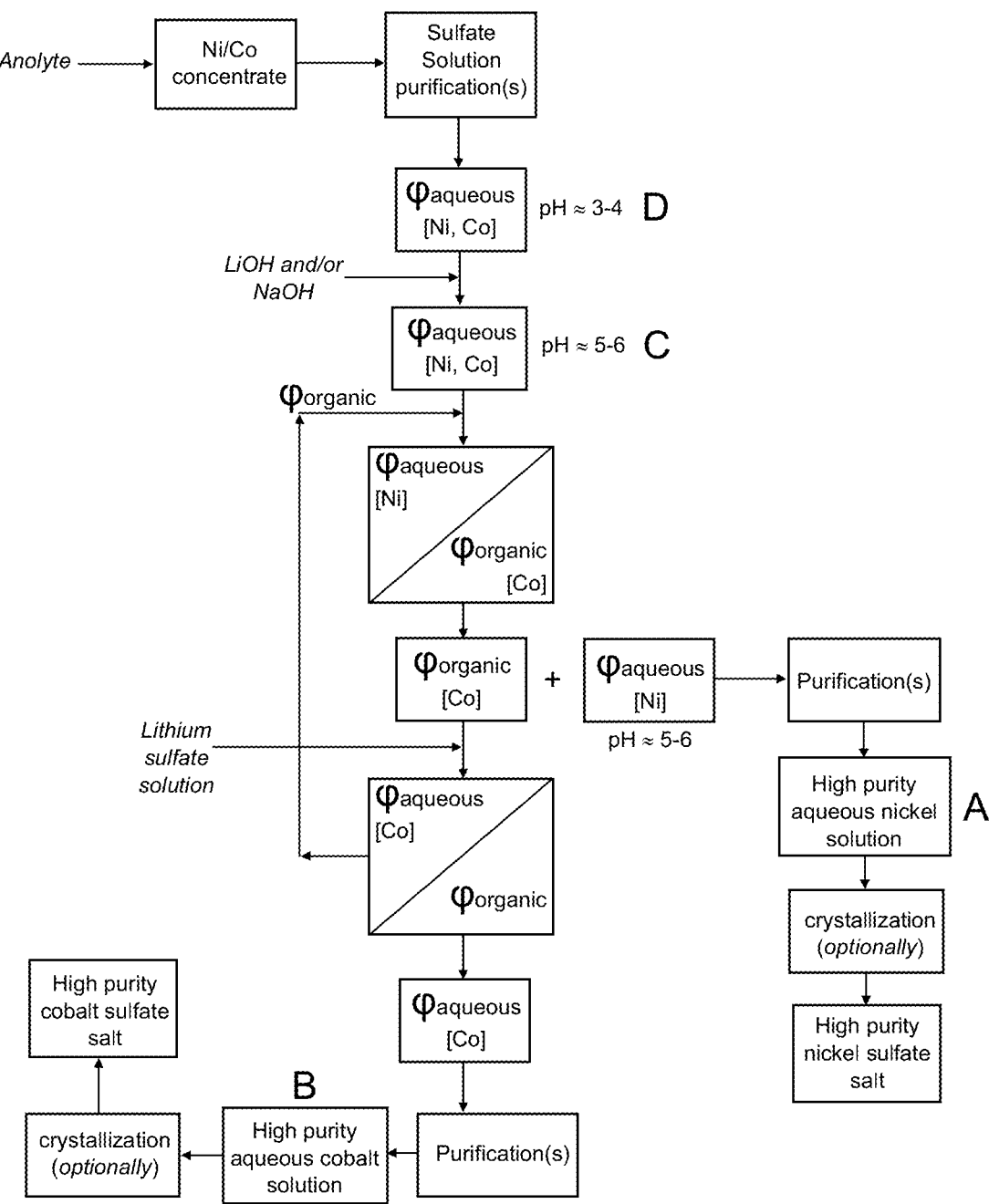
FIG. 35 is a schematic diagram of a process for the production of high purity sulfate salts.

The overall protocol starting from the Ni and Co concentrate is illustrated in FIG. 33, FIG. 34, FIG. 35, and can lead to the production of high purity Co and Ni aqueous phases (called solution A and B in FIG. 33, FIG. 34, FIG. 35), to the production of high purity Co or Ni aqueous solutions (called C and D), or to the cobalt sulfate or nickel sulfate crystallized salts (called E and F). For example, the pH is increased from solution A to B to ensure a maximum recovery of the cobalt in the organic phase. For example, Lithium Sulfate solution can be provided by the anolyte solution as generated by the electromembrane process, and concentrated as described in FIG. 29

From FIG. 33 to FIG. 35, various sources of acid solution can be used for the leaching of the Li—Co concentrate, for example it can be sulfuric acid solution (FIG. 33), lithium sulfate solution (FIG. 34), and anolyte solution (FIG. 35).

The person skilled in the art would understand that for example the embodiments provided in FIG. 33 to FIG. 35 can be applicable in the processes shown FIG. 24 to FIG. 31, and metal sulfates obtained in FIG. 33 to FIG. 35 can be the source of the Transition Metal box from FIG. 24 to FIG. 31. Besides, the sulfate acid source used for the leaching in FIG. 33 to FIG. 35 could be replaced by nitric to obtain a transition metal source in form of a nitrate as described in FIG. 32.

The person skilled of the art would understand that LiOH used in FIG. 24 to FIG. 30 and in FIG. 34 to react with the metal hydroxide/carbonate to from the lithiated metal oxide(s) can be carbonated, generating $Li_2CO_3$ reacting with the metal hydroxide/carbonate to form the lithiated metal oxide(s). Oher carbonates as described in the present disclosure can also be used such as $Na_2CO_3$, $K_2CO_3$, $Rb_2CO_3$, $Cs_2CO_3$, $MgCO_3$, $CaCO_3$, $SrCO_3$ or $BaCO_3$ The person skilled of the art would understand that nitrates used in FIG. 35 can be an alternative to sulfates as presented in FIG. 24 to FIG. 34, and all the processes presented in FIG. 24 to FIG. 34 can be used replacing sulfates by nitrates.

For example, conversion from metal carbonates to lithium oxide is described in WO2006104367, that is hereby incorporated by reference in its entirety.

For example, the electrochemically generated sulfuric acid ($H_2SO_4$ solution) generated in FIGS. 24 to 28 can contain lithium sulfate, sodium sulfate and/or potassium sulfate. $H_2SO_4$ can be separated from lithium sulfate, sodium sulfate and/or potassium sulfate as shown in FIG. 29 through anolyte concentration. For example, such a separation can be achieved by a selective crystallization of a sulfate monohydrate. For example, anolyte concentration can be carried out by selective sulfate precipitation as defined in any one of WO2015123762, WO2017031595 and WO2018035618. These documents are hereby incorporated by reference in their entirety.

Besides, the person skilled of the art can understand that the acid solution generated by electromembrane process in FIG. 24 to FIG. 35 can be replaced by the anolyte solution and a concentration step as presented in FIG. 29.

The person skilled of the art will understand that all the possible embodiment described from FIG. 24 to FIG. 34 can also be applied in FIG. 35 (e.g. concentration of $Li_2SO_4$ solution and/or $Li_2SO_4$ and mixture with $Na_2SO_4$).

Example 10—Core-Shell Synthesis

For the synthesis of a gradient concentration material with a composition $Li[Ni_dM1_eM2_f]O_2$ with d+e+f=1, being made of a core $[LiNi_xM1_yM2_zO_2]$ with x+y+z=1 and a shell $[LiNi_aM1_bM2_cO_2]$ with a+b+c=1, with M1=Mn, Co or Al and M2=Mn, Co or Al and with x<d<a, y<e<b, z<f<c. In order to prepare such a spherical Core-Shell material, the hydroxide precursor has to be obtained first, and can be synthetized via co-precipitation. In such a synthesis method, a certain amount of $NiSO_4 \cdot 6H_2O$ (and optionally M1 at a given concentration and M2 at a different concentration)

aqueous solution was used as a starting material for the core composition of $Ni_xM1_yM2_z(OH)_2$. The metal aqueous solution were continuously fed into a batch reactor already filled with certain amounts of deionized water, $NaOH_{(aq.)}$ as pH enhancer and $NH_4OH_{(aq.)}$ as chelating agent, under a nitrogen atmosphere. Simultaneously, NaOH at a given concentration and adequate amount of $NH_4OH_{(aq.)}$ were pumped into the reactor. Once the precursor $Ni_xM1_yM2_z(OH)_2$ is formed in solution, the second solution, an aqueous solution of the desired metals $Ni_aM1_bM2_c(OH)_2$ (e.g. M1 and M2=Ni, Mn, Co, Al) was introduced into the reactor. The obtained $Ni_dM1_eM2_f(OH)_2$ (with x<d<a, y<e<b, z<f<c) powders were filtered, washed, and dried under vacuum at 110° C. for 12 h. To prepare $Li[Ni_dM1_eM2_f]O_2$, the precursor $Ni_dM1_eM2_f(OH)_2$ was mixed with $LiOH \cdot H_2O$ and calcined at 700° C. for 10 h under oxygen atmosphere.

For example, the metal source can be a spent battery leached or constituent thereof (e.g. cathode, anode, black mass, slag or mixtures thereof) (e.g. the cathode only, or both the anode and the cathode or a black mass, etc) leached by the electrochemically generated sulfuric acid.

The leaching metal sulfate solution can contain the metal retrieved from the spent battery (e.g. Li, Ni, Co and/or Al and/or Mn). For example, NaOH can be added as a source of pH enhancer to a mixture of metal sulfate(s) for the precipitation of the metal hydroxide(s). After precipitation of the metal hydroxide(s), a mixture of $Li_2SO_4$ and $Na_2SO_4$ can be recovered as a dissolved species in aqueous solution to be inserted in the membrane electrolyser, and $Li_2SO_4$ can be converted into LiOH to react with a metal hydroxide(s) to form a metal oxide(s).

The person skilled in the art would understand that another base could be used instead of NaOH. For example, KOH, RbOH, CsOH, $Mg(OH)_2$, $Ca(OH)_2$, $Sr(OH)_2$, or $Ba(OH)_2$ could be used.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the processes of the SUMMARY OF THE DISCLOSURE are hereby covered by the present disclosure.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

What is claimed is:

1. A process for preparing a metal oxide comprising (i) at least one metal chosen from nickel and cobalt and optionally (ii) at least one metal chosen from manganese, lithium and aluminum, said process comprising:

reacting a metal sulfate comprising (i) at least one metal chosen from nickel and cobalt and optionally (ii) at least one metal chosen from manganese, lithium and aluminum with lithium hydroxide and optionally a chelating agent to obtain a solid comprising a metal hydroxide comprising (i) at least one metal chosen from nickel and cobalt and optionally (ii) at least one metal chosen from manganese, lithium and aluminum, and a liquid comprising lithium sulfate;

separating said liquid and said solid from one another to obtain said metal hydroxide;

submitting said liquid comprising lithium sulfate to an electromembrane process for converting said lithium sulfate into lithium hydroxide; and reusing at least a first portion of said lithium hydroxide obtained by said electromembrane process for reacting with said metal sulfate;

reacting at least a second portion of said lithium hydroxide obtained by said electromembrane process with said obtained metal hydroxide to obtain a mixture of metal hydroxides; and roasting said mixture of metal hydroxides to obtain said metal oxide, wherein said metal oxide is chosen from $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$ and $LiNi_{0.8}Co_{0.15}Al_{0.05}O_2$.

2. The process of claim 1, wherein LiOH is substantially selectively crystallized and removed from said electromembrane process by evaporative crystallization.

3. The process of claim 1, wherein said metal sulfate comprises (i) at least one metal chosen from nickel and cobalt and (ii) at least one metal chosen from manganese, lithium and aluminum.

4. The process of claim 1, wherein said solid is a precipitate comprising said metal hydroxide, said precipitate being obtained at a pH of about 9 to about 14.

5. The process of claim 1, wherein said solid is a precipitate comprising said metal hydroxide, said precipitate being obtained at a pH of about 10.5 to about 12.5.

6. The process of claim 1, wherein said metal sulfate is reacted with lithium hydroxide and a chelating agent that is ammonia.

7. The process of claim 1, wherein roasting said mixture of metal hydroxides comprises roasting at a first temperature of at least 350° C. for a period of time of at least 4 hours.

8. The process of claim 7, further comprising roasting said mixture of metal hydroxides comprises roasting at a second temperature of at least 600° C. for a period of time of at least 6 hours.

9. A process for preparing a metal oxide comprising (i) at least one metal chosen from nickel and cobalt and optionally (ii) at least one metal chosen from manganese, lithium and aluminum, said process comprising:

reacting a metal sulfate comprising (i) lithium; (ii) at least one metal chosen from nickel and cobalt and optionally (iii) at least one metal chosen from manganese and aluminum with sodium hydroxide and optionally a chelating agent in order to obtain a solid comprising said metal hydroxide and a liquid comprising sodium sulfate and lithium sulfate;

separating said liquid and said solid from one another to obtain said metal hydroxide;

submitting said liquid comprising sodium sulfate and lithium sulfate to an electromembrane process for converting said sodium sulfate and said lithium sulfate into sodium hydroxide and lithium hydroxide;

separating said lithium hydroxide and said sodium hydroxide from one another;

reusing at least a first portion of said sodium hydroxide obtained by said electromembrane process for reacting with said metal sulfate;

reacting at least a first portion of said lithium hydroxide obtained by said electromembrane process with said obtained metal hydroxide to obtain a mixture of metal hydroxides; and roasting said mixture of metal hydroxides to obtain said metal oxide, wherein said metal oxide is chosen from $LiNi_{0.33}Mn_{0.33}Co_{0.33}O_2$, $LiNi_{0.5}Mn_{0.3}Co_{0.2}O_2$, $LiNi_{0.6}Mn_{0.2}Co_{0.2}O_2$, $LiNi_{0.8}Mn_{0.1}Co_{0.1}O_2$ and $LiNi_{0.8}Co_{0.15}Al_{0.05}O_2$.

10. The process of claim 9, wherein LiOH is substantially selectively crystallized and removed from said electromembrane process by evaporative crystallization.

11. The process of claim 9, wherein said metal sulfate comprises (i) lithium;

(ii) at least one metal chosen from nickel and cobalt and (iii) at least one metal chosen from manganese and aluminum.

12. The process of claim 9, wherein said solid is a precipitate comprising said metal hydroxide, said precipitate being obtained at a pH of about 9 to about 14.

13. The process of claim 9, wherein said solid is a precipitate comprising said metal hydroxide, said precipitate being obtained at a pH of about 10.5 to about 12.5.

14. The process of claim 9, wherein said metal sulfate is reacted with lithium hydroxide and a chelating agent that is ammonia.

15. The process of claim 9, wherein roasting said mixture of metal hydroxides comprises roasting at a first temperature of at least 350° C. for a period of time of at least 4 hours.

16. The process of claim 15, further comprising roasting said mixture of metal hydroxides comprises roasting at a second temperature of at least 600° C. for a period of time of at least 6 hours.

* * * * *